(12) United States Patent
Kageme

(10) Patent No.: US 11,921,230 B2
(45) Date of Patent: Mar. 5, 2024

(54) RADAR DEVICE AND SIGNAL PROCESSING METHOD

(71) Applicant: Mitsubishi Electric Corporation, Tokyo (JP)

(72) Inventor: Satoshi Kageme, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 422 days.

(21) Appl. No.: 17/385,311

(22) Filed: Jul. 26, 2021

(65) Prior Publication Data
US 2021/0356559 A1    Nov. 18, 2021

Related U.S. Application Data

(63) Continuation of application No. PCT/JP2019/003427, filed on Jan. 31, 2019.

(51) Int. Cl.
*G01S 7/35* (2006.01)
*G01S 13/58* (2006.01)
*G01S 13/931* (2020.01)

(52) U.S. Cl.
CPC .......... *G01S 7/354* (2013.01); *G01S 13/584* (2013.01); *G01S 7/356* (2021.05); *G01S 13/931* (2013.01)

(58) Field of Classification Search
CPC ...... G01S 13/42; G01S 13/584; G01S 13/931; G01S 7/354; G01S 7/356
See application file for complete search history.

(56) References Cited

U.S. PATENT DOCUMENTS

| 8,040,286 B2 | 10/2011 | Matsuo et al. |
| 2020/0103495 A1* | 4/2020 | Iwasa ................. G01S 13/325 |
| 2020/0225337 A1* | 7/2020 | Kishigami ............ G01S 7/41 |

FOREIGN PATENT DOCUMENTS

| JP | 2005-233723 A | 9/2005 |
| JP | 4394147 B2 | 1/2010 |
| JP | 6218476 B2 | 10/2017 |

* cited by examiner

*Primary Examiner* — Timothy X Pham
(74) *Attorney, Agent, or Firm* — Birch, Stewart, Kolasch & Birch, LLP

(57) ABSTRACT

A first module generates a first reception signal from a reflection RF signal of a transmission RF signal using a first local oscillation signal, a second module generates a second reception signal from the reflection RF signal using a second local oscillation signal synchronized with the first local oscillation signal, and a first signal processor calculates the angle of a target using a signal obtained by coherent integration based on the first reception signal and second reception signal.

18 Claims, 27 Drawing Sheets

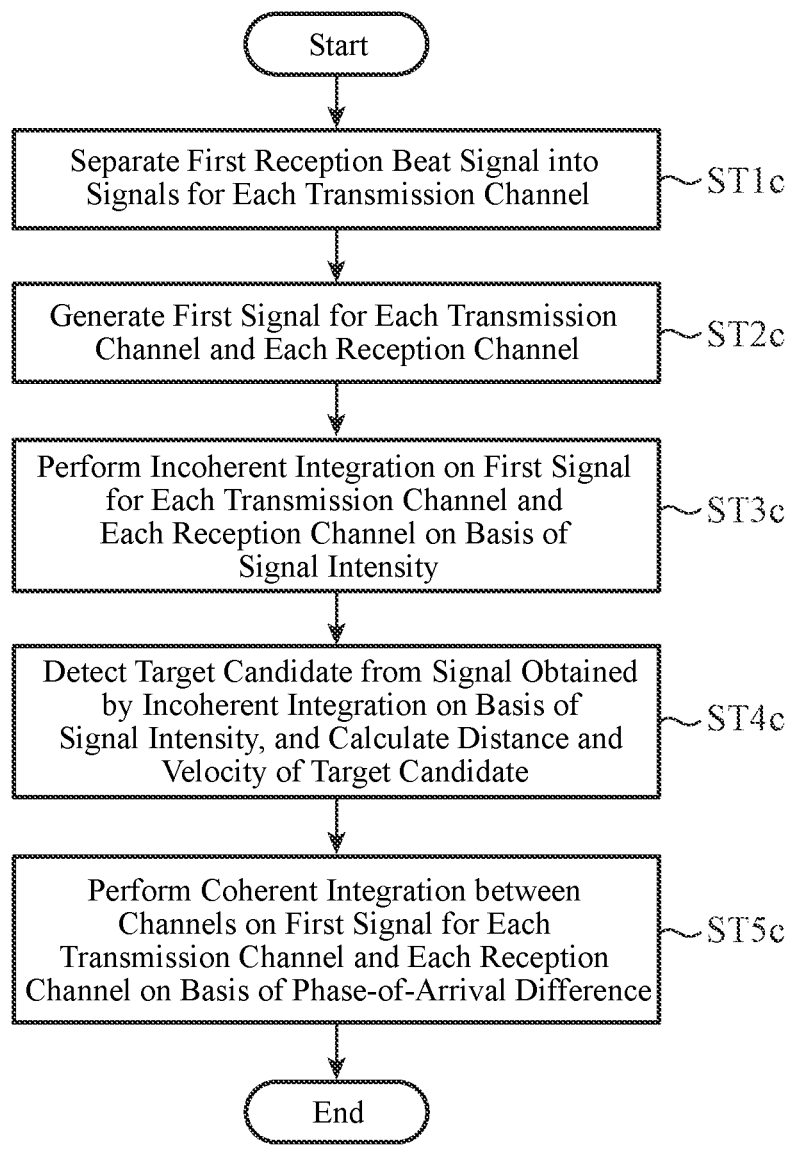

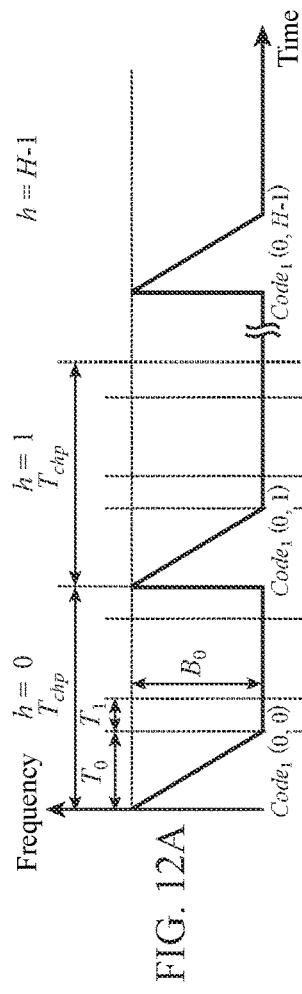
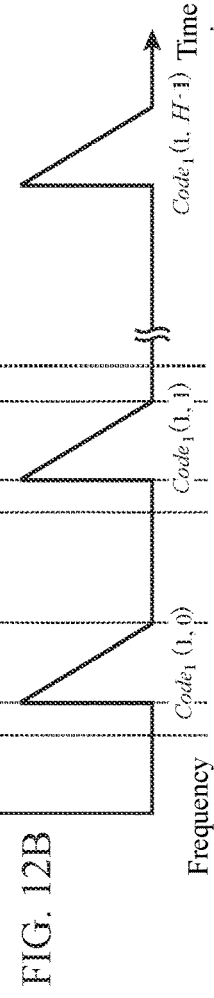
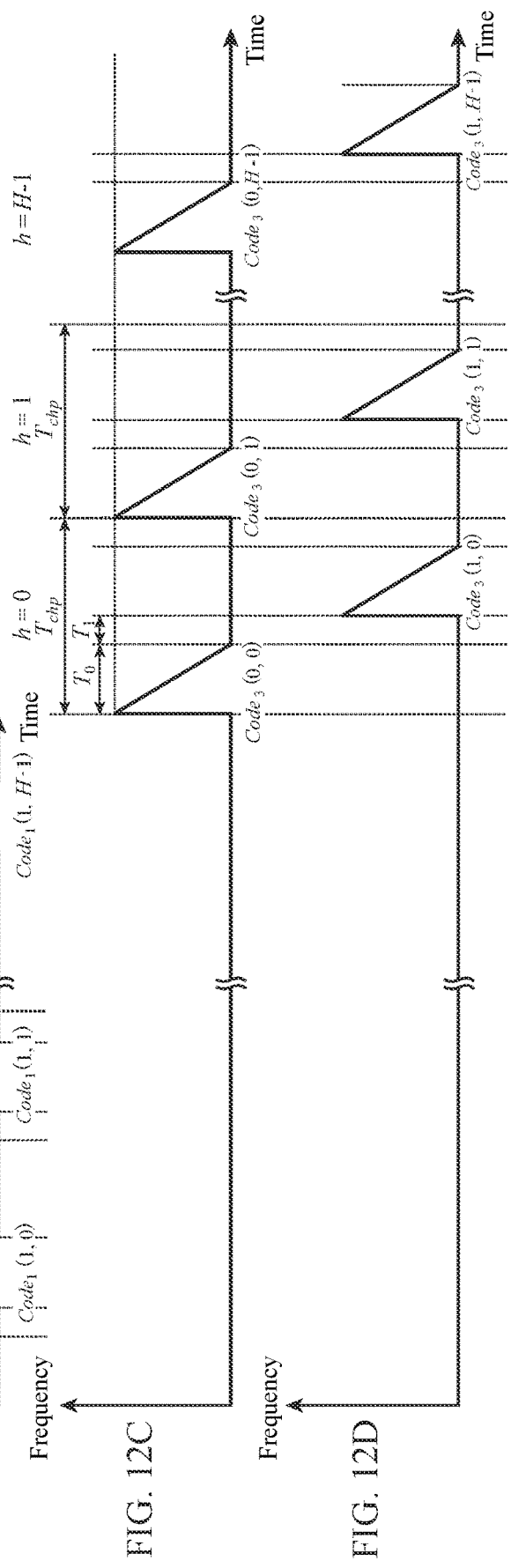
FIG. 12A
FIG. 12B
FIG. 12C
FIG. 12D

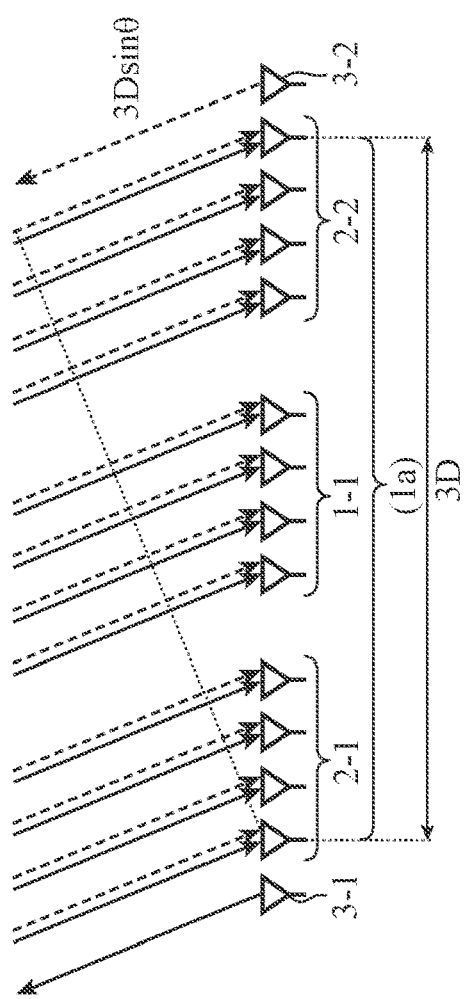
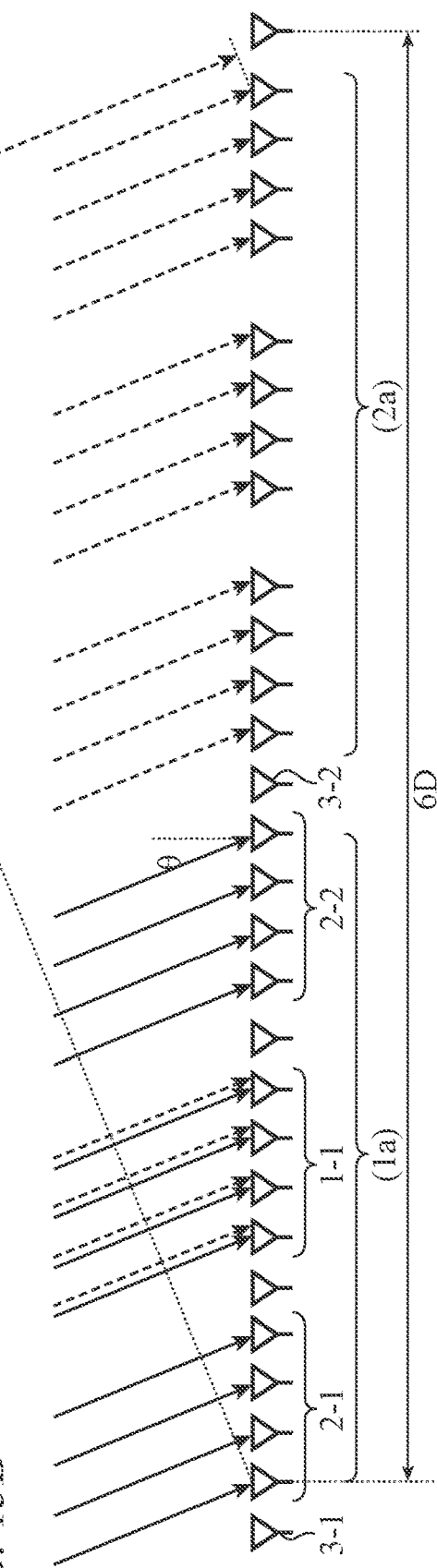
FIG. 15A
FIG. 15B

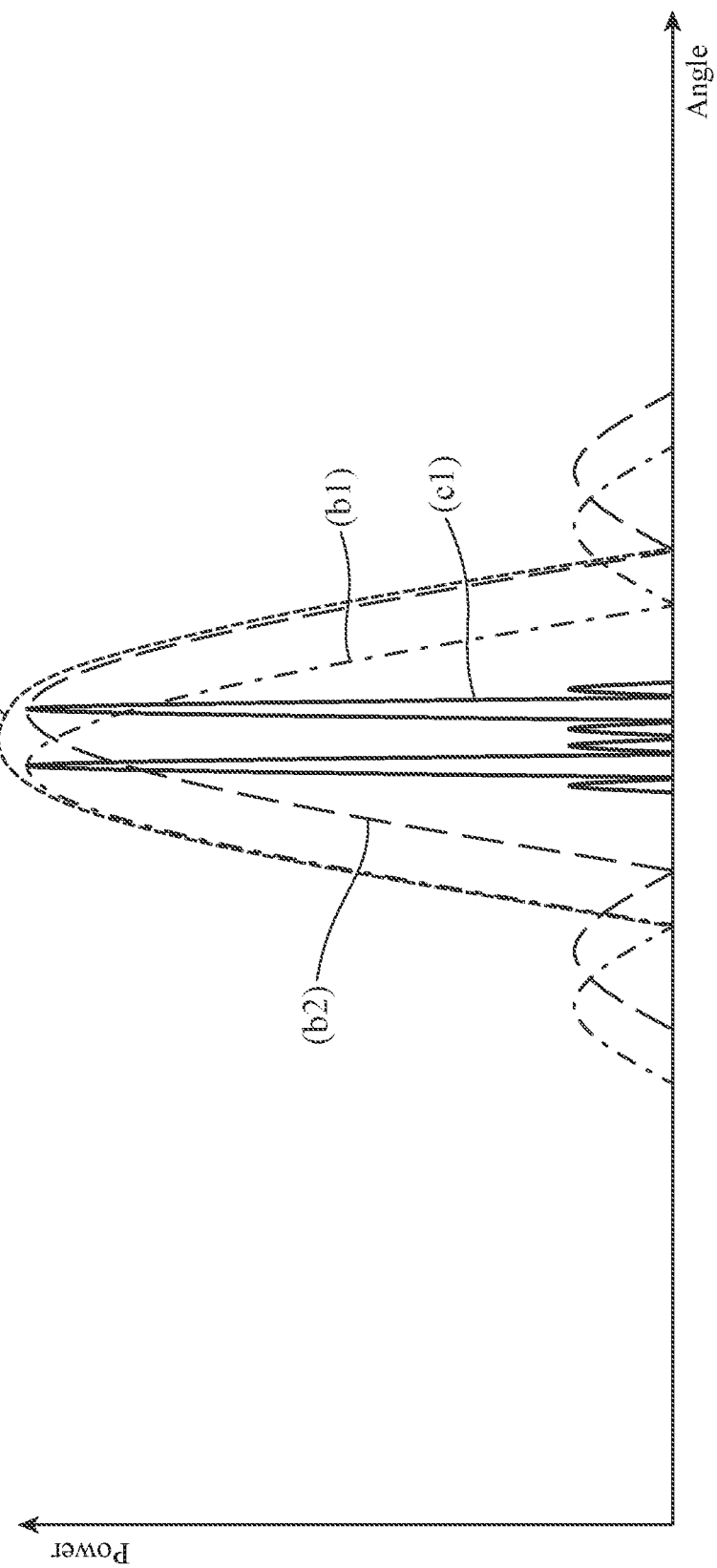

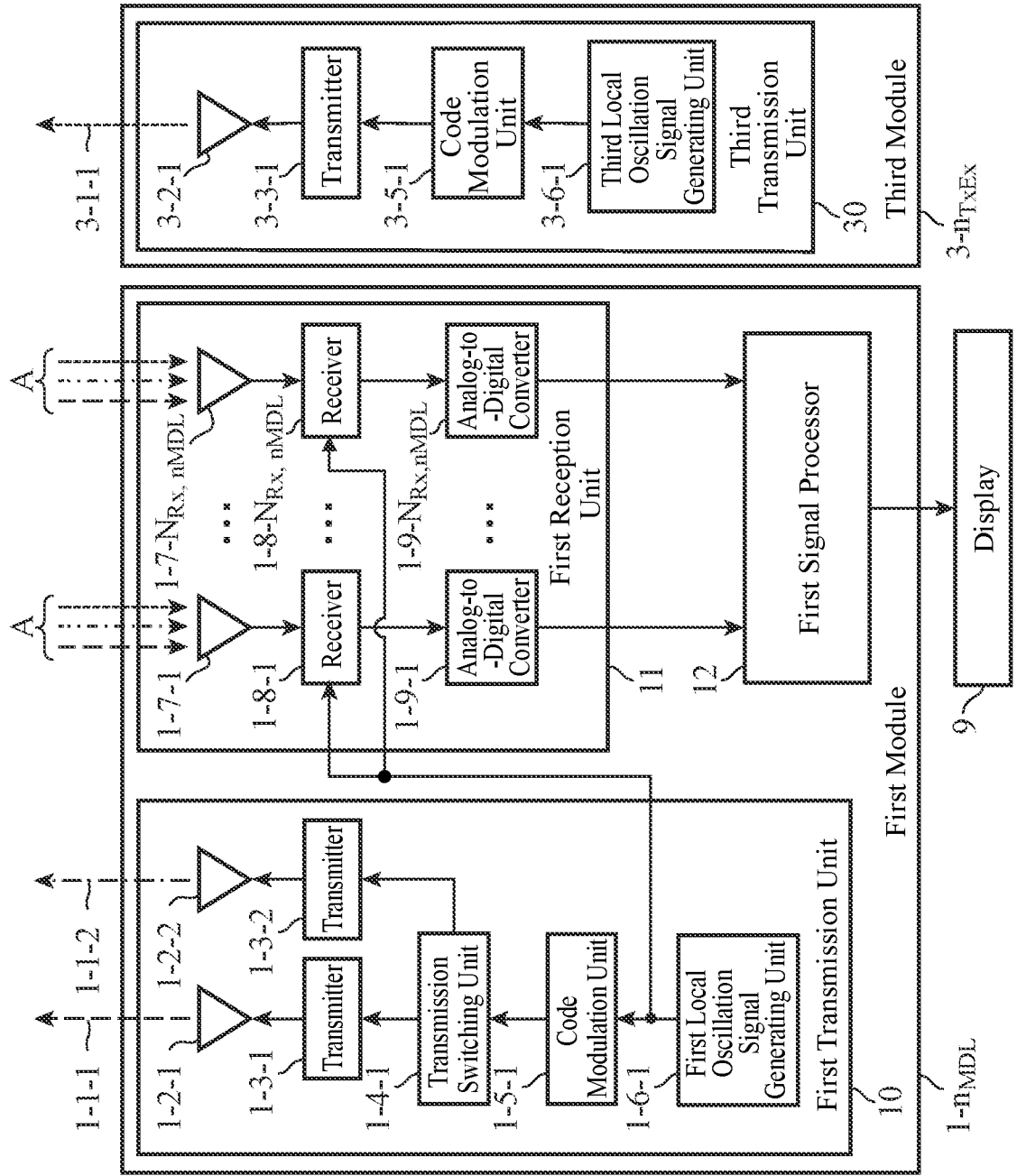

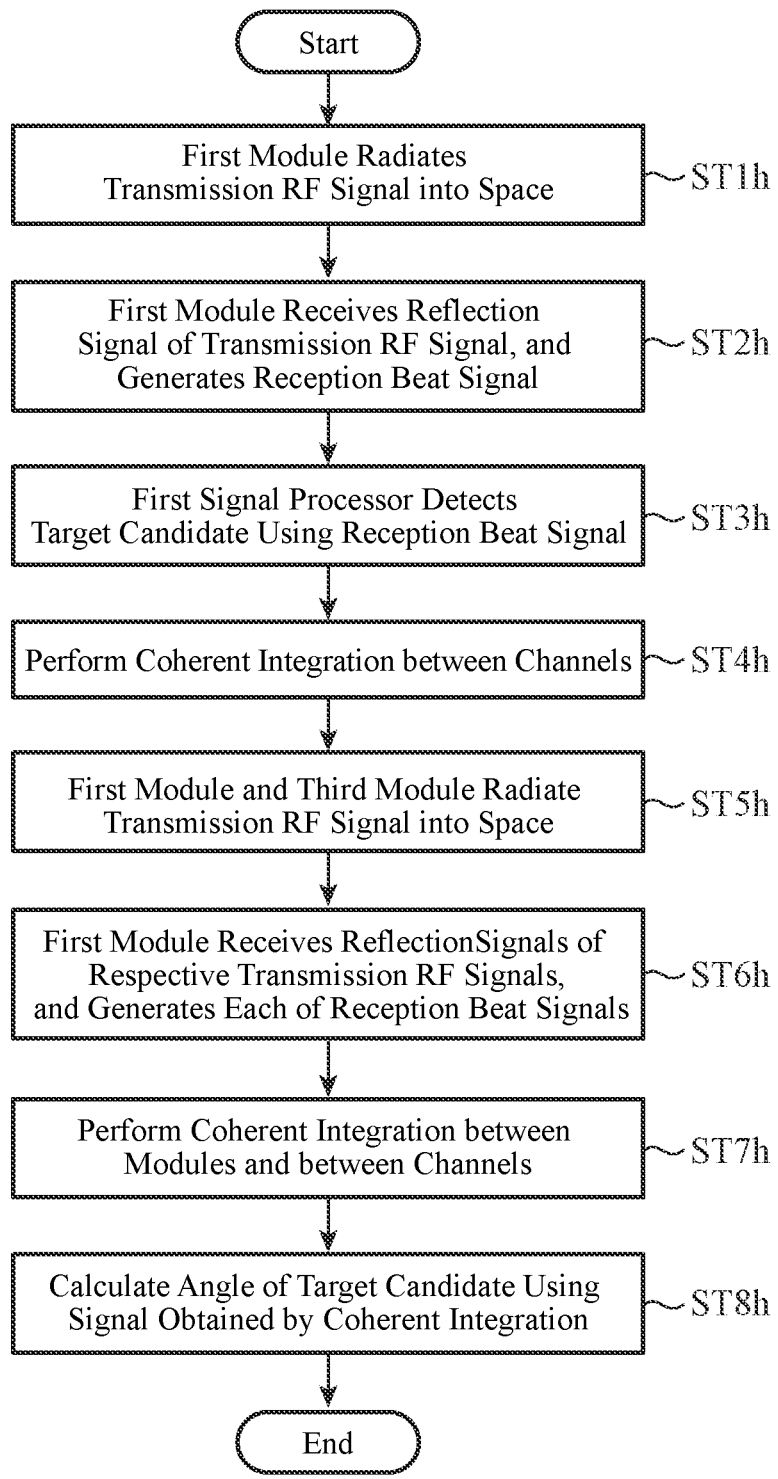

RADAR DEVICE AND SIGNAL PROCESSING METHOD

CROSS REFERENCE TO RELATED APPLICATION

This application is a Continuation of PCT International Application No. PCT/JP2019/003427, filed on Jan. 31, 2019, which is hereby expressly incorporated by reference into the present application.

TECHNICAL FIELD

The present invention relates to a radar device and a signal processing method.

BACKGROUND ART

In recent years, the development of a radar device that is mounted on an automobile and detects an automobile, a pedestrian, or a building existing around the automobile has been promoted. The radar device includes: a transmission antenna that emits radio waves; and a reception antenna that receives reflected waves resulting from reflection of the radio waves emitted from the transmission antenna on a target, and obtains the distance to the target on the basis of a time from the emission of radio waves from the transmission antenna till the reception of the reflected waves by the reception antenna.

For example, Patent Literature 1 discloses a radar device having multiple sub-array units. In the radar device disclosed in Patent Literature 1, the multiple sub-array units are distributed on a plane, and each unit has a phased array antenna. Multiple phased array antennas distributed on a plane constitute a single equivalent large-aperture antenna. Since the aperture length of an antenna is proportional to the angle resolution of a target, the angle resolution of a target is improved in the radar device disclosed in Patent Literature 1.

CITATION LIST

Patent Literatures

Patent Literature 1: JP 2005-233723 A

SUMMARY OF INVENTION

Technical Problem

However, in the radar device disclosed in Patent Literature 1, a local oscillation signal used for generating a transmission signal and a local oscillation signal used for down-converting a reception signal are different in the distributed multiple sub-array units. Thus, an influence of phase noise is large. For this reason, it is difficult to detect a target which has a small reflected power and which exists around a target having a large reflected power, thus entailing a problem of deterioration in detection accuracy of the target. If the same local oscillation signal is to be used for transmission and reception in order to address such a problem, the local oscillation signal needs to be distributed to each module by wire. Therefore, when the frequency of the local oscillation signal is high, it is difficult to have the same phase, and further, output power of a local oscillation source needs to be increased. This raises a problem of an increase in cost. On the other hand, it is conceivable that each module has a local oscillation source, a low-frequency reference signal is distributed to each local oscillation source, and the local oscillation sources are synchronized. In that case, the local oscillation signals of the respective modules are different, and thus, an influence of phase noise is also increased. Accordingly, detection accuracy of a target deteriorates.

The present invention solves the above problems, and an object of the present invention is to provide a radar device and a signal processing method with which it is possible to enhance angle resolution of a target using a first module that uses the same local oscillation signal for transmission and reception and a second module that uses local oscillation signals which are different for transmission and reception and which are synchronized with the first module, while maintaining detection performance by suppressing an influence of phase noise by the first module.

Solution to Problem

The radar device according to the present invention includes: a first module for generating a first transmission signal using a first local oscillation signal, transmitting the first transmission signal, receiving a reflection signal of the first transmission signal, and generating a first reception signal from the received reflection signal using the first local oscillation signal; a second module for receiving the reflection signal of the first transmission signal, and generating a second reception signal from the received reflection signal using a second local oscillation signal that is synchronized with the first local oscillation signal; and processing circuitry performing a process of: detecting a target using the first reception signal and calculating an angle of the target using, for the target, a signal obtained by coherent integration based on the first reception signal and the second reception signal.

Advantageous Effects of Invention

According to the present invention, the first module generates a first reception signal from a reflection signal of a first transmission signal using a first local oscillation signal, a second module generates a second reception signal from the reflection signal of the first transmission signal using a second local oscillation signal synchronized with the first local oscillation signal, and the signal processor calculates the angle of a target using, for the target, a signal obtained by coherent integration based on the first reception signal and the second reception signal. Thus, it is possible to enhance the angle resolution of the target while maintaining the detection accuracy of the target.

BRIEF DESCRIPTION OF DRAWINGS

FIG. 7 is a flowchart showing a detailed process of steps ST3 and ST4 in FIG. 4.

FIG. 12A is a diagram showing a transmission timing of a transmission RF signal in a transmission channel of a transmission channel number $n_{Tx}=1$ of the first module.

FIG. 12B is a diagram showing a transmission timing of the transmission RF signal in a transmission channel of a transmission channel number $n_{Tx}=2$ of the first module.

FIG. 12C is a diagram showing a transmission timing of the transmission RF signal by a third module 3-1.

FIG. 12D is a diagram showing a transmission timing of the transmission RF signal by a third module 3-2.

FIG. 15A is a diagram showing an actual antenna arrangement in the radar device according to the first embodiment.

FIG. 15B is a diagram showing an actual antenna arrangement and a virtual antenna arrangement in the radar device according to the first embodiment.

FIG. 17 is a diagram showing a relationship between the angle of a target candidate and the power of a signal corresponding to this angle when the number of target candidates is two.

FIG. 27 is a block diagram showing a configuration of a radar device according to a second embodiment.

FIG. 28 is a flowchart showing an operation of the radar device according to the second embodiment.

DESCRIPTION OF EMBODIMENTS

First Embodiment

Figure 1:
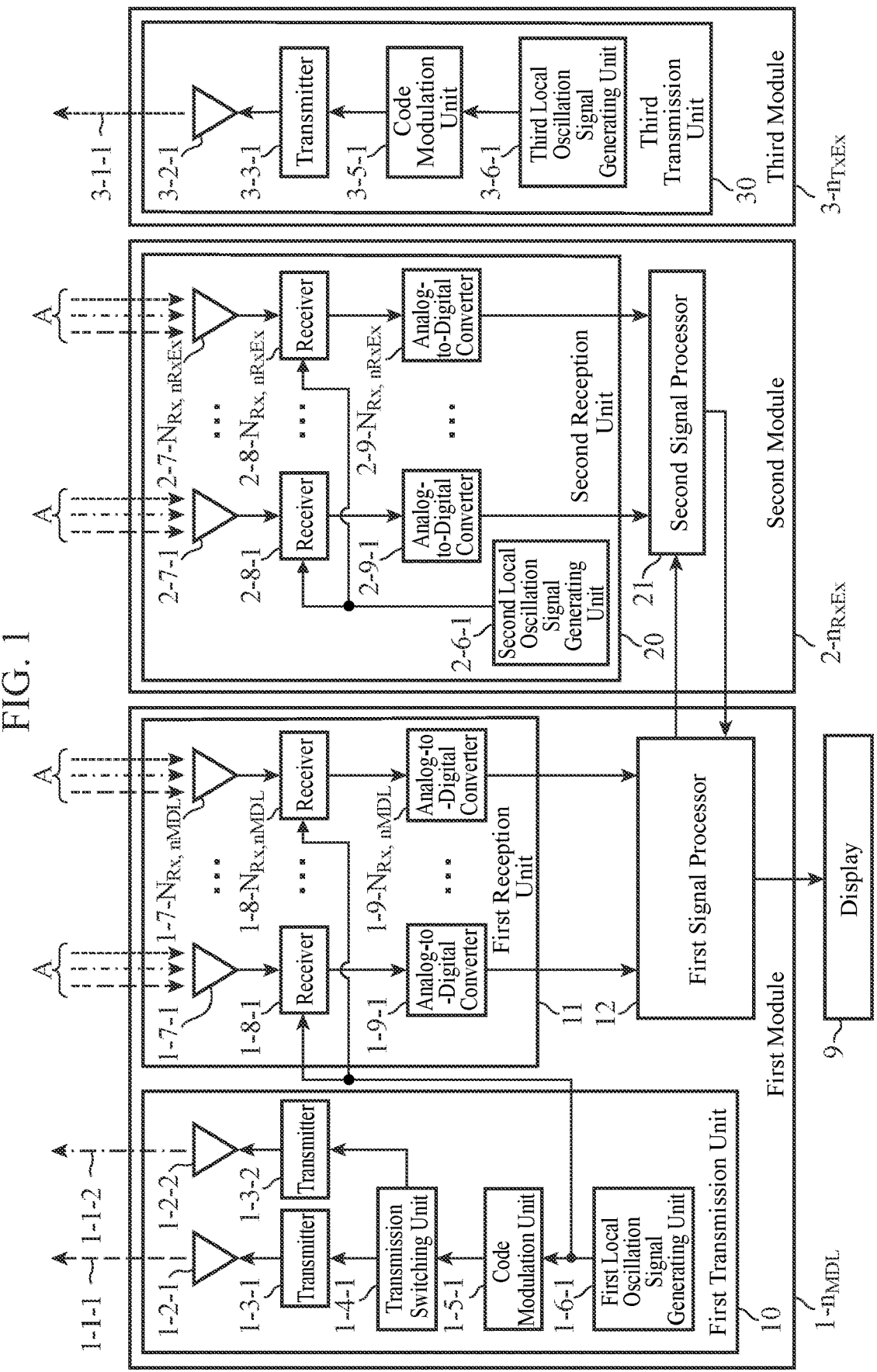
FIG. 1 is a block diagram showing a configuration of a radar device according to a first embodiment.

FIG. 1 is a block diagram showing a configuration of a radar device according to a first embodiment. The radar device according to the first embodiment includes, for example, a first module 1-$n_{MDL}$, a second module 2-$n_{RxEx}$, a third module 3-$n_{TxEx}$, and a display 9 as shown in FIG. 1. The display 9 displays, for example, a detection result of the angle of a target obtained by the first module 1-$n_{MDL}$.

The first module 1-$n_{MDL}$ is a transmission and reception module that radiates a high-frequency transmission signal into space and receives a high-frequency reflection signal resulting from reflection of the high-frequency transmission signal on an object existing in space. The high-frequency transmission signal is a first transmission signal radiated into space as an electromagnetic wave by the radar device, and will be hereinafter referred to as a transmission RF signal. Further, the high-frequency reflection signal is a reflection signal resulting from reflection of the transmission RF signal off an object existing in space, and will be hereinafter referred to as a reflection RF signal. $n_{MDL}$ is a module number, and when the number of the first modules 1-$n_{MDL}$ is $N_{MDL}$, it is a serial number assigned to each of the first module 1-1 to the first module 1-$N_{MDL}$. In FIG. 1, the $N_{MDL}$ is 1, which shows that there is one first module 1-1.

The second module 2-$n_{RxEx}$ is a reception module that receives the reflection RF signal resulting from reflection of the transmission RF signal off the object existing in space. $n_{RxEx}$ is a module number, and when the number of the second modules $2\text{-}n_{RxEx}$ is $N_{RxEx}$, it is a serial number assigned to each of the second module 2-1 to the second module $2\text{-}N_{RxEx}$. In FIG. 1, $N_{RxEx}$ is 1, which shows that there is one second module 2-1.

The third module $3\text{-}n_{TxEx}$ is a transmission module that radiates the transmission RF signal into space. $n_{TxEx}$ is a module number, and when the number of the third modules $3\text{-}n_{TxEx}$ is $N_{TxEx}$, it is a serial number assigned to each of the third module 3-1 to the third module $3\text{-}N_{TxEx}$. In FIG. 1, $N_{TxEx}$ is 1, which shows that there is one third module 3-1.

As shown in FIG. 1, the first module $1\text{-}n_{MDL}$ includes a first transmission unit 10, a first reception unit 11, and a first signal processor 12. The first transmission unit 10 is a component that emits a transmission RF signal $1\text{-}1\text{-}n_{Tx}$, and includes an antenna $1\text{-}2\text{-}n_{Tx}$, a transmitter $1\text{-}3\text{-}n_{Tx}$, a transmission switching unit 1-4-1, a code modulation unit 1-5-1, and a first local oscillation signal generating unit 1-6-1. $n_{Tx}$ is a transmission channel number of the first transmission unit 10.

When the number of transmission channels of the first transmission unit 10 is $N_{Tx}$, serial numbers from 1 to $N_{Tx}$ are assigned to the transmission channels from antennas 1-2-1 to $1\text{-}2\text{-}N_{Tx}$ as transmission channel numbers. The antenna $1\text{-}2\text{-}n_{Tx}$ radiates the transmission RF signal $1\text{-}1\text{-}n_{Tx}$ output from the transmitter $1\text{-}3\text{-}n_{Tx}$ into space.

Note that FIG. 1 shows a case where the first transmission unit 10 has two transmission channels. The transmission RF signal 1-1-1 is a signal output from the transmitter 1-3-1 to the antenna 1-2-1 and radiated into space by the antenna 1-2-1, and the transmission RF signal 1-1-2 is a signal output from the transmitter 1-3-2 to the antenna 1-2-2 and radiated into space by the antenna 1-2-2.

The transmitter $1\text{-}3\text{-}n_{Tx}$ receives the transmission RF signal from the code modulation unit 1-5-1 via the transmission switching unit 1-4-1, and transmits the inputted transmission RF signal to space using the antenna $1\text{-}2\text{-}n_{Tx}$. The transmission switching unit 1-4-1 switches the transmitter that transmits the transmission RF signal from among the transmitters 1-3-1 to $1\text{-}3\text{-}N_{Tx}$. For example, the transmission switching unit 1-4-1 alternately switches between the transmitter 1-3-1 and the transmitter 1-3-2, by which the transmission RF signal 1-1-1 and the transmission RF signal 1-1-2 are alternately radiated into space.

The code modulation unit 1-5-1 generates a transmission RF signal $1\text{-}1\text{-}n_{Tx}$ of the transmission channel number $n_{Tx}$ using a first local oscillation signal generated by the first local oscillation signal generating unit 1-6-1 and a modulation code in the transmission channel of the transmission channel number $n_{Tx}$. The first local oscillation signal generating unit 1-6-1 generates the first local oscillation signal, and outputs the generated first local oscillation signal to the code modulation unit 1-5-1 and a receiver $1\text{-}8\text{-}n_{Rx,nMDL}$.

The first reception unit 11 has an antenna $1\text{-}7\text{-}n_{Rx,nMDL}$, a receiver $1\text{-}8\text{-}n_{Rx,nMDL}$, and an analog-to-digital converter $1\text{-}9\text{-}n_{Rx,nMDL}$, and receives a reflection RF signal A resulting from reflection of the transmission RF signal $1\text{-}1\text{-}n_{Tx}$ off the object existing in space. $n_{Rx,nMDL}$ is a reception channel number of the first reception unit 11. For example, when the number of reception channels of the first reception unit 11 is $N_{Rx,nMDL}$, serial numbers from 1 to $N_{Rx,nMDL}$ are assigned to the reception channels from antennas 1-7-1 to $1\text{-}7\text{-}N_{Rx,nMDL}$ as reception channel numbers.

The antenna $1\text{-}7\text{-}n_{Rx,nMDL}$ receives the reflection RF signal A and outputs the received reflection RF signal A to the receiver $1\text{-}8\text{-}n_{Rx,nMDL}$. The receiver $1\text{-}8\text{-}n_{Rx,nmDL}$ performs signal processing on the reflection RF signal A received by the antenna $1\text{-}7\text{-}n_{Rx,nMDL}$, and outputs the signal that has been subjected to signal processing to the analog-to-digital converter $1\text{-}9\text{-}n_{Rx,nMDL}$. For example, the receiver $1\text{-}8\text{-}n_{Rx,nMDL}$ down-converts the reflection RF signal A using the first local oscillation signal, filters the down-converted signal using a band filter, amplifies the intensity of the signal filtered by the band filter, detects the phase of the signal amplified in intensity, and then, generates a reception beat signal of the reception channel having the reception channel number $n_{Rx,nMDL}$ using the phase-detected signal.

The analog-to-digital converter $1\text{-}9\text{-}n_{Rx,nMDL}$ converts the signal output from the receiver $1\text{-}8\text{-}n_{Rx,nMDL}$ from an analog signal to a digital signal, and generates a digital reception beat signal using the signal converted into a digital signal. The reception beat signal converted into a digital signal by the analog-to-digital converter $1\text{-}9\text{-}n_{Rx,nMDL}$ is a reception signal used for detecting a target candidate and calculating the angle of the target candidate, and is output to the first signal processor 12.

The reception beat signal generated by the first module $1\text{-}n_{MDL}$ receiving the reflection RF signal of the transmission RF signal (first transmission signal) transmitted by the first module $1\text{-}n_{MDL}$ is a first reception signal. Further, the reception beat signal generated by the second module $2\text{-}n_{RxEx}$ receiving the reflection RF signal of the transmission RF signal transmitted by the first module $1\text{-}n_{MDL}$ or the reflection RF signal of the transmission RF signal (third transmission signal) transmitted by the third module $3\text{-}n_{TxEx}$ is a second reception signal. Furthermore, the reception beat signal generated by the first module $1\text{-}n_{MDL}$ receiving the reflection RF signal of the transmission RF signal transmitted by the third module $3\text{-}n_{TxEx}$ is a third reception signal. The first reception signal is used to detect a target. Further, the first reception signal, and the second reception signal or the third reception signal are used for calculating the angle of the target.

The first signal processor 12 is a signal processor that detects a target candidate using the reception beat signal output from the first reception unit 11, and that calculates the angle of the target candidate using a signal obtained by coherent integration based on the reception beat signal output from the first reception unit 11 and the reception beat signal obtained by the second module $2\text{-}n_{RxEx}$. For example, the first signal processor 12 calculates a first signal based on the distance and velocity of the target candidate using the reception beat signal output from the first reception unit 11. The first signal processor 12 detects the target candidate using the calculated first signal. Further, the first signal processor 12 performs coherent integration based on a phase-of-arrival difference corresponding to an angle-of-arrival candidate of the target candidate on the second signal based on the distance and velocity of the target candidate for each transmission channel of the third module $3\text{-}n_{TxEx}$ and each reception channel of the second module $2\text{-}n_{RxEx}$ and the third signal based on the distance and velocity of the target candidate for each transmission channel of the third module $3\text{-}n_{TxEx}$ and each reception channel of the first module $1\text{-}n_{MDL}$, and calculates the angle of the target candidate using the signal obtained by the coherent integration. Note that the phase-of-arrival difference corresponding to the angle-of-arrival candidate of the target candidate is the phase-of-arrival difference caused by the positional relationship between the first module $1\text{-}n_{MDL}$ and the second module $2\text{-}n_{RxEx}$.

The second module $2\text{-}n_{RxEx}$ includes a second reception unit 20 and a second signal processor 21 as shown in FIG.

1. The second reception unit 20 is a component that receives the reflection RF signal A, and includes a second local oscillation signal generating unit 2-6-1, an antenna 2-7-$n_{Rx,nRxEx}$, a receiver 2-8-$n_{Rx,nRxEx}$, and an analog-to-digital converter 2-9-$n_{Rx,nRxEx}$. $n_{Rx,nRxEx}$ is a reception channel number of the second reception unit 20. When the number of reception channels of the second reception unit 20 is $N_{Rx,nRxEx}$, serial numbers from 1 to $N_{Rx,nRxEx}$ are sequentially assigned to reception channels from antennas 2-7-1 to 2-7-$N_{Rx,nRxEx}$ as reception channel numbers. The second local oscillation signal generating unit 2-6-1 generates the second local oscillation signal, and outputs the generated second local oscillation signal to the receiver 2-8-$n_{Rx,nRxEx}$. The second local oscillation signal is synchronized with the first local oscillation signal.

The antenna 2-7-$n_{Rx,nRxEx}$ receives the reflection RF signal A and outputs the received reflection RF signal A to the receiver 2-8-$n_{Rx,nRxEx}$. The receiver 2-8-$n_{Rx,nRxEx}$ performs signal processing on the reflection RF signal A received by the antenna 2-7-$n_{Rx,nRxEx}$, and outputs the signal that has been subjected to signal processing to the analog-to-digital converter 2-9-$n_{Rx,nRxEx}$. The receiver 2-8-$n_{Rx,nRxEx}$ down-converts the reflection RF signal A using the second local oscillation signal, filters the down-converted signal using a band filter, amplifies the intensity of the signal filtered by the band filter, detects the phase of the signal amplified in intensity, and then, generates a reception beat signal of the reception channel having the reception channel number $n_{Rx,nRxEx}$ using the phase-detected signal.

The analog-to-digital converter 2-9-$n_{Rx,nRxEx}$ converts the signal output from the receiver 2-8-$n_{Rx,nRxEx}$ from an analog signal to a digital signal, and generates a digital reception beat signal using the converted digital signal. The reception beat signal converted into a digital signal by the analog-to-digital converter 2-9-$n_{Rx,nRxEx}$ is a second reception signal used for calculating the angle of a target candidate, and is output to the second signal processor 21.

The second signal processor 21 generates a second signal used for calculating the angle of the target candidate on the basis of the reception beat signal output from the second reception unit 20. For example, the second signal processor 21 calculates the second signal based on the distance and velocity of the target candidate using the reception beat signal output from the analog-to-digital converter 2-9-$n_{Rx,nRxEx}$. The second signal is output from the second signal processor 21 to the first signal processor 12.

The third module 3-$n_{TxEx}$ includes a third transmission unit 30 as shown in FIG. 1. The third transmission unit 30 is a component that radiates a transmission RF signal 3-1-$n_{Tx,nTxEx}$, and includes an antenna 3-2-$n_{Tx,nTxEx}$, a transmitter 3-3-$n_{Tx,nTxEx}$, a code modulation unit 3-5-1, and a third local oscillation signal generating unit 3-6-1. $n_{Tx,nTxEx}$ is a transmission channel number of the third transmission unit 30.

When the number of transmission channels of the third transmission unit 30 is $N_{Tx,nTxEx}$, serial numbers from 1 to $N_{Tx,nTxEx}$ are assigned to transmission channels from antennas 3-2-1 to 3-2-$N_{Tx,nTxEx}$ as transmission channel numbers. The antenna 3-2-$n_{Tx,nTxEx}$ radiates the transmission RF signal 3-1-$n_{Tx,nTxEx}$ output from the transmitter 3-3-$n_{Tx,nTxEx}$ into space. Note that FIG. 1 shows a case where the third transmission unit 30 has one transmission channel. The transmission RF signal 3-1-1 is a signal output from the transmitter 3-3-1 to the antenna 3-2-1 and radiated into space by the antenna 3-2-1.

The transmitter 3-3-$n_{Tx,nTxEx}$ transmits the transmission RF signal generated by the code modulation unit 3-5-$n_{Tx,nTxEx}$ into space using the antenna 3-2-$n_{Tx,nTxEx}$. The code modulation unit 3-5-$n_{Tx,nTxEx}$ generates a transmission RF signal 3-1-$n_{Tx,nTxEx}$ of the transmission channel number $n_{Tx,nTxEx}$ using a third local oscillation signal generated by the third local oscillation signal generating unit 3-6-1 and a modulation code in the transmission channel having the transmission channel number $n_{Tx,nTxEx}$. The third local oscillation signal generating unit 3-6-1 generates the third local oscillation signal, and outputs the generated third local oscillation signal to the code modulation unit 3-5-1.

Figure 2:
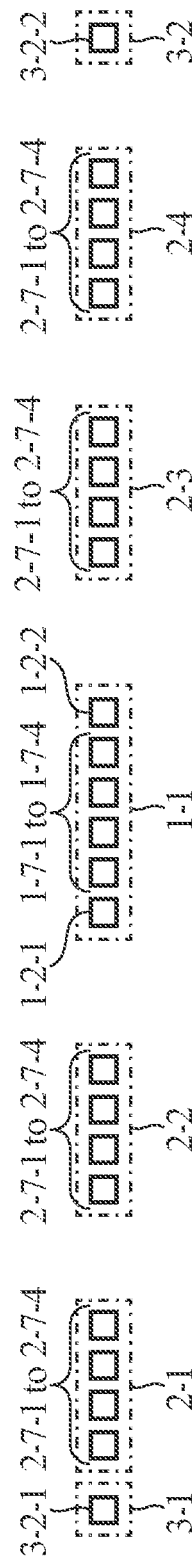
FIG. 2 is a diagram showing an arrangement example of a first module, a second module, and a third module.

FIG. 2 is a diagram showing an arrangement example of the first module 1-1, the second modules 2-1 to 2-4, and the third modules 3-1 and 3-2. In FIG. 2, the number of first modules $N_{MDL}$ is one, the number of transmission channels $N_{Tx,nMDL}$ of the first module 1-1 is two, and the number of reception channels $N_{Rx,nMDL}$ of the first module 1-1 is four. The number of second modules $N_{RxEx}$ is four, and the number of reception channels $N_{Rx,nRxEx}$ of the second modules 2-1 to 2-4 are each four. The number of third modules $N_{TxEx}$ is two, and the number of transmission channels $N_{Tx,nTxEx}$ of the third modules 3-1 and 3-2 are each one.

FIG. 2 shows the case where a linear array is formed in which the antenna 3-2-1 of the third module 3-1, the antennas 2-7-1 to 2-7-4 of the second module 2-1, the antennas 2-7-1 to 2-7-4 of the second module 2-2, the antenna 1-2-1 of the first module 1-1, the antennas 1-7-1 to 1-7-4 of the first module 1-1, the antenna 1-2-2 of the first module 1-1, the antennas 2-7-1 to 2-7-4 of the second module 2-3, the antennas 2-7-1 to 2-7-4 of the second module 2-4, and the antenna 3-2-2 of the third module 3-2 are linearly arranged in this order.

Figure 3:
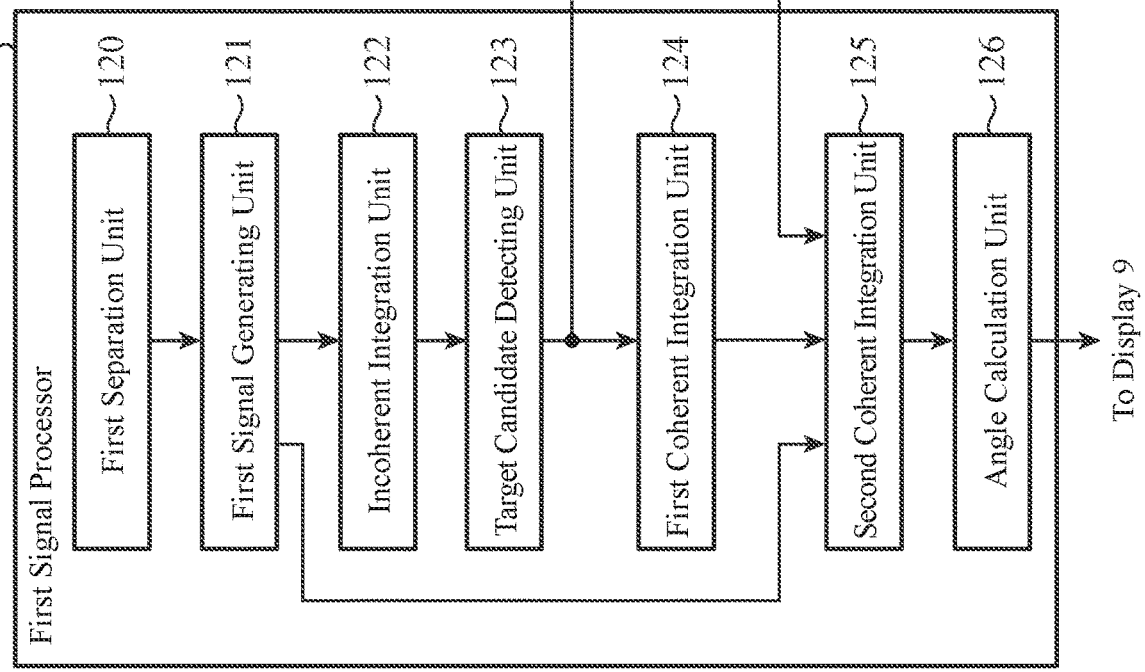
FIG. 3 is a block diagram showing configurations of a first signal processor and a second signal processor.

FIG. 3 is a block diagram showing configurations of the first signal processor 12 and the second signal processor 21. As shown in FIG. 3, the first signal processor 12 includes a first separation unit 120, a first signal generating unit 121, an incoherent integration unit 122, a target candidate detecting unit 123, a first coherent integration unit 124, a second coherent integration unit 125, and an angle calculation unit 126. The second signal processor 21 includes a second separation unit 210 and a second signal generating unit 211.

The first separation unit 120 receives a reception beat signal for each reception channel from the first reception unit 11, and separates the reception beat signals for the respective reception channels into reception beat signals for the respective transmission channels. Thus, a reception beat signal for each transmission channel and each reception channel can be obtained. The first signal generating unit 121 generates a first signal based on the distance and velocity of the target candidate using the reception beat signal for each transmission channel and each reception channel.

The incoherent integration unit 122 performs incoherent integration on the first signal generated by the first signal generating unit 121, and outputs the signal obtained by the incoherent integration to the target candidate detecting unit 123. The target candidate detecting unit 123 detects the target candidate on the basis of the intensity of the signal obtained by the incoherent integration by the incoherent integration unit 122. For example, the target candidate detecting unit 123 detects the distance and velocity of the target candidate.

The first coherent integration unit 124 performs coherent integration on the first signal regarding each target candidate for each transmission channel and each reception channel of the first module 1-$n_{MDL}$ on the basis of the phase-of-arrival difference corresponding to the angle-of-arrival candidate of the target candidate. The phase-of-arrival difference corresponds to the phase difference of signals between the channels.

The second coherent integration unit 125 performs coherent integration based on the reception signal generated by the first module $1\text{-}n_{MDL}$ and the reception signal generated by the second module $2\text{-}n_{RxEx}$. For example, the second coherent integration unit 125 performs coherent integration on the second signal based on the distance and velocity of each target candidate for each transmission channel of the third module and each reception channel of the second module and the third signal based on the distance and velocity of each target candidate for each transmission channel of the third module and each reception channel of the first module on the basis of the phase-of-arrival difference corresponding to the angle-of-arrival candidate of the target candidate. The phase-of-arrival difference corresponds to the phase-of-arrival difference caused by the positional relationship between the first module $1\text{-}n_{MDL}$ and the second module $2\text{-}n_{RxEx}$.

The angle calculation unit 126 receives the signal obtained by the coherent integration for each target candidate from the second coherent integration unit 125, and calculates the angle of the target candidate on the basis of the intensity of the input signal. The angle of the target candidate calculated by the angle calculation unit 126 is displayed on, for example, the display 9.

Note that, although the first module $1\text{-}n_{MDL}$ shown in FIG. 1 includes the first signal processor 12, the first module $1\text{-}n_{MDL}$ and the first signal processor 12 may be separate devices. Similarly, the second module $2\text{-}n_{RxEx}$ and the second signal processor 21 may be separate devices. In addition, the first module $1\text{-}n_{MDL}$ may include the first separation unit 120, the first signal generating unit 121, and the incoherent integration unit 122, and the first signal processor 12 may include the target candidate detecting unit 123, the first coherent integration unit 124, the second coherent integration unit 125, and the angle calculation unit 126.

In the second signal processor 21, the second separation unit 210 receives the reception beat signal for each reception channel from the second reception unit 20, and separates the reception beat signals for the respective reception channels into reception beat signals for the respective transmission channels. Thus, a reception beat signal for each reception channel of the second module can be obtained. The second signal generating unit 211 generates a second signal corresponding to the distance and velocity of the target candidate in the second module by performing discrete Fourier transform on the reception beat signal for each reception channel.

Next, the operation of the radar device according to the first embodiment will be described.

Figure 4:
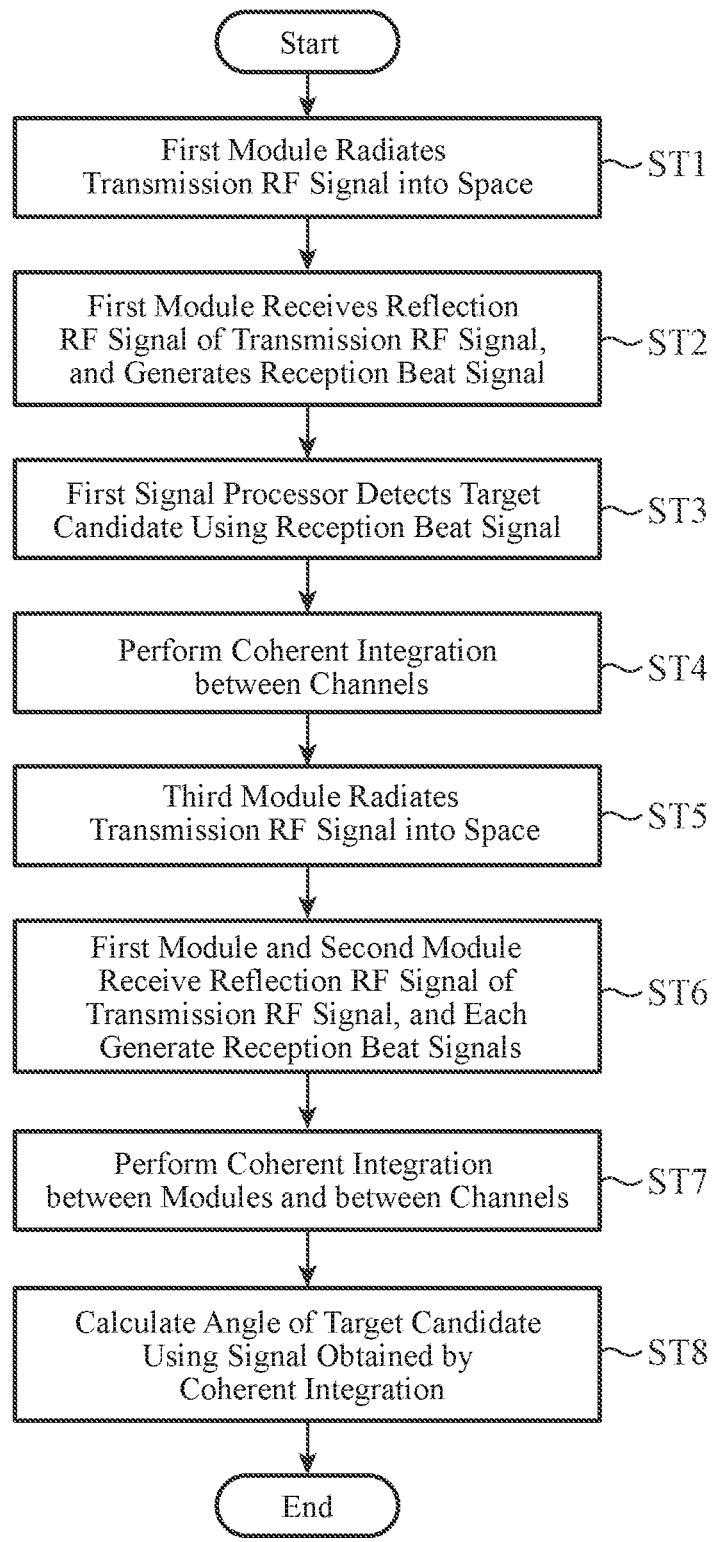
FIG. 4 is a flowchart showing an operation of the radar device according to the first embodiment.

FIG. 4 is a flowchart showing the operation of the radar device according to the first embodiment, and indicates a signal processing method by the radar device according to the first embodiment.

First, the first module $1\text{-}n_{MDL}$ radiates the transmission RF signal into space (step ST1). For example, the first transmission unit 10 included in the first module $1\text{-}n_{MDL}$ radiates the transmission RF signal into space. When an object exists in space, the transmission RF signal is reflected by this object and returned to the radar device. The first reception unit 11 included in the first module $1\text{-}n_{MDL}$ receives the reflection RF signal of the transmission RF signal and generates a reception beat signal from the reflection RF signal using the first local oscillation signal (step ST2).

Next, the first signal processor 12 detects a target candidate using the reception beat signal generated by the first reception unit 11 (step ST3). For example, the first signal processor 12 generates a first signal based on the distance and velocity of the target candidate for each transmission channel and each reception channel of the first module $1\text{-}n_{MDL}$ using the reception beat signal input from the first reception unit 11. The first signal processor 12 performs incoherent integration on the generated first signal, and calculates the distance and velocity of the target candidate on the basis of the intensity of the signal obtained by the incoherent integration.

Next, the first signal processor 12 performs coherent integration on the first signal regarding each target candidate for each transmission channel and each reception channel of the first module $1\text{-}n_{MDL}$ on the basis of the phase-of-arrival difference corresponding to the angle-of-arrival candidate of the target candidate (step ST4). This process corresponds to coherent integration between channels executed for all the signals corresponding to the bin in which the target candidate is detected in the first module $1\text{-}n_{MDL}$.

Next, the third module $3\text{-}n_{TxEx}$ radiates the transmission RF signal into space (step ST5). For example, the third transmission unit 30 included in the third module $3\text{-}n_{TxEx}$ radiates the transmission RF signal into space. However, in step ST5, the first transmission unit 10 included in the first module $1\text{-}n_{MDL}$ may radiate the transmission RF signal into space. In this case, the radar device according to the first embodiment may not include the third module $3\text{-}n_{TxEx}$.

Next, the first reception unit 11 included in the first module $1\text{-}n_{MDL}$ receives the reflection RF signal of the transmission RF signal transmitted by the third module $3\text{-}n_{TxEx}$, and generates a reception beat signal from the reflection RF signal using the first local oscillation signal. Further, the second reception unit 20 included in the second module $2\text{-}n_{RxEx}$ receives the reflection RF signal of the transmission RF signal transmitted by the third module $3\text{-}n_{TxEx}$, and generates a reception beat signal from the reflection RF signal using the second local oscillation signal that is synchronized with the first local oscillation signal. The processing described above is a process of step ST6.

The second signal processor 21 included in the second module $2\text{-}n_{RxEx}$ generates a second signal based on the distance and velocity of each target candidate for each transmission channel of the third module and each reception channel of the second module using the reception beat signal calculated from the reflection RF signal of the transmission RF signal transmitted by the third module $3\text{-}n_{TxEx}$. The second signal is output from the second module $2\text{-}n_{RxEx}$ to the first signal processor 12.

The first signal processor 12 generates a third signal based on the distance and velocity of each target candidate for each transmission channel of the third module $3\text{-}n_{TxEx}$ and each reception channel of the first module $1\text{-}n_{MDL}$, and performs coherent integration on the second signal obtained by the second module $2\text{-}n_{RxEx}$ and the generated third signal on the basis of the phase-of-arrival difference corresponding to the angle-of-arrival candidate of the target candidate (step ST7). In this way, coherent integration of the signal is performed between the first module $1\text{-}n_{MDL}$ and the second module $2\text{-}n_{RxEx}$ which are arranged in a distributed manner.

Finally, the first signal processor 12 calculates the angle of the target candidate using the signal obtained by the coherent integration for each target candidate (step ST8). Information regarding the angle of the target candidate calculated by the first signal processor 12 is displayed on the display 9.

Next, the details of the signal processing method according to the first embodiment will be described.

Figure 5:
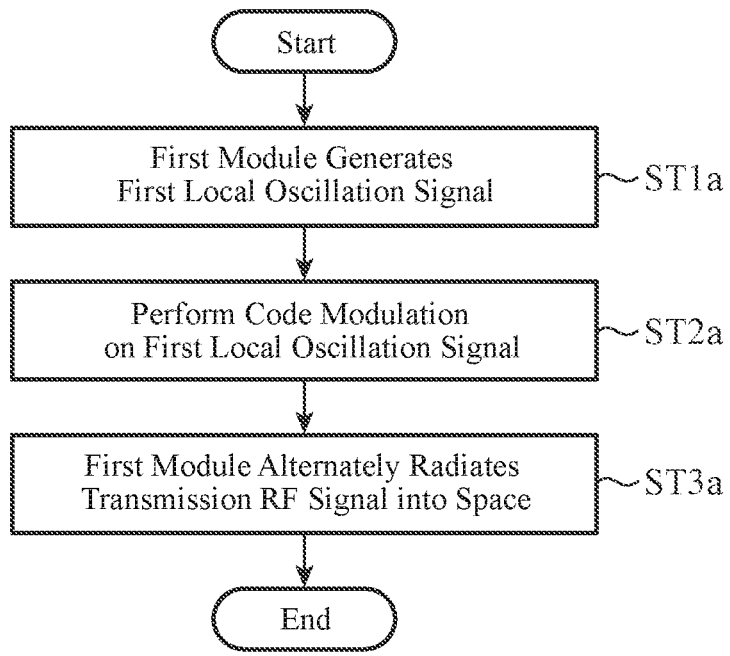
FIG. 5 is a flowchart showing a detailed process of step ST1 in FIG. 4.

FIG. 5 is a flowchart showing the process of step ST1 of FIG. 4 in detail. In the first module $1\text{-}n_{MDL}$, the first local oscillation signal generating unit 1-6-1 generates a first local oscillation signal $L_{1,nMDL}(n_{Tx},h,t)$, and outputs the generated first local oscillation signal $L_{1,nMDL}(n_{Tx},h,t)$ to the code modulation unit 1-5-1 and the receiver $1\text{-}8\text{-}n_{Rx,nMDL}$ (step ST1a).

The first local oscillation signal $L_{1,nMDL}(n_{Tx},h,t)$ is represented by Equation (1) below. In Equation (1) below, j is an imaginary unit. $n_{MDL}$ is the module number of the first module $1\text{-}n_{MDL}$, and $N_{MDL}$ is the number of the first modules $1\text{-}n_{MDL}$. In the first module 1-1 shown in FIG. 1, $n_{MDL}$ and $N_{MDL}$ are one. $n_{Tx}$ is the transmission channel number of the first module $1\text{-}n_{MDL}$, and $N_{Tx}$ is the number of transmission channels of the first module $1\text{-}n_{MDL}$. $n_{Tx}$ is one or two, and $N_{Tx}$ is two.

$$L_{1,nMDL}(n_{Tx}, h, t) = \begin{cases} A_L \exp\left(j\left[\begin{array}{c} 2\pi\left(f_0 t - \frac{B_0}{2T_0}t^2\right) + \\ \phi_{0,1,nMN,nTx} + \phi_{nis,1,nMDL,nTx}(t) \end{array}\right]\right), \\ \quad n_{Tx}T_{Tx} + hT_{clip} \leq t < n_{Tx}T_{Tx} + hT_{clip} + T_0 \\ 0, \text{ otherwise} \end{cases} \quad (1)$$

$(h = 0, 1, \ldots, H - 1)$ $(n_{Tx} = 0, 1, \ldots, N_{Tx} - 1)$ $(n_{MDL} = 0, 1, \ldots, N_{MDL} - 1)$ In Equation (1) above, $\varphi_{0,1,nMDL,nTx}$ is an initial phase of the first local oscillation signal in the transmission channel of the transmission channel number $n_{Tx}$ in the first module $1\text{-}n_{MDL}$. $\varphi_{nis,1,nMDL,nTx}(t)$ is the phase noise of the first local oscillation signal in the transmission channel of the transmission channel number $n_{Tx}$ of the first module $1\text{-}n_{MDL}$. h is a hit number, and H is the number of hits.

In Equation (1) above, $A_L$ is the amplitude of the first local oscillation signal, and $f_0$ is the transmission frequency of the transmission RF signal. $B_0$ is the modulation band of the transmission RF signal, $T_0$ is a modulation time, $T_1$ is the time until the next modulation, and t is time. $T_{chp}$ is a transmission repetition cycle of the transmission RF signal $1\text{-}1\text{-}n_{Tx}$, and can be expressed by Equation (2) below. $T_{Tx}$ is a transmission repetition cycle, and can be expressed by Equation (3) below.

$$T_{chp} = (N_{Tx} - 1)T_{Tx} \quad (2)$$

$$T_{Tx} = T_0 + T_1 \quad (3)$$

Next, the code modulation unit 1-5-1 performs code modulation on the first local oscillation signal $L_{1,nMDL}(n_{Tx},h,t)$ generated by the first local oscillation signal generating unit 1-6-1 (step ST2a). In this code modulation process, the code modulation unit 1-5-1 adds a code to the first local oscillation signal $L_{1,nMDL}(n_{Tx},h,t)$ to generate the transmission RF signal $Tx(n_{Tx},h,t)$ in the transmission channel of the transmission channel number $n_{Tx}$ in the first module 1-1. Due to the code modulation of the first local oscillation signal $L_{1,nMDL}(n_{Tx},h,t)$ in the transmission channel of the transmission channel number $n_{Tx}$ of the first module 1-1, interference between transmission channels and radio wave interference from the outside of the device are suppressed.

Code modulation in which a cyclic code that is a pseudo-random number is added will be described as one example of the code modulation.

The code modulation unit 1-5-1 cyclically shifts a cyclic code $C_0(h)$ set in advance by a cyclic shift amount $\Delta h(n_{Tx})$ set to the transmission channel of the transmission channel number $n_{Tx}$ in the first module 1-1 in accordance with Equation (4) below. Due to the cyclic shift described above, a modulation code $\text{Code}_1(n_{Tx},h)$ of the transmission channel of the transmission channel number $n_{Tx}$ in the first module 1-1 is generated. Note that an M sequence (maximal length sequence), a Gold sequence, or a Kasami sequence may be used for the cyclic code $C_0(h)$.

$\text{Code}_1(n_{Tx},h) = \text{Shift}(C_0(h), \Delta h(n_{Tx}))$ $(h = 0, 1, \ldots, H-1)$ $(n_{Tx} = 0, 1, \ldots, N_{Tx}-1)$ \quad (4)

Next, the code modulation unit 1-5-1 generates a transmission RF signal $Tx_{1,nMDL}(n_{Tx},h,t)$ in the transmission channel of the transmission channel number $n_{Tx}$ in accordance with Equation (5) below using the first local oscillation signal $L_{1,nMDL}(n_{Tx},h,t)$ and the modulation code $\text{Code}_{nMDL}(n_{Tx},h)$ of the transmission channel of the transmission channel number $n_{Tx}$ in the first module $1\text{-}n_{MDL}$. The transmission RF signal $Tx_{1,nMDL}(n_{Tx},h,t)$ generated by the code modulation unit 1-5-1 is output to the transmission switching unit 1-4-1.

$Tx_{1,nMDL}(n_{Tx}, h, t) = L_{1,nMDL}(n_{Tx}, h, t)\text{Code}_{nMDL}(n_{Tx}, h)$ \quad (5)

$(h = 0, 1, \ldots, H-1)$ $(n_{Tx} = 0, 1, \ldots, N_{Tx}-1)$ $(n_{MDL} = 0, 1, \ldots, N_{MDL}-1)$ The transmission switching unit $1\text{-}4\text{-}n_{Tx,nMDL}$ outputs the transmission RF signal $Tx_{1,nMDL}(n_{Tx},h,t)$ in the transmission channel of the transmission channel number $n_{Tx}$ in the first module $1\text{-}n_{MDL}$ to the transmitter $1\text{-}3\text{-}n_{Tx}$ in accordance with the transmission channel of the transmission channel number $n_{Tx}$ in the first module $1\text{-}n_{MDL}$. The transmitter $1\text{-}3\text{-}n_{Tx}$ outputs the transmission RF signal $Tx_{1,nMDL}(n_{Tx},h,t)$ input from the transmission switching unit $1\text{-}4\text{-}n_{Tx,nMDL}$ to the antenna $1\text{-}2\text{-}n_{Tx}$. The antenna $1\text{-}2\text{-}n_{Tx}$ radiates the transmission RF signal $Tx_{1,nMDL}(n_{Tx},h,t)$ corresponding to the transmission channel $n_{Tx}$ of the first module $1\text{-}n_{MDL}$ into space (step ST3a). In FIG. 1, $N_{Tx}$ is two, and therefore, the antenna 1-2-1 and the antenna 1-2-2 alternately radiate the transmission RF signal $Tx_{1,nMDL}(n_{Tx},h,t)$ into space.

Figure 6:
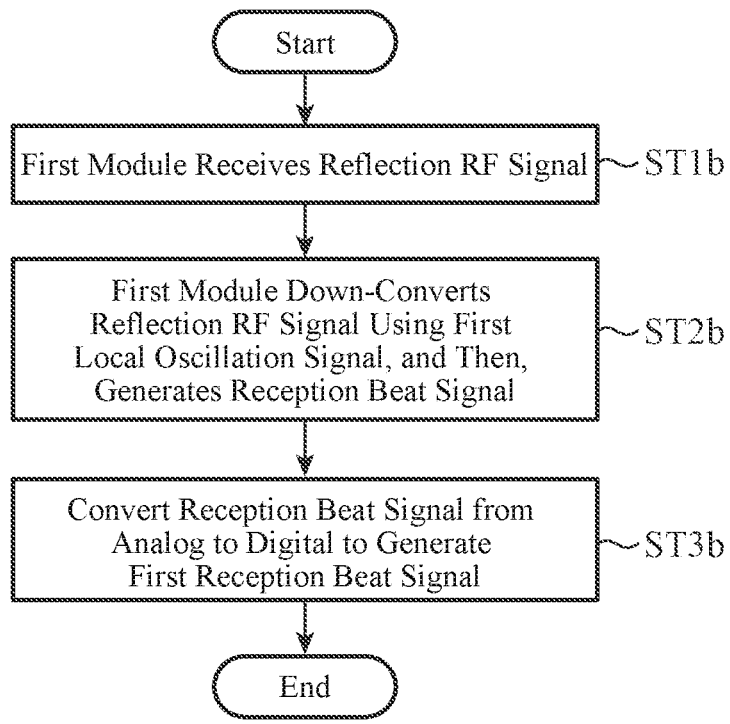
FIG. 6 is a flowchart showing a detailed process of step ST2 in FIG. 4.

FIG. 6 is a flowchart showing the process of step ST2 in FIG. 4 in detail.

The transmission RF signal radiated into space is reflected by a target existing in space and converted into a reflection RF signal A. The reflection RF signal A is incident on the antenna $1\text{-}7\text{-}n_{Rx,nMDL}$ of the first reception unit 11 included in the first module $1\text{-}n_{MDL}$. The antenna $1\text{-}7\text{-}n_{Rx,nMDL}$ receives the incident reflection RF signal A (step ST1b).

The reflection RF signal A received by the antenna $1\text{-}7\text{-}n_{Rx,nMDL}$ is output to the receiver $1\text{-}8\text{-}n_{Rx,nMDL}$ as a reception RF signal $Rx_{1,nMDL}(n_{Tx},n_{Rx},h,t)$ in the reception channel $n_{Rx,nMDL}$ in the first module $1\text{-}n_{MDL}$. The reception RF signal $Rx_{1,nMDL}(n_{Tx},n_{Rx},h,t)$ is represented by Equation (6) below. In Equation (6) below, $A_R$ is the amplitude of the reception RF signal. $R_0$ is an initial target relative distance which is the initial value of a relative distance of the target. v is a target relative velocity, and θ is a target angle. c is the speed of light, and t' is the time in one hit.

$$Rx_{1,n_{MDL}}(n_{Tc}, n_{Rx}, h, t) = \begin{cases} A_R \exp\left(j\left\{2\pi\left[f_0\left(t' - \frac{2(R_0 - vt)}{c}\right) - \frac{B_0}{2T_0}\left(t' - \frac{2(R_0 - vt)}{c}\right)^2\right] + \phi_{0,1,n_{MN},n_{Tx}} + \phi_{nis,1,n_{MDL},n_{Tx}}\left(t - \frac{2R_0}{c}\right)\right\}\right) \\ \quad \text{Code}_{n_{MDL}}(n_{Tx}, h)\exp(j\varphi_{Tx}(n_{MDL}, n_{Tx}))\exp(j\varphi_{Rx}(n_{MDL}, n_{Rx})), \\ \quad n_{Tx}T_{Tx} + hT_{clip} - \frac{2R_0}{c} \leq t < n_{Tx}T_{Ts} + hT_{clip} - \frac{2R_0}{c} + T_0 \\ 0, \text{ otherwise} \end{cases} \quad (6)$$

$(h = 0, 1, \ldots, H - 1)$ $(n_{Tx} = 0, 1, \ldots, N_{Tx} - 1)$ $(n_{Rx} = 0, 1, \ldots, N_{Rx,n_{MDL}} - 1)$ $(n_{MDL} = 0, 1, \ldots, N_{MDL} - 1)$ In Equation (6) above, $\varphi_{Tx}(n_{MDL}, n_{Tx})$ is a phase difference in the transmission channel of the transmission channel number $n_{Tx}$ in the first module $\mathbf{1}\text{-}n_{MDL}$, and can be expressed by Equation (7) below. $\varphi_{Rx}(n_{MDL}, n_{Rx}, n_{MDL})$ is a phase difference in the reception channel of the reception channel number $n_{Rx,n_{MDL}}$ in the first module $\mathbf{1}\text{-}n_{MDL}$, and can be expressed by Equation (8) below.

$$\varphi_{Tx}(n_{MDL}, n_{Tx}) = 2\pi f_0 \frac{d_{Tx}(n_{MDL}, n_{Tx})\sin\theta}{c} \quad (7)$$

$(n_{Tx} = 0, 1, \ldots, N_{Tx} - 1)$ $(n_{MDL} = 0, 1, \ldots, N_{MDL} - 1)$ $$\varphi_{Rx}(n_{MDL}, n_{Rx}) = 2\pi f_0 \frac{d_{Rx}(n_{MDL}, n_{Rx})\sin\theta}{c} \quad (8)$$

$(n_{Rx} = 0, 1, \ldots, N_{Rx,n_{MDL}} - 1)$ $(n_{MDL} = 0, 1, \ldots, N_{MDL} - 1)$ Next, the receiver $\mathbf{1}\text{-}8\text{-}n_{Rx,nMDL}$ down-converts the reception RF signal $Rx_{1,nMDL}(n_{Tx}, n_{Rx}, h, t)$ using the first local oscillation signal $L_{1,nMDL}(n_{Tx}, h, t)$ (step ST2$b$). Subsequently, the receiver $\mathbf{1}\text{-}8\text{-}n_{Rx,nMDL}$ filters the down-converted signal using a band filter, amplifies the intensity of the signal that has passed through the band filter, and detects the phase. With these processes, a reception beat signal $V'_{1,nMDL}(n_{Tx}, n_{Rx}, h, t)$ in the reception channel of the reception channel number $n_{Rx,nMDL}$ in the first module $\mathbf{1}\text{-}n_{MDL}$ is generated.

The reception beat signal $V'_{1,nMDL}(n_{Tx}, n_{Rx}, h, t)$ can be expressed by Equation (9) below, and is output to the analog-to-digital converter $\mathbf{1}\text{-}9\text{-}n_{Rx,nMDL}$ from the receiver $\mathbf{1}\text{-}8\text{-}n_{Rx,nMDL}$. In Equation (9) below, $A_V$ is the amplitude of the reception beat signal $V'_{1,nMDL}(n_{Tx}, n_{Rx}, h, t)$. $p_{nis}(M_{Tx,MDL}, M_{Rx,MDL})$ is phase noise. Further, $M_{Tx,MDL}$ is a module number of the module that has generated the first local oscillation signal for generating the transmission RF signal, and $M_{Rx,MDL}$ is the module number of the module that has generated the first local oscillation signal for down-converting the reception RF signal.

$$V'_{1,n_{MDL}}(n_{Tx}, n_{Rx}, h, t) = Rx_{1,n_{MDL}}(n_{Tx}, n_{Rx}, h, t)L^*_{1,n_{MDL}}(n_{Tx}, h, t) \quad (9)$$

$$= \begin{cases} A_V \exp\left(j\left\{2\pi\left[\begin{array}{c} -f_0\frac{2(R_0 - vt)}{c} - \frac{B_0}{2T_0} \\ \left(-\frac{4(R_0 - vt)}{c}t' + \frac{4(R_0 - vt)^2}{c^2}\right) \end{array}\right] + p_{nis}(M_{Tx,MDL}, M_{Rx,MDL}, t, R_0)\right\}\right) \\ \text{Code}_{n_{MDL}}(n_{Tx}, h)\exp(j\varphi_{Tx}(n_{MDL}, n_{Tx}))\exp(j\varphi_{Rx}(n_{MDL}, n_{Rx})), \\ n_{Tx}T_{Tx} + hT_{clip} - \frac{2R_0}{c} \leq t < n_{Tx}T_{Tx} + hT_{clip} - \frac{2R_0}{c} + T_0 \\ 0, \text{ otherwise} \end{cases}$$

$(h = 0, 1, \ldots, H - 1)$ $(n_{Tx} = 0, 1, \ldots, N_{Tx} - 1)$ $(n_{Rx} = 0, 1, \ldots, N_{Rx} - 1)$ $(n_{MDL} = 0, 1, \ldots, N_{MDL} - 1)$ $(M_{Tx,MDL} = 1)$ $(M_{rx,MDL} = 1)$ $p_{nis}(M_{Tx,MDL}, M_{Rx,MDL})$ which is the phase noise in the first transmission unit 10 and the first reception unit 11 in Equation (9) above is expressed by Equation (10) below.

$$p_{nis}(M_{Tx,MDL}, M_{Rx,MDL}, t, R_0) = \tag{10}$$

$$p_{nis}(1, 1, t, R_0) = \exp\left(j\left[\phi_{nis,1,n_{MDL},n_0}(t) - \phi_{nis,1,n_{MDL},n_{T_s}}\left(t - \frac{2R_0}{c}\right)\right]\right)$$

$(n_{MDL} = 1)$ $(n_{Tx} = 1, 2)$

Further, $p_{nis}(M_{Tx,MDL}, M_{Rx,MDL})$ which is the phase noise in the first transmission unit 10 and the second reception unit 20 is expressed by Equation (11) below.

$$p_{nis}(M_{Tx,MDL}, M_{Rx,MDL}, t, R_0) = \tag{11}$$

$$p_{nis}(1, 2, t, R_0) = \exp\left(j\left[\phi_{nis,3,n_{MDL},n_{Tx}}(t) - \phi_{nis,2,n_{RxEx},n_{Tx}}\left(t - \frac{2R_0}{c}\right)\right]\right)$$

$(n_{MDL} = 1)$ $(n_{RxEx} = 1)$ $(n_{Tx} = 1, 2)$

The analog-to-digital converter 1-9-$n_{Rx,nMDL}$ converts the reception beat signal $V'_{1,nMDL}(n_{Tx},n_{Rx},h,t)$ in the reception channel of the reception channel number $n_{Rx,nMDL}$ in the first module 1-$n_{MDL}$ into a digital signal from an analog signal, thereby generating a reception beat signal $V_{1,nMDL}(n_{Tx},n_{Rx},h,m)$ represented by Equation (12) below (step ST3$b$).

$$V_{1,n_{MDL}}(n_{Tx}, n_{Rx}, h, m) \cong \begin{cases} A\exp\left(-j2\pi f_0 \frac{2(R_0 - v(hT_{clip} + m\Delta t))}{c}\right) \\ \exp\left(j2\pi \frac{2B_0}{cT_0}(R_0 - vhT_{clip})m\Delta t\right) \\ \exp(p_{nix}(1, 1, t, R_0)) \\ \text{Code}_{n_{MDL}}(n_{Tx}, h)\exp(j\varphi_{Tx}(n_{MDL}, n_{Tx}))\exp(j\varphi_{Rx}(n_{MDL}, n_{Rx})), \\ n_{Tx}T_{Tx} + hT_{clip} - \frac{2R_0}{c} \le t < n_{Tx}T_{Tx} + hT_{clip} - \frac{2R_0}{c} + T_0 \\ 0, \text{otherwise} \end{cases} \tag{12}$$

$(m = 0, 1, \ldots, M-1)$ $(h = 0, 1, \ldots, H-1)$ $(n_{Tx} = 0, 1, \ldots, N_{Tx}-1)$ $(n_{Rx} = 0, 1, \ldots, N_{Rx}-1)$ $(n_{MDL} = 0, 1, \ldots, N_{MDL}-1)$ Here, the reception beat signal $V_{1,nMDL}(n_{Tx},n_{Rx},h,m)$ is the first reception beat signal in the reception channel of the reception channel number $n_{Rx,nMDL}$ in the first module 1-$n_{MDL}$. The first reception beat signal is the first reception signal used to detect the target. In Equation (12) above, $\Delta t$ is a sampling interval in the modulation time $T_0$. m is the sampling number of the reception beat signal sampled within the modulation time $T_0$. M is the number of samples of the reception beat signal within the modulation time $T_0$. In Equation (12) above, the terms including $\Delta t^2$ and $1/c^2$ are expressed approximately.

FIG. 7 is a flowchart showing the process of steps ST3 and ST4 in FIG. 4 in detail. The first separation unit 120 included in the first signal processor 12 demodulates the first reception beat signal in accordance with Equation (13) below using the modulation code Code$_1$($n_{Tx}$,h) set for the transmission channel of the transmission channel number $n_{Tx}$ in the first module 1-$n_{MDL}$. The demodulated first reception beat signal is separated into signals for each transmission channel and each reception channel in the first module 1-$n_{MDL}$ (step ST1$c$). As a result, a reception beat signal $V_{1,nMDL,C}(n_{Tx},n_{Rx},h,m)$ corresponding to the transmission channel number $n_{Tx}$ and the reception channel number $n_{Rx}$ in the first module 1-$n_{MDL}$ is generated, and the generated reception beat signal $V_{1,nMDL,C}(n_{Tx},n_{Rx},h,m)$ is output to the first signal generating unit 121.

$$V_{1,n_{MDL},C}(n_{Tx},n_{Rx}, h, m) = V_{1,n_{MDL}}(n_{Tx}, n_{Rx}, h, m)\text{Code}_{n_{MDL}}(n_{Tx}, h) \tag{13}$$

Figure 8B:
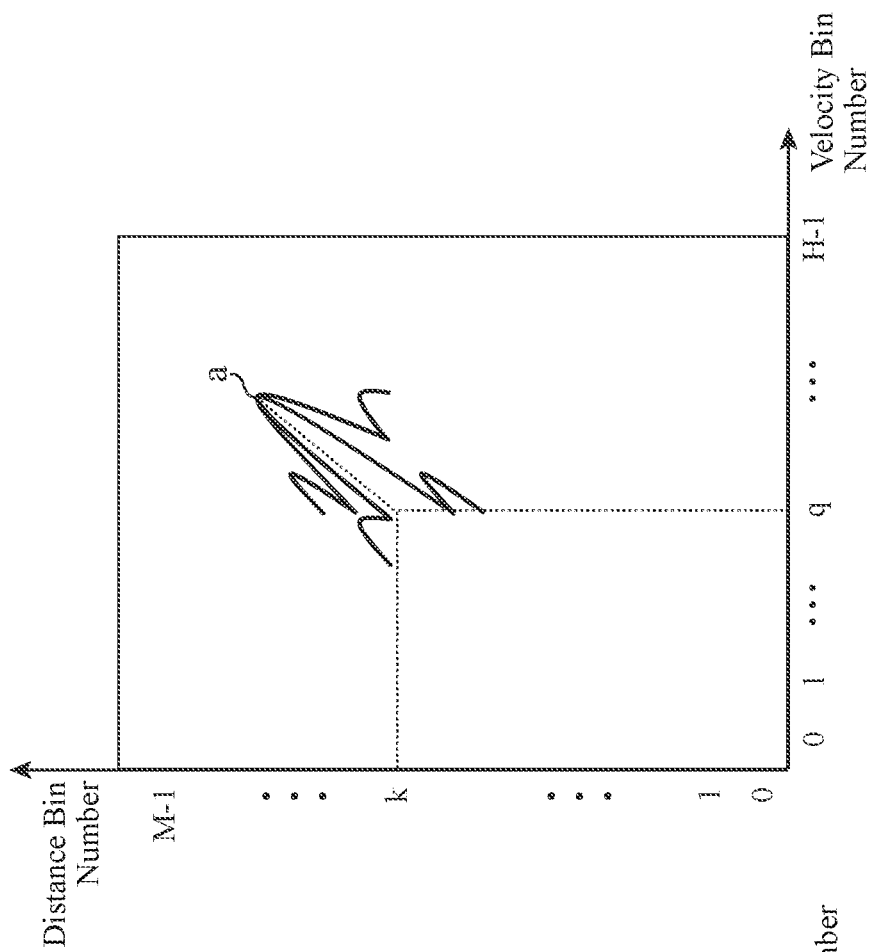
FIG. 8B is a diagram showing a relationship between a distance bin number and a velocity bin number of a first signal based on distance and velocity.
Figure 8A:
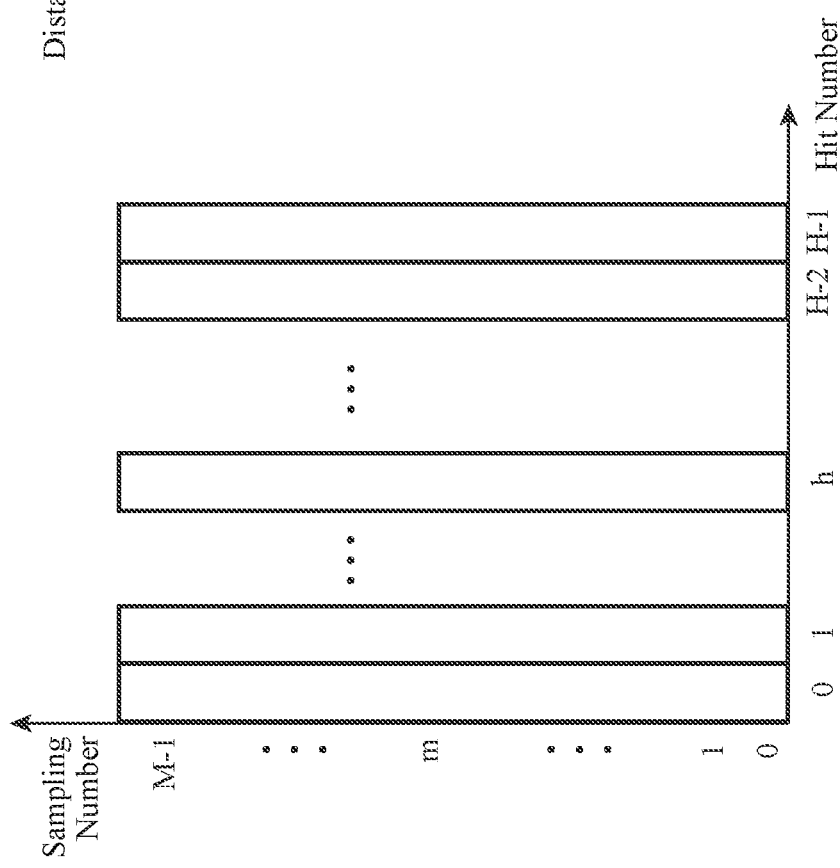
FIG. 8A is a diagram showing a relationship between a sampling number and a hit number of a demodulated reception beat signal.

$(m = 0, 1, \ldots, M-1)$ $(h = 0, 1, \ldots, H-1)$ $(n_{Tx} = 0, 1, \ldots, N_{Tx,n_{MDL}} - 1)$ $(n_{Rx}0, 1, \ldots, N_{Rx,n_{MDL}} - 1)$ $(n_{MDL} = 0, 1, \ldots, N_{MDL} - 1)$ Next, the first signal generating unit 121 performs discrete Fourier transform on the reception beat signal $V_{1,nMDL,C}(n_{Tx},n_{Rx},h,m)$ demodulated by the first separation unit 120, thereby generating a first signal based on the distance and velocity of the target candidate for each transmission channel and each reception channel in the first module 1-$n_{MDL}$ (step ST2$c$). For example, when $n_{MDL}$ is 1, the first signal generating unit 121 performs the discrete Fourier transform in accordance with Equation (14) below. Thus, the first signal $f_{b,1,nMDL}(n_{Tx},n_{Rx},q,k)$ corresponding to the transmission channel number $n_{Tx}$ and the reception channel number $n_{Rx}$ in the first module 1-1 is generated. q is the velocity bin number and k is the distance bin number. FIG. 8A is a diagram showing a relationship between the sampling number and the hit number of the demodulated reception beat signal $V_{1,nMDL,C}(n_{Tx},n_{Rx},h,m)$. FIG. 8B is a diagram showing a relationship between the distance bin number and the velocity bin number of the first signal $f_{b,1,nMDL}(n_{Tx},n_{Rx},q,k)$ based on the distance and velocity. As shown in FIGS. 8A and 8B and the following Equation (14), the first signal based on the distance and velocity from which distance information and velocity information of a target candidate a can be acquired is generated by discrete Fourier transform of the reception beat signals of the sampling number m and the hit number h. Further, in the radar device according to the first embodiment, the signal to noise ratio (SNR) is improved by 10 $\log_{10}$ (HM), and thus, the performance for detecting the target is improved. Fast Fourier transform (FFT) may be used instead of discrete Fourier transform. When FFT is used, it is possible to reduce the calculation and increase speed, whereby a radar device with low cost and shortened processing time can be obtained.

$$f_{b1,n_{MDL}}(n_{Tx}, n_{Rx}, q, k) = \sum_{h=0}^{H-1} \left[ \sum_{m=0}^{M-1} V_{1,n_{MDL}}(n_{Tx}, n_{Rx}, h, m) \exp\left(-j2\pi \frac{m}{M} k\right) \right] \exp\left(-j2\pi \frac{h}{H} q\right) \tag{14}$$

$(k = 0, 1, \ldots, M - 1)$ $(q = 0, 1, \ldots, H - 1)$ $(n_{Rx} = 0, 1, \ldots, N_{Rx,nMDL} - 1)$ $(n_{Tx} = 0, 1, \ldots, N_{Tx,nMDL} - 1)$ $(n_{MDL} = 0, 1, \ldots, N_{MDL} - 1)$ Next, the incoherent integration unit 122 performs incoherent integration on the first signal generated by the first signal generating unit 121 (step ST3c). For example, when $n_{MDL}$ is 1, the incoherent integration unit 122 performs incoherent integration in accordance with Equation (15) below on the first signal $f_{b,1,nMDL}(n_{Tx},n_{Rx},q,k)$ corresponding to the transmission channel number $n_{Tx}$ and the reception channel number $n_{Rx}$ in the first module 1-1. A signal $f_{b,1,nMDL,inch}(q,k)$ is generated by this incoherent integration, and the generated signal $f_{b,1,nMDL,inch}(q,k)$ is output to the target candidate detecting unit 123 from the incoherent integration unit 122.

Figure 9B:
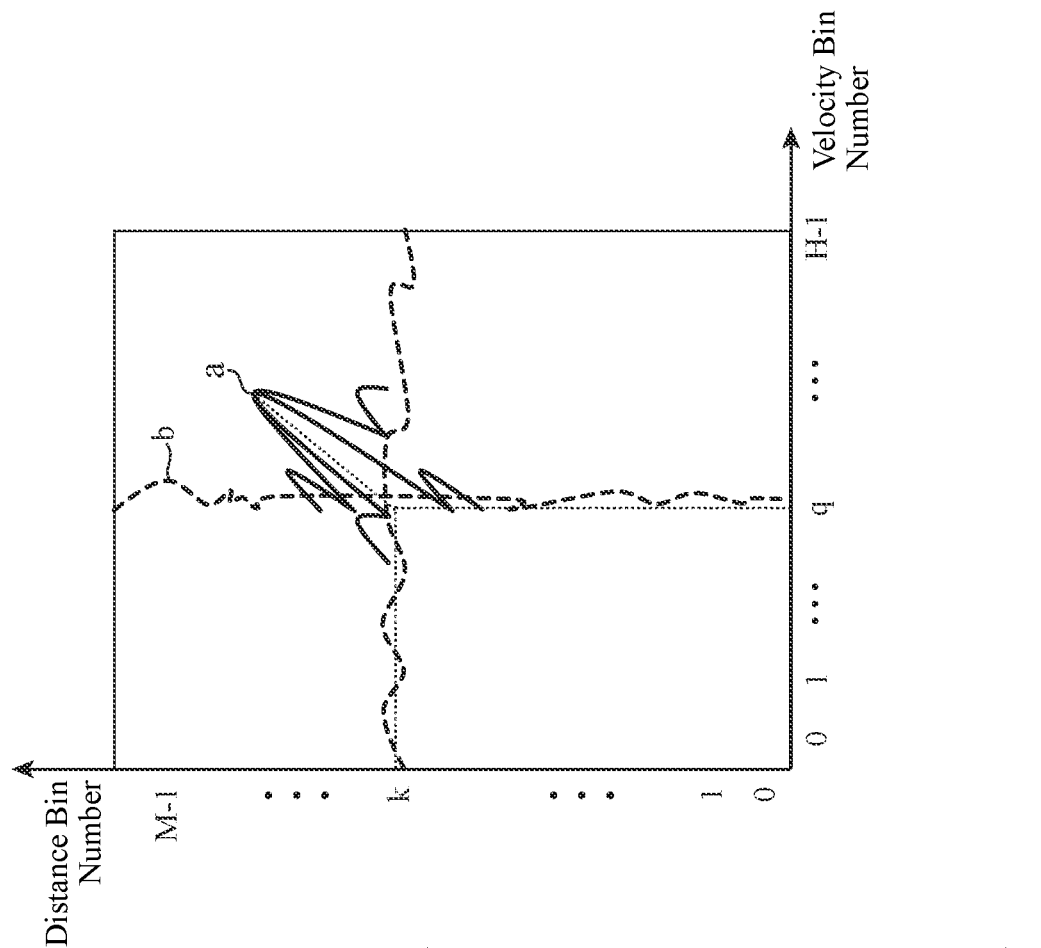
FIG. 9B is a diagram showing a relationship between the distance bin number and the velocity bin number of the first signal which has been subjected to incoherent integration.
Figure 9A:
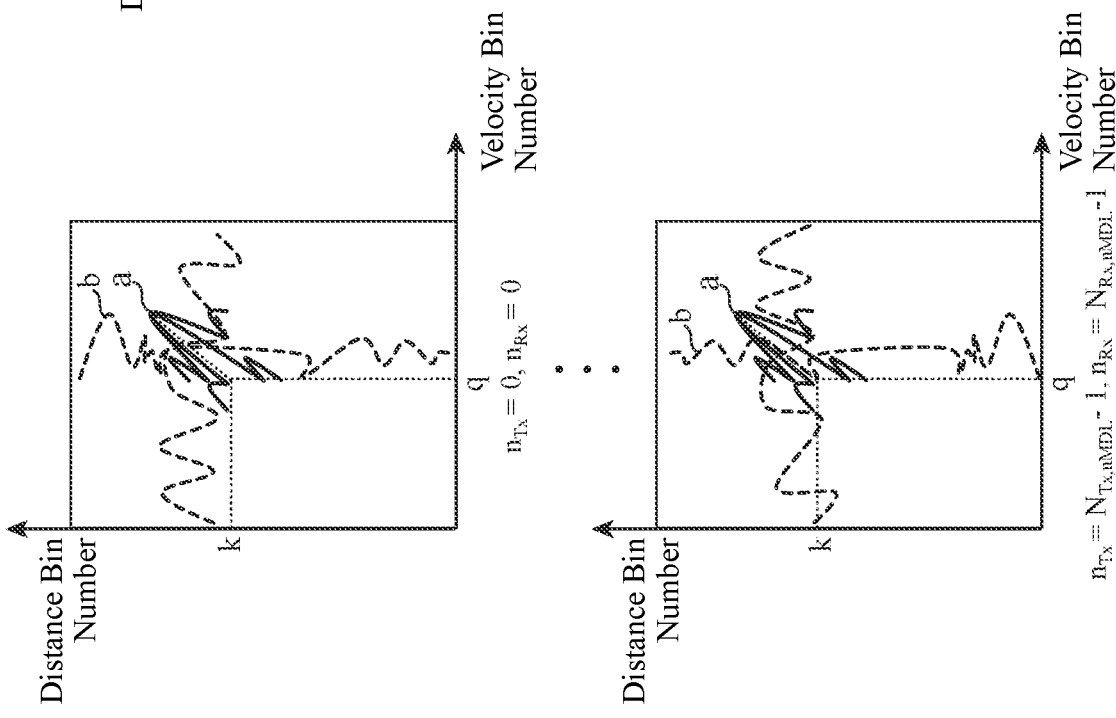
FIG. 9A is a diagram showing a relationship between a distance bin number and a velocity bin number of the first signal based on distance and velocity for each transmission channel number $n_{Tx}$ and each reception channel number $n_{Rx}$.

FIG. 9A is a diagram showing a relationship between the distance bin number and the velocity bin number of the first signal $f_{b,1,nMDL}(n_{Tx},n_{Rx},q,k)$ based on the distance and velocity for each transmission channel number $n_{Tx}$ and each reception channel number $n_{Rx}$. The first signal $f_{b,1,nMDL}(n_{Tx},n_{Rx},q,k)$ corresponding to the transmission channel number $n_{Tx}$ and the reception channel number $n_{Rx}$ shown in FIG. 9A is input to the incoherent integration unit 122. The first signal is a signal based on the distance and velocity of the target candidate a. A noise component b is superimposed on the first signal. FIG. 9B is a diagram showing a relationship between the distance bin number and the velocity bin number of the first signal $f_{b,1,nMDL,inch}(q,k)$ which has been subjected to incoherent integration. As represented by Equation (15) below, the incoherent integration unit 122 integrates powers, that is, intensities, of a plurality of first signals $f_{b,1,nMDL}(n_{Tx},n_{Rx},q,k)$. Thus, a radar device in which the noise component b is averaged as shown in FIG. 9B and the target detection performance is improved can be obtained.

$$F_{b,1,n_{MDL},inch}(q, k) = \sum_{n_{Tx}=0}^{N_{txMDL}-1} \sum_{n_{Rx}=0}^{N_{txMDL}-1} |f_{b,1,n_{MDL}}(n_{Tx}, n_{Rx}, q, k)|^2 \tag{15}$$

$(k = 0, 1, \ldots, M - 1)$

-continued $(q = 0, 1, \ldots, H - 1)$ $(n_{MDL} = 0, 1, \ldots, N_{MDL} - 1)$

The target candidate detecting unit 123 calculates the distance and velocity of the target candidate on the basis of the signal intensity of the signal $f_{b,1,nMDL,inch}(q,k)$ obtained by the incoherent integration (step ST4c). For example, cell average constant false alarm rate (CA-CFAR) processing can be used for detecting target candidate. The target candidate detecting unit 123 specifies the first signal $f_{b,1,nMDL}$ $(n_{Tx},n_{Rx},q_{ntgt},k_{ntgt})$ of the transmission channel $n_{Tx}$ and the reception channel $n_{Rx}$ in the first module 1-$n_{MDL}$, the velocity bin number $q_{ntgt}$ which is the sampling number in the velocity direction, and the distance bin number $k_{ntgt}$ which is the sampling number in the distance direction, all of which correspond to the target candidate of the target candidate number $n_{tgt}$, and outputs them to the first coherent integration unit 124 and the second signal processor 21 in the second module 2-$n_{RxEx}$. The target candidate number $n_{tgt}$ is a serial number assigned to each target candidate.

The first coherent integration unit 124 performs coherent integration between channels on the first signal corresponding to the target candidate of the target candidate number $n_{tgt}$ in accordance with Equation (16) below on the basis of the phase-of-arrival difference corresponding to the angle-of-arrival candidate of the target candidate (step ST5c). Note that, in a case where there is an influence of Doppler frequency between transmission channels, that is, an influence of target movement, the first coherent integration unit 124 performs the process represented by Equation (16) below after suppressing the influence using the velocity corresponding to the velocity bin number $q_{ntgt}$ of the target candidate number $n_{tgt}$. The first coherent integration unit 124 generates a signal $R_{1,ch}(n_\theta,q_{ntgt},k_{ntgt})$ corresponding to the target candidate with the target candidate number $n_{tgt}$ by performing coherent integration between channels for the first signal $f_{b,1,nMDL}(n_{Tx},n_{Rx},q_{ntgt},k_{ntgt})$. The signal $R_{1,ch}(n_\theta, q_{ntgt},k_{ntgt})$ is output from the first coherent integration unit 124 to the display 9, and displayed by the display 9.

$$R_{1,ch}(n_\theta, q_{n_{tgt}}, k_{n_{tgt}}) = \tag{16}$$

$$\sum_{n_{MDL}=0}^{N_{MDL}-1} \sum_{n_{Tx}=0}^{N_{Tx}-1} \sum_{n_{Rx}=0}^{N_{RxMDL}-1} \left[ \begin{array}{l} b_{f,1,n_{MDL}}(n_{Tx}, n_{Rx} q_{n_{tgt}}, k_{n_{tgt}}) \\ \exp(-j\varphi'_{Tx}(n_{MDL}, n_{Tx}, n_\theta)) \\ \exp(-j\varphi'_{Rx}(n_{MDL}, n_{Rx}, n_\theta)) \end{array} \right]$$

$(n_\theta = 0, 1, \ldots, N_\theta - 1)$ $(n_{tgt} = 0, 1, \ldots, N_{tgt} - 1)$ In Equation (16) above, $N_{74}$ is the number of assumed target angles, and $n_\theta$ is the target angle number assigned to each of the assumed target angles. Further, $\varphi'_{Tx}(n_{MDL},n_{Tx},n_\theta)$ is the phase difference in the transmission channel of the transmission channel number $n_{Tx}$ in the first module 1-$n_{MDL}$ with respect to the target angle of the target angle number $n_\theta$, and is expressed by Equation (17) below. Further, $\varphi'_{Rx}$ $(n_{MDL},n_{Rx,nMDL},n_\theta)$ is the phase-of-arrival difference in the reception channel of the reception channel number $n_{Rx,nMDL}$ in the first module 1-$n_{MDL}$ with respect to the target angle of the target angle number $n_\theta$, and is expressed by Equation (18) below.

$$\varphi'_{Tx}(n_{MDL}, n_{Tx}, n_\theta) = 2\pi f_0 \frac{d_{Tx}(n_{MDL}, n_{Tx})\sin\theta'_{n_\theta}}{c} \quad (17)$$

$(n_\theta = 0, 1, \ldots, N_\theta - 1)$ $(n_{Tx} = 0, 1, \ldots, N_{Tx} - 1)$ $(n_{MDL} = 0, 1, \ldots, N_{MDL} - 1)$ $$\varphi'_{Rx}(n_{MDL}, n_{Rx}, n_\theta) = 2\pi f_0 \frac{d_{Rx}(n_{MDL}, n_{Rx})\sin\theta'_{n_\theta}}{c} \quad (18)$$

$(n_\theta = 0, 1, \ldots, N_\theta - 1)$ $(n_{Rx} = 0, 1, \ldots, N_{Rx} - 1)$ $(n_{MDL} = 0, 1, \ldots, N_{MDL} - 1)$ In Equations (16) to (18) above, when the target angle θ and the target angle θ'$_{n\theta}$ of the target angle number $n_\theta$ match, the signal $R_{1,ch}(n_\theta, q_{ntgt}, k_{ntgt})$ for the target candidate of the target candidate number $n_{tgt}$ is coherently integrated, and the signal power shows the maximum value. That is, by coherently integrating the signal for each transmission channel and each reception channel in the first module $1\text{-}n_{MDL}$, the power of the signal after coherent integration is increased. Therefore, a radar device having improved target detection performance can be obtained by using the signal.

Figure 10A:
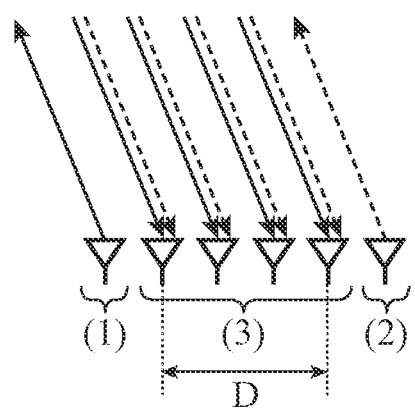
FIG. 10A is a diagram showing a relationship between transmission channels and reception channels in actual antenna arrangement.
Figure 10B:
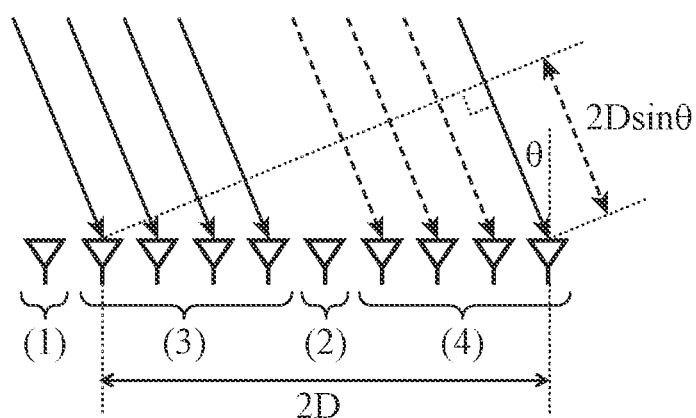
FIG. 10B is a diagram showing a relationship between transmission channels and reception channels when actual antenna arrangement and virtual antenna arrangement are taken into consideration.

FIG. 10A is a diagram showing a relationship between transmission channels and reception channels in actual antenna arrangement. Further, FIG. 10B is a diagram showing a relationship between transmission channels and reception channels when actual antenna arrangement and virtual antenna arrangement are taken into consideration. In FIGS. 10A and 10B, an antenna (1) and an antenna (2) are antennas included in the first transmission unit 10, and correspond to the transmission channels. Further, antennas (3) are antennas included in the first reception unit 11, and correspond to reception channels. As shown in FIG. 10A, the antenna aperture length is D in the actual array in which the antennas (3) are actually arranged.

The first signal processor 12 coherently integrates the signal for each transmission channel and each reception channel in the first module 1-1, by which virtual reception channels (4) are formed. As a result, the antenna aperture length of the first module 1-1 is virtually increased from D to 2D. In FIG. 10B, 2D sin θ is the phase difference between the channels.

The case where the discrete Fourier transform in accordance with the above Equation (16) is performed on the first signal corresponding to the target candidate of the target candidate number $n_{tgt}$ has been described above. However, the embodiment is not limited thereto. For example, instead of the discrete Fourier transform, a fast Fourier transform (FFT), multiple signal classification (MUSIC), or estimation of signal parameters via rotational invariance technique (ESPRIT) may be performed.

Further, although the above Equation (16) is described as a far field, integration may be performed as a near field in a case where received waves cannot be approximated as plane waves due to a large aperture.

Figure 11:
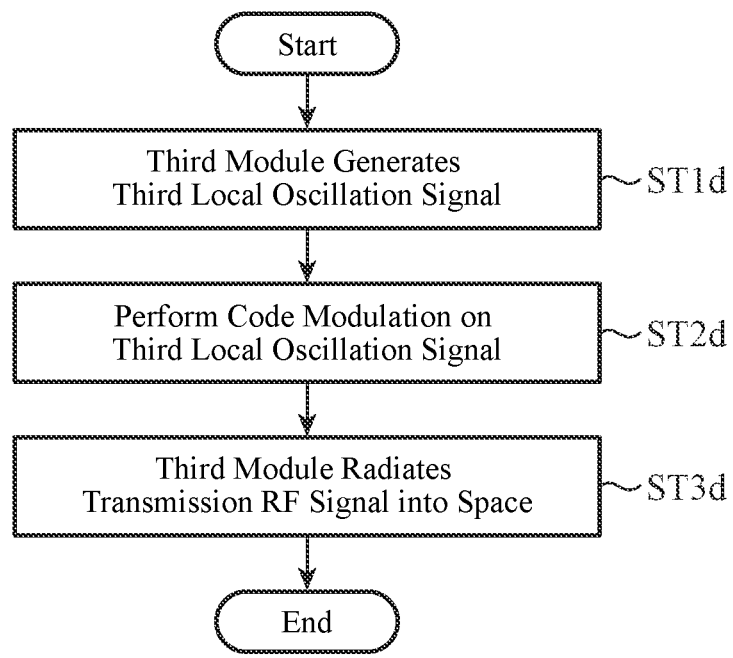
FIG. 11 is a flowchart showing a detailed process of step ST5 in FIG. 4.

FIG. 11 is a flowchart showing the process of step ST5 in FIG. 4 in detail. In the following, a case where the third module $3\text{-}n_{TxEx}$ transmits the transmission RF signal will be described.

In the third module $3\text{-}n_{TxEx}$, the third local oscillation signal generating unit $3\text{-}6\text{-}n_{TxEx}$ generates a third local oscillation signal (step ST1d). The third local oscillation signal is synchronized with the first local oscillation signal. In FIG. 1, $n_{TxEx}$ is 1.

The code modulation unit $3\text{-}5\text{-}n_{TxEx}$ performs code modulation on the third local oscillation signal generated by the third local oscillation signal generating unit $3\text{-}6\text{-}n_{TxEx}$ (step ST2d). In this code modulation process, the code modulation unit $3\text{-}5\text{-}n_{TxEx}$ adds a code to the third local oscillation signal to generate a transmission RF signal $Tx_{3,nTxEx}(h,t)$ in the transmission channel of the transmission channel number $n_{Tx}$ in the third module $3\text{-}n_{TxEx}$.

The transmitter $3\text{-}3\text{-}n_{TxEx}$ outputs the transmission RF signal input from the code modulation unit $3\text{-}5\text{-}n_{TxEx}$ to the antenna $3\text{-}2\text{-}n_{TxEx}$. The antenna $3\text{-}2\text{-}n_{TxEx}$ radiates the transmission RF signal into space (step ST3d). In FIG. 1, the antenna 3-2-1 radiates the transmission RF signal into space.

Here, the transmission timing of the transmission RF signal by the first module $1\text{-}n_{MDL}$ and the third module $3\text{-}n_{TxEx}$ will be described.

FIG. 12A is a diagram showing the transmission timing of the transmission RF signal in the transmission channel of the transmission channel number $n_{Tx}=1$ of the first module 1-1. FIG. 12B is a diagram showing the transmission timing of the transmission RF signal in the transmission channel of the transmission channel number $n_{Tx}=2$ of the first module 1-1. In step ST1 of FIG. 4, the first transmission unit 10 included in the first module 1-1 transmits the transmission RF signal using the antenna 1-2-1 corresponding to the transmission channel number $n_{Tx}=1$ and the transmission RF signal using the antenna 1-2-2 corresponding to the transmission channel number $n_{Tx}=2$ at the transmission timings shown in FIGS. 12A and 12B, for example. The first module 1-1 alternately transmits the transmission RF signal in a time division manner, so that the transmission RF signal has a signal waveform having high orthogonality as shown in FIGS. 12A and 12B. Further, the code modulation unit 1-5-1 performs different code modulation between the transmission RF signal corresponding to the transmission channel number $n_{Tx}=1$ and the transmission RF signal corresponding to the transmission channel number $n_{Tx}=2$, whereby performance for suppressing interference wave is enhanced.

FIG. 12C is a diagram showing the transmission timing of the transmission RF signal by the third module 3-1. FIG. 12D is a diagram showing the transmission timing of the transmission RF signal by the third module 3-2. In FIGS. 12C and 12D, the number of transmission channels $N_{Tx,nTxEx}$ in the third transmission unit 30 is one, and the number of modules $n_{TxEx}$ is two. In step ST5 of FIG. 4, the third transmission unit 30 included in the third module 3-1 transmits the transmission RF signal using the antenna 3-2-1 at the transmission timing shown in FIG. 12C, for example. Subsequently, the third transmission unit 30 included in the third module 3-2 transmits the transmission RF signal using the antenna 3-2-1 at the transmission timing shown in FIG. 12D, for example. The third module 3-1 and the third module 3-2 alternately transmit the transmission RF signal in a time-division manner as described above, so that the transmission RF signal has a signal waveform having high orthogonality as shown in FIGS. 12C and 12D. Further, the code modulation unit $3\text{-}5\text{-}n_{TxEx}$ performs different code modulation between the third module 3-1 and the third module 3-2, whereby performance for suppressing interference wave is enhanced.

Although FIGS. 12A to 12D show the case where four transmission RF signals are transmitted in a time-division manner, the first transmission unit 10 and the third transmission unit 30 may transmit a plurality of transmission RF signals by code division. In this case, the transmission RF signals are converted into separable signals by code modulation and then simultaneously transmitted. However, since the cross-correlation of the reception signals spreads in the target velocity direction, a sufficient number of chirps is required. In addition, although FIGS. 12A to 12D show the case where four transmission RF signals are transmitted in a time-division manner, the first transmission unit 10 and the third transmission unit 30 may transmit a plurality of transmission RF signals by frequency division. In this case, the transmission RF signals are converted into signals using frequency bands that can be separated from each other, and then simultaneously transmitted. Note that, as a method for separating a plurality of transmission RF signals, time division, code division, and frequency division may be appropriately combined and used.

Figure 13A:
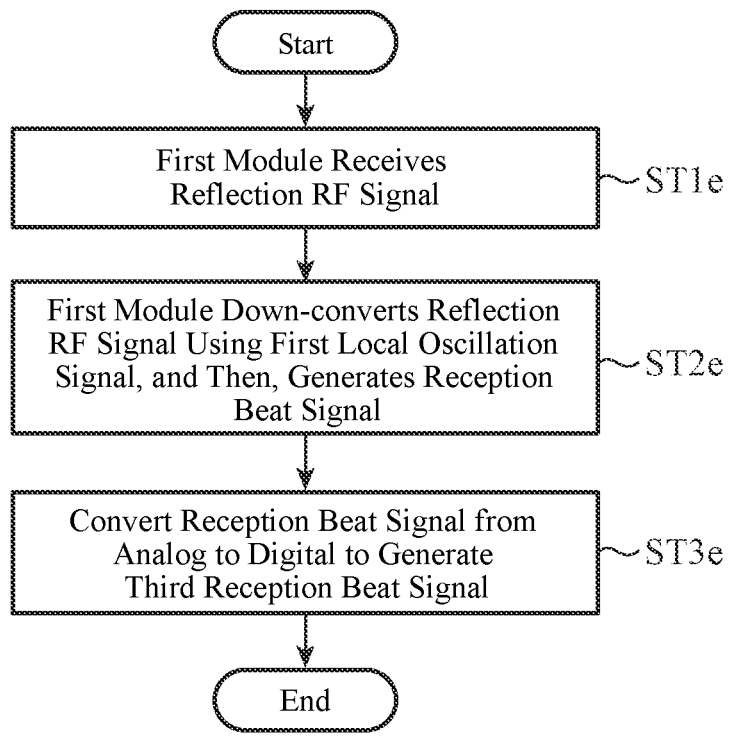
FIG. 13A is a flowchart showing a process of step ST6 in FIG. 4 by the first module.

FIG. 13A is a flowchart showing the process of step ST6 in FIG. 4 by the first module $1\text{-}n_{MDL}$. The transmission RF signal radiated into space by the third module $3\text{-}n_{TxEx}$ is reflected by a target existing in space and converted into a reflection RF signal A. The reflection RF signal A is incident on the antenna $1\text{-}7\text{-}n_{Rx,nMDL}$ of the first reception unit 11 included in the first module $1\text{-}n_{MDL}$. The antenna $1\text{-}7\text{-}n_{Rx,nMDL}$ receives the incident reflection RF signal A (step ST1e). The reflection RF signal A received by the antenna $1\text{-}7\text{-}n_{Rx,nMDL}$ is output to the receiver $1\text{-}8\text{-}n_{Rx,nMDL}$ as a reception RF signal in the reception channel $n_{Rx,nMDL}$ in the first module $1\text{-}n_{MDL}$.

The receiver $1\text{-}8\text{-}n_{Rx,nMDL}$ down-converts the reception RF signal using the first local oscillation signal (step ST2e). Subsequently, the receiver $1\text{-}8\text{-}n_{Rx,nMDL}$ filters the down-converted signal using a band filter, amplifies the intensity of the signal that has passed through the band filter, and detects the phase. With these processes, a reception beat signal in the reception channel of the reception channel number $n_{Rx,nMDL}$ in the first module $1\text{-}n_{MDL}$ is generated. The reception beat signal is output to the analog-to-digital converter $1\text{-}9\text{-}n_{Rx,nMDL}$ from the receiver $1\text{-}8\text{-}n_{Rx,nMDL}$.

The analog-to-digital converter $1\text{-}9\text{-}n_{Rx,nMDL}$ converts the reception beat signal in the reception channel of the reception channel number $n_{Rx,nMDL}$ in the first module $1\text{-}n_{MDL}$ into a digital signal from an analog signal, thereby generating a reception beat signal $V_{1,nMDL}(3, n_{Tx}, n_{Rx}, h, m)$ (step ST3e). The reception beat signal $V_{1,nMDL}(3, n_{Tx}, n_{Rx}, h, m)$ is a third reception beat signal in the reception channel of the reception channel number $n_{Rx,nMDL}$ in the first module $1\text{-}n_{MDL}$. In order to indicate that the third reception beat signal is generated using the reflection RF signal of the transmission RF signal transmitted from the third module $3\text{-}n_{TxEx}$, the reception beat signal $V_{1,nMDL}(3, n_{Tx}, n_{Rx}, h, m)$ represented by the above Equation (12) is expressed as reception beat signal $V_{1,nMDL}(3, n_{Tx}, n_{Rx}, h, m)$.

Figure 13B:
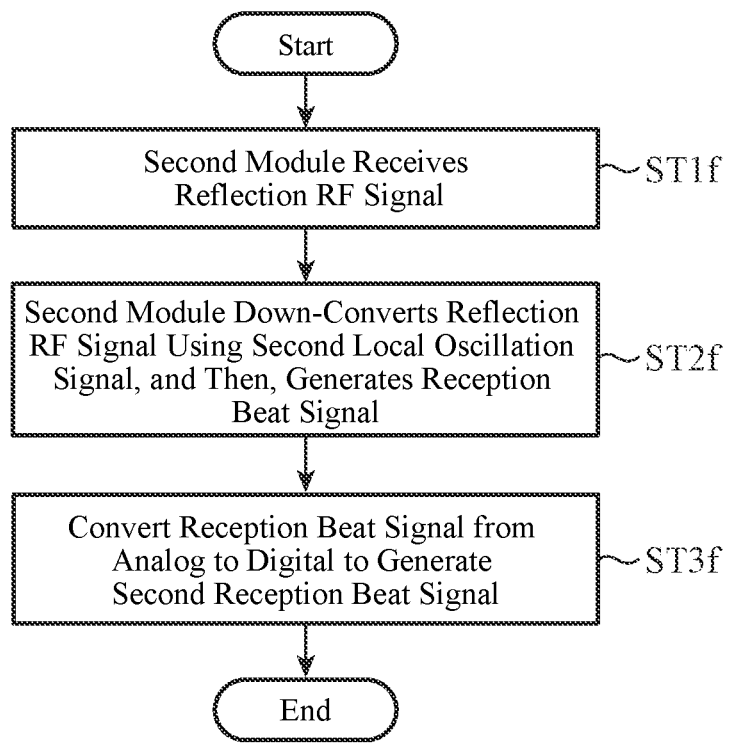
FIG. 13B is a flowchart showing a process of step ST6 in FIG. 4 by the second module.

FIG. 13B is a flowchart showing the process of step ST6 in FIG. 4 by the second module $2\text{-}n_{RxEx}$. The reflection RF signal A of the transmission RF signal radiated into space by the third module $3\text{-}n_{TxEx}$ is incident on the antenna $2\text{-}7\text{-}n_{Rx,nRxEx}$ in the second reception unit 20 included in the second module $2\text{-}n_{RxEx}$. The antenna $2\text{-}7\text{-}n_{Rx,nRxEx}$ receives the incident reflection RF signal A (step ST1f). The reflection RF signal A received by the antenna $2\text{-}7\text{-}n_{Rx,nRxEx}$ is output to the receiver $2\text{-}8\text{-}n_{Rx,nRxEx}$ as a reception RF signal in the reception channel $n_{Rx,nRxEx}$ in the second module $2\text{-}n_{RxEx}$.

The receiver $2\text{-}8\text{-}n_{Rx,nRxEx}$ down-converts the reception RF signal using the second local oscillation signal (step ST2f). Subsequently, the receiver $2\text{-}8\text{-}n_{Rx,nRxEx}$ filters the down-converted signal using a band filter, amplifies the intensity of the signal that has passed through the band filter, and detects the phase. With these processes, a reception beat signal in the reception channel of the reception channel number $n_{Rx,nRxEx}$ in the second module $2\text{-}n_{RxEx}$ is generated. The reception beat signal is output to the analog-to-digital converter $2\text{-}9\text{-}n_{Rx,nRxEx}$ from the receiver $2\text{-}8\text{-}n_{Rx,nRxEx}$.

The analog-to-digital converter $2\text{-}9\text{-}n_{Rx,nRxEx}$ converts the reception beat signal in the reception channel of the reception channel number $n_{Rx,nRxEx}$ in the second module $2\text{-}n_{RxEx}$ into a digital signal from an analog signal, thereby generating a reception beat signal $V_{2,nRxEx}(3, n_{Tx}, n_{Rx}, h, m)$ (step ST3f). The reception beat signal $V_{2,nRxEx}(3, n_{Tx}, n_{Rx}, h, m)$ is a second reception beat signal in the reception channel of the reception channel number $n_{Rx,nRxEx}$ in the second module $2\text{-}n_{RxEx}$. In order to indicate that the second reception beat signal is generated by the second module $2\text{-}n_{RxEx}$ using the reflection RF signal of the transmission RF signal transmitted from the third module $3\text{-}n_{TxEx}$, the reception beat signal $V_{1,nMDL}(3, n_{Tx}, n_{Rx}, h, m)$ represented by the above Equation (12) is expressed as reception beat signal $V_{2,nRxEx}(3, n_{Tx}, n_{Rx}, h, m)$.

Figure 14:
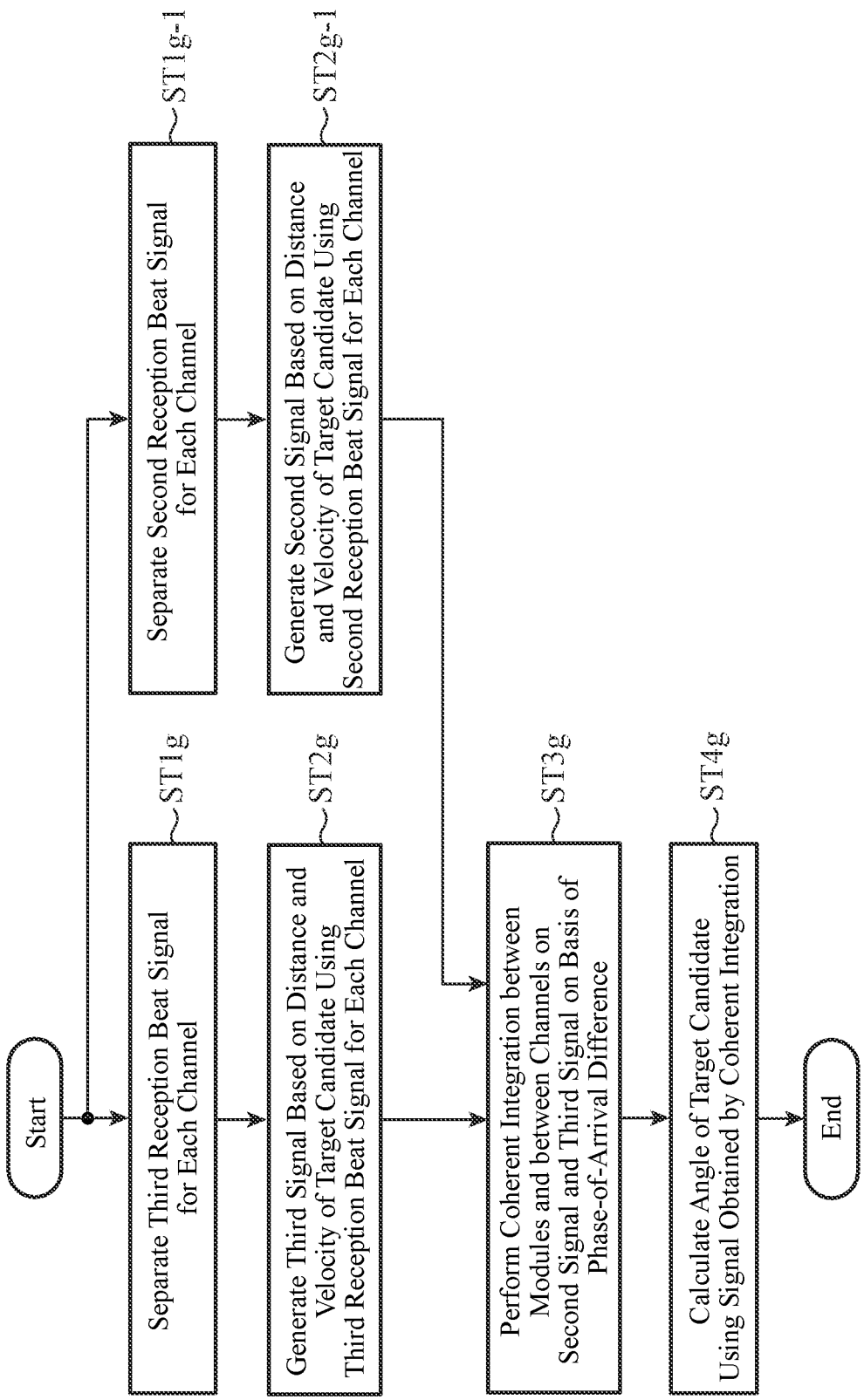
FIG. 14 is a flowchart showing a detailed process of steps ST7 and ST8 in FIG. 4.

FIG. 14 is a flowchart showing the process of steps ST7 and ST8 in FIG. 4 in detail. In the first signal processor 12, the first separation unit 120 receives, from the analog-to-digital converter $1\text{-}9\text{-}n_{Rx,nMDL}$, the reception beat signal $V_{1,nMDL}(3, n_{Tx}, n_{Rx}, h, m)$ in the reception channel of the reception channel number $n_{Rx,nMDL}$ in the first module $1\text{-}n_{MDL}$ obtained in step ST3e in FIG. 13A. The first separation unit 120 demodulates the reception beat signal $V_{1,nMDL}(3, n_{Tx}, n_{Rx}, h, m)$ in the same manner as in the above Equation (13). The demodulated reception beat signal is separated into signals for each transmission channel in the third module $3\text{-}n_{TxEx}$ and each reception channel in the first module $1\text{-}n_{MDL}$ (step ST1g). As a result, a third reception beat signal $V_{1,nMDL,C}(3, n_{Tx}, n_{Rx}, h, m)$ corresponding to the transmission channel number $n_{Tx,nTxEx}$ in the third module $3\text{-}n_{TxEx}$ and the reception channel number $n_{Rx}$ in the first module $1\text{-}n_{MDL}$ is generated.

Subsequently, the first signal generating unit 121 generates a third signal $f_{b,1,nMDL}(3, n_{Tx}, n_{Rx}, q_{ntgt}, k_{ntgt})$ based on the distance and velocity of the target candidate of the target candidate number $n_{tgt}$ using the third reception beat signal $V_{1,nMDL,C}(3, n_{Tx}, n_{Rx}, h, m)$ in accordance with Equation (19) below based on the velocity bin number $q_{ntgt}$ corresponding to the velocity of the target candidate of the target candidate number $n_{tgt}$ and the distance bin number $k_{ntgt}$ corresponding to the distance of the target candidate of the target candidate number $n_{tgt}$ (step ST2g). The third signal $f_{b,1,nMDL}(3, n_{Tx}, n_{Rx}, q_{ntgt}, k_{ntgt})$ is output from the first signal generating unit 121 to the second coherent integration unit 125.

$$f_{b1,n_{MDL}}(3, n_{Tx}, n_{Rx}, q_{n_{tgt}}, k_{n_{tgt}}) = \sum_{h=0}^{H-1} \left\{ \sum_{m=0}^{M-1} \left[ \frac{V_{1,n_{MDL},C}(3, n_{Tx}, n_{Rx}, h, m)}{\text{Code}(3, n_{Tx}, h) \exp\left(-j2\pi \frac{m}{M} k_{n_{tgt}}\right)} \right] \right\} \exp\left(-j2\pi \frac{h}{H} q_{n_{tgt}}\right) \quad (19)$$

$(n_{Rx} = 0, 1, \ldots, N_{Rx,n_{MDL}} - 1)$ $(n_{Tx} = 0, 1, \ldots, N_{Tx,n_{MDL}} - 1)$ $(n_{MDL} = 0, 1, \ldots, N_{MDL} - 1)$ $(n_{tgt} = 0, 1, \ldots, N_{tgt} - 1)$ In the second signal processor 21, the second separation unit 210 receives, from the analog-to-digital converter $2\text{-}9\text{-}n_{Rx,nRxEx}$, the reception beat signal $V_{2,nRxEx}(3, n_{Tx}, n_{Rx}, h, m)$ in the reception channel of the reception channel number $n_{Rx,nRxEx}$ in the second module 2-$n_{RxEx}$ obtained in step ST3$f$ in FIG. 13B. The second separation unit 210 demodulates the reception beat signal $V_{2,nRxEx}(3, n_{Tx},n_{Rx},h,m)$ in the same manner as in the above Equation (13). The demodulated reception beat signal is separated into signals for each transmission channel in the third module 3-$n_{TxEx}$ and each reception channel in the second module 2-$n_{RxEx}$ (step ST1$g$-1). As a result, a second reception beat signal $V_{2,nRxEx,C}(3, n_{Tx},n_{Rx},h,m)$ corresponding to the transmission channel number $n_{Tx,nTxEx}$ in the third module 3-$n_{TxEx}$ and the reception channel number $n_{Rx,nRxEx}$ in the second module 2-$n_{RxEx}$ is generated.

Subsequently, the second signal generating unit 211 generates a second signal $f_{b,2,nRxEx}(3, n_{Tx},n_{Rx},q_{ntgt},k_{ntgt})$ based on the distance and velocity of the target candidate of the target candidate number $n_{tgt}$ using the second reception beat signal $V_{2,nRxEx,C}(3, n_{Tx},n_{Rx},h,m)$ in accordance with Equation (20) below based on the velocity bin number $q_{ntgt}$ corresponding to the velocity of the target candidate of the target candidate number $n_{tgt}$ and the distance bin number $k_{ntgt}$ corresponding to the distance of the target candidate of the target candidate number $n_{tgt}$ (step ST2$g$-1). The second signal $f_{b,2,nRxEx}(3, n_{Tx},n_{Rx},q_{ntgt},k_{ntgt})$ is output from the second signal generating unit 211 to the second coherent integration unit 125 included in the first signal processor 12.

Since the target candidate detecting unit 123 is configured to detect the target candidate, it is possible to perform the calculation only for the signals corresponding to the velocity bin number $q_{ntgt}$ and the distance bin number $k_{ntgt}$ of the target candidate number $n_{tgt}$, and thus, a radar device with reduced calculation amount and reduced cost can be obtained. For example, an amount of calculation for fast Fourier transform for signals corresponding to all distance bin numbers M in the hit direction is M(H/2)log$_2$ H, and an amount of calculation for calculating a signal of the velocity bin number $q_{ntgt}$ corresponding to the distance bin number $k_{ntgt}$ of the target candidate of the target candidate number $n_{tgt}$ represented by Equation (20) below is HN$_{tgt}$. Therefore, M(H/2)log$_2$ H>>HN$_{tgt}$ is established. In addition, since the second signal $f_{b,2,nRxEx}(3, n_{Tx},n_{Rx},q_{ntgt},k_{ntgt})$ limited to the velocity bin number $q_{ntgt}$ and the distance bin number $k_{ntgt}$ of the target candidate of the target candidate number $n_{tgt}$ is output, the communication volume can be reduced, whereby the scale of the radar device can be reduced.

$$f_{b2,n_{RxEx}}(3, n_{Tx}, n_{Rx}, q_{ntgt}, k_{ntgt}) = \sum_{h=0}^{H-1}\left\{\sum_{m=0}^{M-1}\left[\frac{V_{2,n_{RxEx}}(3, n_{Tx}, n_{Rx}, h, m)}{\text{Code}(3, n_{Tx}, h)\exp\left(-j2\pi\frac{m}{M}k_{ntgt}\right)}\right]\right\}\exp\left(-j2\pi\frac{h}{H}q_{ntgt}\right)$$ (20)

$(n_{Tx} = 0, 1, \ldots, N_{Tx,n_{RxEx}} - 1)$ $(n_{Rx} = 0, 1, \ldots, N_{Rx,n_{RxEx}} - 1)$ $(n_{RxEx} = 0, 1, \ldots, N_{RxEx} - 1)$ $(n_{tgt} = 0, 1, \ldots, N_{tgt} - 1)$ The second coherent integration unit 125 performs coherent integration on the second signal $f_{b,2,nRxEx}(3, n_{Tx},n_{Rx},q_{ntgt},k_{ntgt})$ generated by the second signal processor 21 and the third signal $f_{b,1,nMDL}(3, n_{Tx},n_{Rx}, q_{ntgt},k_{ntgt})$ generated by the first signal generating unit 121 in accordance with Equation (21) below based on the phase-of-arrival difference corresponding to the angle-of-arrival candidate of the target candidate (step ST3$g$). By performing this coherent integration, a signal $R_{3,ch}(n_\theta,q_{ntgt},k_{ntgt})$ for the target candidate of the target candidate number $n_{tgt}$ is generated. Note that, in a case where there is an influence of Doppler frequency between transmission modules and transmission channels, that is, an influence of target movement, the second coherent integration unit 125 performs the process represented by Equation (21) below after suppressing the influence using the velocity corresponding to the velocity bin number $q_{ntgt}$ of the target candidate with the target candidate number $n_{tgt}$.

(21)

$$R_{3,ch}(n_\theta, q_{n_{tgt}}, k_{n_{tgt}}) =$$

$$\sum_{n_{Tx}=0}^{N_{TxRx}-1}\left\{\begin{array}{l}\sum_{n_{MDL}=0}^{N_{MDL}-1}\sum_{n_{Tx}=0}^{N_{Rx_{n_{MDL}}}-1}\left[\begin{array}{l}f_{b1,n_{MDL}}(3, n_{Tx}, n_{Rx}, q_{n_{tgt}}, k_{n_{tgt}}) \\ \exp(-j\varphi'_{Tx}(3, n_{Tx}, n_{MDL}, n_\theta)) \\ \exp(-j\varphi'_{Rx}(n_{MDL}, n_{Rx}, n_\theta))\end{array}\right] + \\ \sum_{n_{TxRx}=0}^{N_{MDL}-1}\sum_{n_{Tx}=0}^{N_{Rx_{n_{MDL}}}-1}\left[\begin{array}{l}f_{b2,n_{RxTx}}(3, n_{Tx}, n_{Rx}, q_{n_{tgt}}, k_{n_{tgt}}) \\ \exp(-j\varphi''_{Tx}(3, n_{Tx}, n_{RxEx}, n_\theta)) \\ \exp(-j\varphi''_{Rx}(n_{RxEx}, n_{Rx}, n_\theta))\end{array}\right]\end{array}\right\}$$

$(n_\theta = 0, 1, \ldots, N_\theta - 1)$ $(n_{tgt} = 0, 1, \ldots, N_{tgt} - 1)$ In Equation (21) above, $N_\theta$ is the number of assumed target angles, and $n_\theta$ is the target angle number assigned to each of the assumed target angles. $\varphi'_{Tx}(3, n_{TxEx},n_{MDL},n_\theta)$ is the phase difference between the transmission channel of the third module 3-$n_{TxEx}$ and the reception channel of the first module 1-$n_{MDL}$ with respect to the target angle of the target angle number $n_\theta$. $\varphi'_{Rx}(n_{MDL},n_{Rx},n_{MDL},n_\theta)$ is the phase-of-arrival difference in the reception channel of the reception channel number $n_{Rx,nMDL}$ in the first module 1-$n_{MDL}$ with respect to the target angle of the target angle number $n_\theta$. $\varphi''_{Tx}(3, n_{TxEx},n_{RxEx},n_\theta)$ is the phase difference between the transmission channel of the third module 3-$n_{TxEx}$ and the second module 2-$n_{RxEx}$ with respect to the target angle of the target angle number $n_\theta$. $\varphi''_{Rx}(n_{RxEx},n_{Rx,nRxEx},n_\theta)$ is the phase-of-arrival difference in the reception channel of the reception channel number $n_{Rx,nRxEx}$ in the second module 2-$n_{RxEx}$ with respect to the target angle of the target angle number $n_\theta$.

The case where the discrete Fourier transform in accordance with the above Equation (21) is performed on the second signal and the third signal corresponding to the target candidate of the target candidate number $n_{tgt}$ has been described above. However, the embodiment is not limited thereto. For example, instead of the discrete Fourier transform, FFT, MUSIC, or ESPRIT may be performed.

Further, although the above Equation (21) is described as a far field, integration may be performed as a near field in a case where received waves cannot be approximated as plane waves due to a large aperture.

The case where the discrete Fourier transform in accordance with the above Equation (21) is performed on the second signal and the third signal corresponding to the target candidate of the target candidate number $n_{tgt}$ has been described above. However, integration may also be performed on the first signal corresponding to the target candidate of the target candidate number $n_{tgt}$. This makes it possible to reduce side lobes and grating levels.

The third module $3\text{-}n_{TxEx}$ may include a reception channel. That is, the third module $3\text{-}n_{TxEx}$ may be a module that performs transmission and reception in the same manner as the first module $1\text{-}n_{MDL}$.

The angle calculation unit 126 calculates an angle candidate $n'_{\theta,tgt}$ of the target candidate with the target candidate number $n_{tgt}$ on the basis of the intensity of the signal $R_{3,ch}(n_\theta, q_{ntgt}, k_{ntgt})$ for the target candidate of the target candidate number $n_{tgt}$ (step ST4g). An angle $\theta(n'_{\theta,tgt})$ corresponding to the angle candidate $n'_{\theta,tgt}$ is output from the angle calculation unit 126 to the display 9. The display 9 displays the velocity, distance, and angle of the target candidate with the target candidate number $n_{tgt}$ on the screen.

When the target angle $\theta$ and the target angle $\theta'_{n\theta}$ of the target angle number $n_\theta$ match, the signal $R_{3,ch}(n_\theta, q_{ntgt}, k_{ntgt})$ for the target candidate of the target candidate number $n_{tgt}$ is coherently integrated, and the signal power shows the maximum value. That is, due to coherent integration of the signal for each transmission channel of the third module $3\text{-}n_{TxEx}$ and each reception channel of the first module $1\text{-}n_{MDL}$ and the signal for each transmission channel of the third module $3\text{-}n_{TxEx}$ and each reception channel of the second module $2\text{-}n_{RxEx}$, the power of the signal after coherent integration increases. By using this signal, it is possible to obtain a radar device having improved target detection performance.

FIG. 15A is a diagram showing actual antenna arrangement in the radar device according to the first embodiment. FIG. 15B is a diagram showing an actual antenna arrangement and a virtual antenna arrangement in the radar device according to the first embodiment. In FIG. 15A, the third module 3-1, the second module 2-1, the first module 1-1, the second module 2-2, and the third module 3-2 are linearly arranged in this order. Assuming that the antenna aperture length corresponding to reception channels of the second module 2-1, the antenna aperture length corresponding to reception channels of the first module 1-1, and the antenna aperture length corresponding to reception channels of the second module 2-2 are each D, the antenna aperture length corresponding to a reception channel (1a) of the entire radar device is 3D. In FIG. 15A, 3D sin $\theta$ is a phase difference between the channels.

Due to the first signal processor 12 coherently integrating signal for each transmission channel of the third module $3\text{-}n_{TxEx}$, each reception channel of the first module $1\text{-}n_{MDL}$, each transmission channel of the third module $3\text{-}n_{TxEx}$, and each reception channel of the second module $2\text{-}n_{RxEx}$, a virtual reception channel denoted by reference sign (2a) in FIG. 15B is formed. As a result, the antenna aperture length of the radar device according to the first embodiment is virtually increased from 3D to 6D. In FIG. 15B, 6D sin $\theta$ is a phase difference between the channels.

Figure 16:
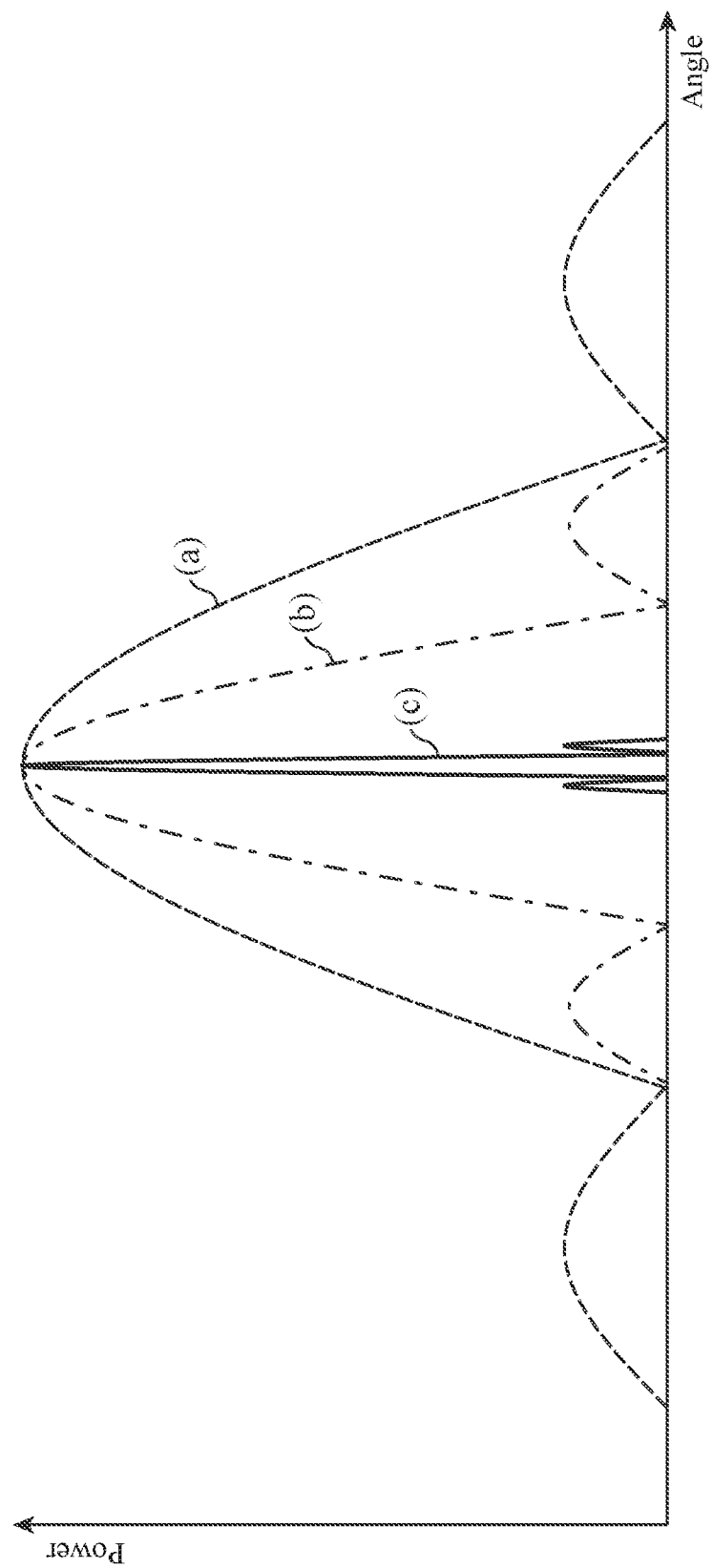
FIG. 16 is a diagram showing a relationship between the angle of a target candidate and the power of a signal corresponding to this angle when the number of target candidates is one.

FIG. 16 is a diagram showing a relationship between the angle of a target candidate and the power of a signal corresponding to this angle when the number of target candidates is one. In FIG. 16, a curve (a) shows a relationship between the power of the signal transmitted and received by the first module 1-1 shown in FIG. 10A and the angle of a target candidate calculated using this signal. Since coherent integration is not performed, the antenna aperture length is still D, and the angle resolution is low as seen from the curve (a).

A curve (b) shows a relationship between the power of a signal obtained by the coherent integration between the channels shown in FIG. 9 in the first module 1-1 having two transmission channels and one reception channel and the angle of a target candidate calculated using this signal. In this case, the antenna aperture length is 2D because virtual reception channels are added as shown in FIG. 10B, and therefore, the curve (b) has improved angle resolution than the curve (a). However, sufficient angle resolution cannot be obtained.

A curve (c) shows a relationship between the power of a signal obtained by coherent integration of signal for each transmission channel of the third module 3-1 or 3-2, each reception channel of the first module 1-1, and each reception channel of the second modules 2-1 to 2-4 and an angle of a target candidate calculated using this signal. This relationship is obtained in such a way that, in the radar device shown in FIG. 2, the signal transmitted from the third module 3-1 or 3-2 is received by the first module 1-1 and the second modules 2-1 to 2-4. By performing coherent integration of signals between modules and between channels, the angle resolution is significantly improved.

FIG. 17 is a diagram showing a relationship between the angle of a target candidate and the power of a signal corresponding to this angle when the number of target candidates is two. In FIG. 17, a curve (a1) shows a relationship between the power of a signal obtained by the coherent integration between channels shown in FIG. 9 in the first module 1-1 having two transmission channels and one reception channel and the angle of a target calculated using this signal. In addition, curves (b1) and (b2) indicate the results obtained by processing the signal obtained by coherent integration for each target. As is seen from the curves (a1), (b1), and (b2), when there are two targets, sufficient angle resolution cannot be obtained only by the first module 1-1. Therefore, the targets cannot be separated, and the angles of the targets cannot be measured.

A curve (c1) shows a relationship between the power of a signal obtained by coherent integration of signals for each transmission channel of the third module 3-1 or 3-2, each reception channel of the first module 1-1, and each reception channel of the second modules 2-1 to 2-4 and an angle of the target candidate calculated using this signal. This relationship is obtained in such a way that, in the radar device shown in FIG. 2, the signal transmitted from the third module 3-1 or 3-2 is received by the first module 1-1 and the second modules 2-1 to 2-4. By using these modules, it is possible to separate the two targets and measure the angles of them.

The radar device according to the first embodiment can detect a target having a small reflected power by suppressing the phase noise. Further, as is seen from the curve (c1) shown in FIG. 17, the radar device according to the first embodiment can obtain angle resolution that cannot be achieved only by the first module 1-1. As a result, it is possible to obtain a radar device having improved target detection performance.

A linear array including a plurality of modules has been described above. However, the embodiment is not limited thereto. For example, antennas respectively corresponding to a transmission channel and a reception channel may be arranged differently in the vertical or horizontal direction, or in the vertical and horizontal directions. Even in this case, the radar device according to the first embodiment can calculate the angle of the target only in the horizontal plane, only the elevation angle of the target, or the angle of the target with respect to the horizontal plane and the vertical line.

Next, usefulness of the radar device according to the first embodiment will be described.

The radar device according to the first embodiment includes the first module, the second module, and the third module which can be arranged in a distributed manner.

Therefore, even if there is a restriction that a plurality of modules cannot be centrally arranged, the radar device can address such restriction. Further, the radar device according to the first embodiment can achieve a wide antenna aperture, which could not be achieved only by the first module, by using the first module, the second module, and the third module. This improves the angle resolution of the target.

Figure 18A:
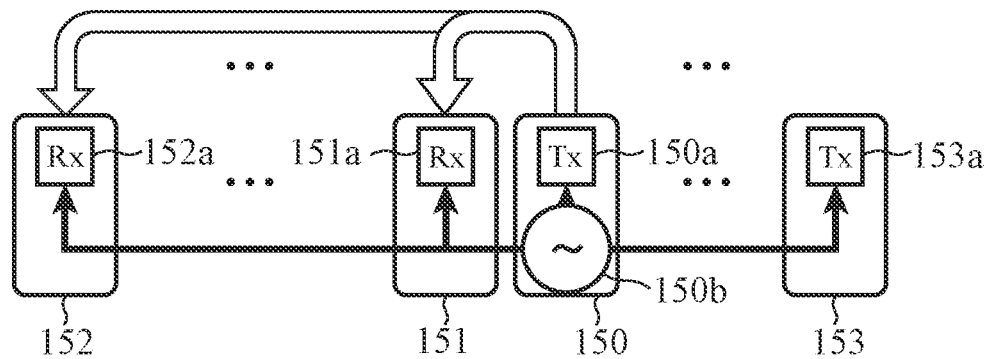
FIG. 18A is a diagram schematically showing a conventional radar device in which a plurality of modules uses the same local oscillation signal.

FIG. 18A is a diagram schematically showing a conventional radar device in which a plurality of modules uses the same local oscillation signal. The conventional radar device shown in FIG. 18A includes modules 150 to 153. The module 150 includes a transmission unit 150a and a local oscillation signal generator 150b. The module 151 includes a reception unit 151a, the module 152 includes a reception unit 152a, and the module 153 includes a transmission unit 153a. The local oscillation signal generator 150b distributes the same local oscillation signal to each of the plurality of modules 150 to 153. In this configuration, as the number of distributions increases, the power of the local oscillation signal decreases accordingly. Therefore, the local oscillation signal generator 150b needs to be a large-scale device that can compensate for the distribution loss of the local oscillation signal, which leads to an increase in cost.

Figure 18B:
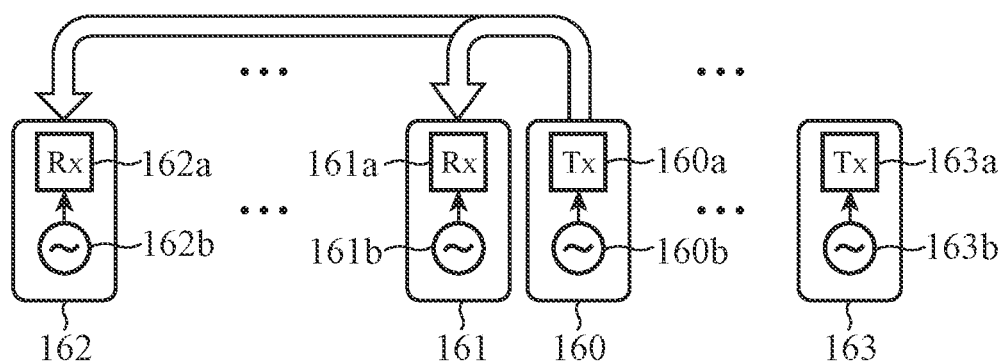
FIG. 18B is a diagram schematically showing a conventional radar device in which a plurality of modules uses different local oscillation signals.

FIG. 18B is a diagram schematically showing a conventional radar device in which a plurality of modules use different local oscillation signals. The conventional radar device shown in FIG. 18B includes modules 160 to 163. The module 160 includes a transmission unit 160a and a local oscillation signal generator 160b. The module 161 includes a reception unit 161a and a local oscillation signal generator 161b, the module 162 includes a reception unit 162a and a local oscillation signal generator 162b, and the module 163 includes a transmission unit 163a and a local oscillation signal generator 163b. The local oscillation signal generators 160b to 163b generate local oscillation signals different from each other. Therefore, phase noise increases.

Figure 18C:
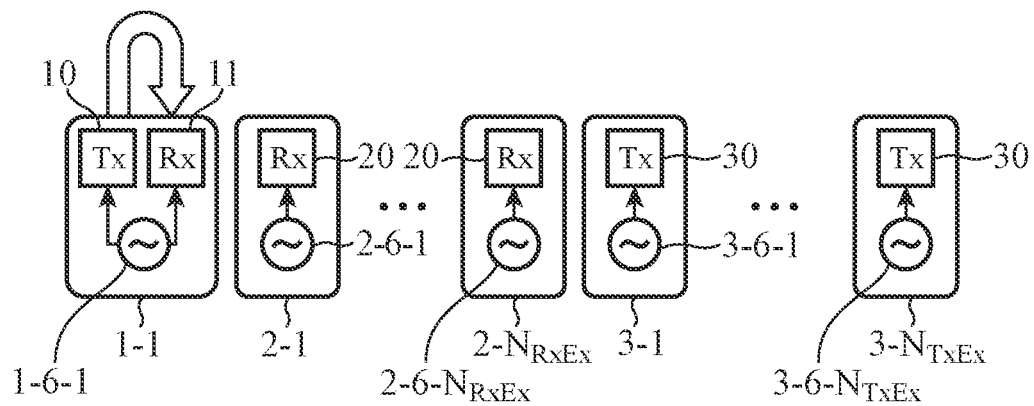
FIG. 18C is a block diagram schematically showing a configuration of the radar device according to the first embodiment.

FIG. 18C is a block diagram schematically showing a configuration of the radar device according to the first embodiment. As shown in FIG. 18C, in the radar device according to the first embodiment, the first module 1-1, the second modules 2-1 to 2-$N_{RxEx}$, and the third modules 3-1 to 3-$N_{TxEx}$ each include the local oscillation signal generating unit. Therefore, distribution loss of the local oscillation signal can be decreased. Further, the same local oscillation signal is used for transmission and reception, whereby the influence of phase noise is suppressed, and even a target with a small reflected power can be detected.

Figure 19A:
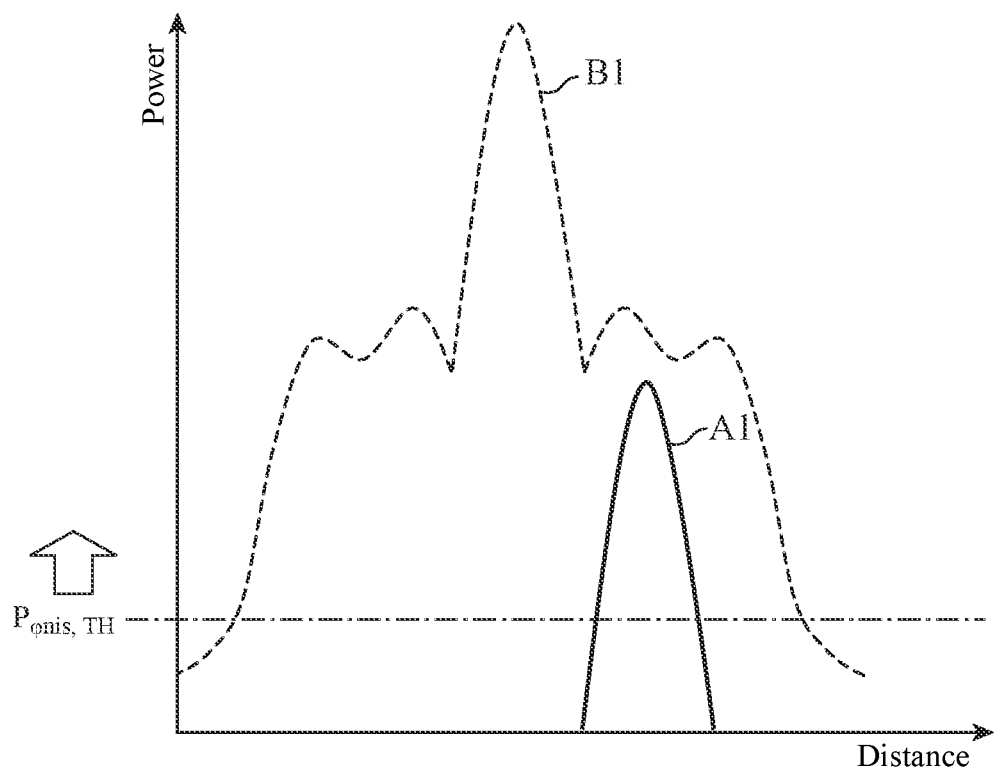
FIG. 19A is a diagram showing a relationship between the power of a signal corresponding to a target measured by the conventional radar device and the distance to the target.

FIG. 19A is a diagram showing a relationship between the power of a signal corresponding to a target measured by the conventional radar device and the distance to the target. In FIG. 19A, a curve A1 shows the relationship between the power of a reception signal assumed for a target with a small reflected power and the distance to the target. A curve B1 shows the relationship between the power of a reception signal for a target with a large reflected power measured by the conventional radar device shown in FIG. 18B and the distance to the target. The target with a low reflected power exists around the target with a large reflected power. A threshold $P_{\varphi nis,TH}$ indicates a threshold of loss due to phase noise, and in the curve B1 showing the reception signal corresponding to the target measured by the conventional radar device, the loss due to phase noise is greater than the threshold $P_{\varphi nis,TH}$ as indicated by an arrow.

The radar device shown in FIG. 18B includes the module 160 as a transmission sub-array unit and the modules 161 and 162 as reception sub-array units. A plurality of reception sub-array units receives signals, and the transmission sub-array unit and the reception sub-array units use different local oscillation signals. Therefore, in the radar device shown in FIG. 18B, phase noise increases in the signal corresponding to the target having a large reflected power as shown in FIG. 19A, which makes it difficult to detect the target with a small reflected power around the target. Accordingly, in order to address this problem, the radar device shown in FIG. 18B needs to synthesize the reception signals of the plurality of reception sub-array units for each angle-of-arrival of the target, which increases an amount of calculation for obtaining the angle of the target.

Figure 19B:
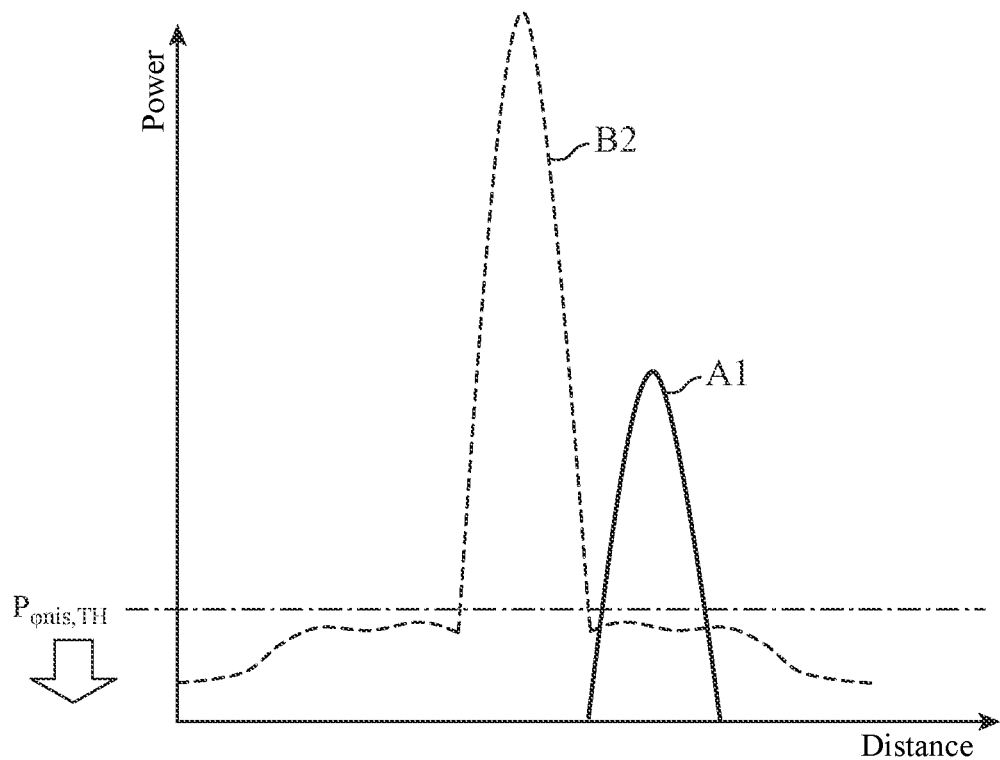
FIG. 19B is a diagram showing a relationship between the power of a signal corresponding to a target measured by the radar device according to the first embodiment and the distance to the target.

FIG. 19B is a diagram showing a relationship between the power of a signal corresponding to a target measured by the radar device according to the first embodiment and the distance to the target. In FIG. 19B, a curve A1 shows the relationship between the power of a reception signal assumed for a target with a small reflected power and the distance to the target. A curve B2 shows a relationship between the power of a reception signal for a target with a large reflected power measured by the radar device according to the first embodiment and the distance to the target.

The radar device according to the first embodiment uses the same local oscillation signal on the transmission side and the reception side. Therefore, a loss due to phase noise is smaller than the threshold $P_{\varphi nis,TH}$ as indicated by an arrow in the curve B2 indicating the reception signal corresponding to the target. This means that the influence of phase noise is suppressed. As a result, the detection performance for detecting the target having a small reflected power existing around the target having a large reflected power is improved. That is, in the radar device according to the first embodiment the antenna aperture is virtually increased using a plurality of modules which uses the same local oscillation signal on the transmission side and on the reception side, whereby an influence of phase noise on the reception beat signal can be suppressed. Thus, the radar device can enhance angle resolution of a target while maintaining detection accuracy of the target. Further, beam synthesis, that is, integration between reception channels, is not required for all distance bins and velocity bins before target detection, whereby an amount of calculation for obtaining the angle of the target is reduced.

In order to suppress the influence of phase noise, it is necessary to increase the correlation between the local oscillation signal used for transmission and the local oscillation signal used for reception, that is, to reduce the difference in phase noise in down-conversion.

Figure 20A:
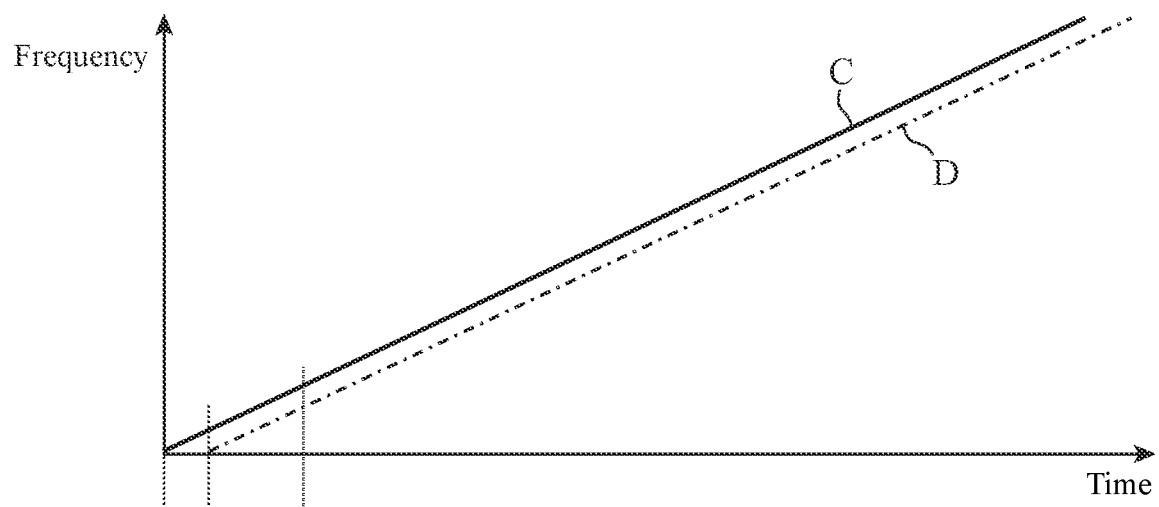
FIG. 20A is a graph showing a relationship between a frequency used for transmitting and receiving signals in the first module and time.

FIG. 20A is a graph showing a relationship between the frequency used for transmitting and receiving signals in the first module 1-$n_{MDL}$ and time. In FIG. 20A, a straight line C shows the relationship between the frequency of the local oscillation signal used in the first transmission unit 10 and time. Further, a straight line D shows the relationship between the frequency of the local oscillation signal used in the first reception unit 11 and time. It is assumed that the first transmission unit 10 transmits the transmission RF signal at time t=0, and the first reception unit 11 receives the reflection RF signal at time t=$2R_{max}$/c. Here, c is the speed of light, and $R_{max}$ is the maximum detection distance given in advance for the radar device according to the first embodiment. In the first module 1-$n_{MDL}$, the same first local oscillation signal is used on the transmission side and the reception side. Therefore, as shown in FIG. 20A, the local oscillation signal on the transmission side and the local oscillation signal on the reception side are synchronized with each other.

Figure 20B:
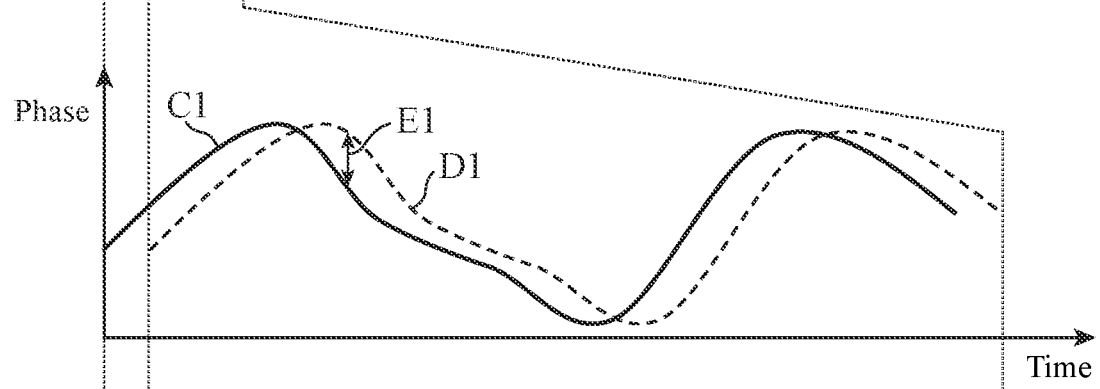
FIG. 20B is a graph showing a relationship between phases of the first local oscillation signal and a reflection RF signal received by a first reception unit and time.

FIG. 20B is a graph showing a relationship between phases of the first local oscillation signal and the reflection RF signal received by the first reception unit 11 and time. In FIG. 20B, a curve C1 indicates a relationship between the phase of the first local oscillation signal and time. Further, a curve D1 indicates a relationship between the phase of the reflection RF signal of the transmission RF signal transmitted by the first transmission unit 10 and time. E1 is a difference in phase noise between the first local oscillation signal and the reflection RF signal.

Figure 20C:
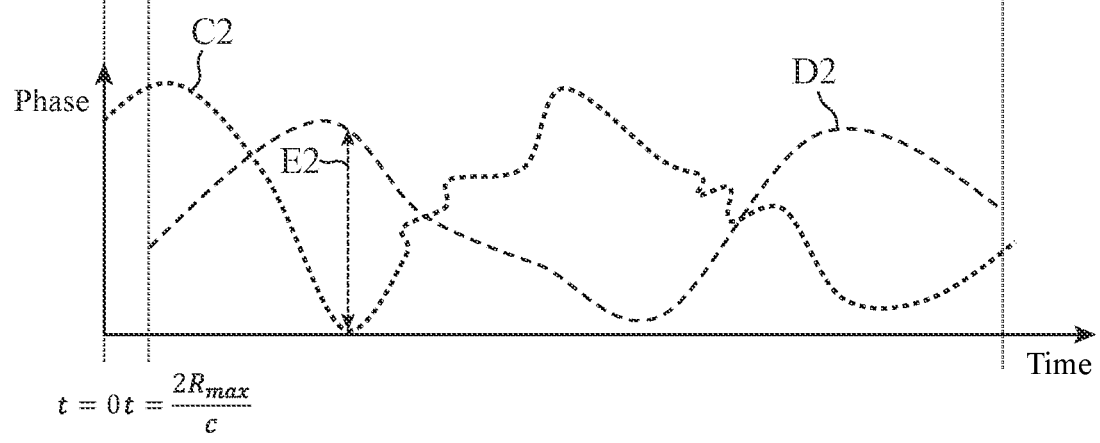
FIG. 20C is a graph showing a relationship between phases of the second local oscillation signal and a reflection RF signal received by a second reception unit and time.

FIG. 20C is a graph showing a relationship between phases of the second local oscillation signal and the reflection RF signal received by the second reception unit 20 and time. In FIG. 20C, a curve C2 indicates the relationship between the phase of the second local oscillation signal and time. Further, similarly to the curve D1 shown in FIG. 20B, a curve D2 indicates the relationship between the phase of the reflection RF signal of the transmission RF signal transmitted by the first transmission unit 10 and time. The second local oscillation signal in FIG. 20C is a local oscillation signal different from the first local oscillation signal. E2 is a difference in phase noise between the second local oscillation signal and the reflection RF signal.

Equation (22) below represents magnitude relationship between the difference between the phase noise of the first local oscillation signal used by the first transmission unit 10 and the phase noise of the first local oscillation signal used by the first reception unit 11, and the difference between the phase noise of the first local oscillation signal used by the first transmission unit 10 and the phase noise of the second local oscillation signal used by the second reception unit 20. In Equation (22) below, $\varphi_{nis,1,nMDL,nTx}(t)$ is the phase noise of the first local oscillation signal in the transmission channel of the transmission channel number $n_{Tx}$ of the first module $1\text{-}n_{MDL}$. $\varphi_{nis,1,nMDL,nTx}(t-2R_{max}/c)$ is the phase noise of the first local oscillation signal in the reception channel of the reception channel number $n_{Rx,nMDL}$ of the first module $1\text{-}n_{MDL}$. Further, $\varphi_{nis,2,nRxEx,nTx}(t-2R_{max}/c)$ is the phase noise of the second local oscillation signal in the reception channel of the reception channel number $n_{Rx,nRxEx}$ of the second module $2\text{-}n_{RxEx}$.

$$\phi_{nis,1,nMDL,nTx}(t) - \phi_{nis,1,nMDL,nTx}\left(t - \frac{2R_{max}}{c}\right) < \quad (22)$$
$$\phi_{nis,1,nMDL,nTx}(t) - \phi_{nis,2,nRxTx,nTx}\left(t - \frac{2R_{max}}{c}\right)$$

In a case where the first transmission unit 10 and the first reception unit 11 use the same first local oscillation signal in the first module $1\text{-}n_{MDL}$, and the second reception unit 20 uses the second local oscillation signal different from the first local oscillation signal in the second module $2\text{-}n_{RxEx}$, the phase noise difference E1 is smaller than the phase noise difference E2 as shown in FIGS. 20B and 20C. The above Equation (22) indicates this relationship, and the difference in phase noise when the first transmission unit 10 and the first reception unit 11 use the same first local oscillation signal is smaller than the difference in phase noise when the second reception unit 20 uses the second local oscillation signal different from the first local oscillation signal.

As shown in the above Equation (10) and FIGS. 20B and 20C, there is a time difference of $2R_{max}/c$ between the local oscillation signal and the received reflection RF signal. As the distance from the radar device to the target increases, the difference in phase noise increases, resulting in that the influence of the phase noise increases.

The first module $1\text{-}n_{MDL}$ has the first local oscillation signal generating unit 1-6-1 that suppresses phase noise in accordance with the relationship represented by Equation (23) below, and suppresses the phase noise to a level equal to or less than a desired level as shown in FIG. 19B. In the following Equation (23), $\Delta\varphi_{nis}$ is the allowable upper limit of the phase noise difference. When the difference in phase noise is larger than $\Delta\varphi_{nis}$, suppression of the influence of phase noise cannot be achieved.

$$\phi_{nis,1,nMDL,nTx}(t) - \phi_{nis,1,nMDL,nTx}\left(t - \frac{2R_{max}}{c}\right) \le \Delta\phi_{nis} \quad (23)$$

For example, when different local oscillation signals are used on the transmission side and the reception side, the characteristics of the local oscillation signals are different between the transmission side and the reception side as represented by the right side of the above Equation (22), so that the influence of phase noise cannot be suppressed, and the target detection performance deteriorates. Note that the local oscillation signals that are different from each other may be adjusted so that the phase noise difference is equal to or smaller than $\Delta\varphi_{nis}$, but this adjustment increases cost. Therefore, the first local oscillation signal generating unit 1-6-1 that suppresses the phase noise in accordance with the relationship represented the above Equation (23) is useful.

Further, when the first local oscillation signal generating unit 1-6-1 sets a radar parameter on the basis of a loss $P_{\varphi nis}$ due to phase noise as well as uses the first local oscillation signal for down-converting the reflection RF signal received by the first reception unit 11, it is possible to suppress the desired phase noise. That is, the first local oscillation signal generating unit 1-6-1 suppresses the phase noise so that the loss $P_{\varphi nis}$ due to the desired phase noise becomes equal to or smaller than the threshold $P_{\varphi nis,TH}$ by adjusting radar parameters such as modulation band $B_0$, sampling frequency $f_s$, and maximum detection distance $R_{max}$.

For example, in order to satisfy the above Equation (23), the first local oscillation signal generating unit 1-6-1 sets the modulation band $B_0$, the sampling frequency $f_s$, and a measurable distance $R_{amb,fs}$ without having ambiguity of the sampling frequency $f_s$ as radar parameters that satisfy Equation (24), Equation (25), Equation (26), and Equation (27) described below. Here, $P_{\varphi nis,TH}$ is a threshold of the loss $P_{\varphi nis}$ due to phase noise, $f_{b,Rmax}$ is the beat frequency of the maximum detection distance $R_{max}$, and $P_{\varphi nis}(f_{b,Rmax},f_s)$ is a loss due to phase noise at the beat frequency $f_{b,Rmax}$ of the maximum detection distance $R_{max}$ and the sampling frequency $f_s$. Equation (24) below indicates the relationship between the modulation band $B_0$ and the sampling frequency $f_s$ so that the first local oscillation signal generating unit 1-6-1 satisfies the desired performance. Equation (25) below indicates the relationship between the maximum detection distance $R_{max}$ and the measurable distance $R_{amb,fs}$ with no ambiguity of the sampling frequency $f_s$ so that the first local oscillation signal generating unit 1-6-1 satisfies the desired performance. Equation (26) below indicates the relationship between the beat frequency $f_{b,Rmax}$ of the maximum detection distance $R_{max}$ and the sampling frequency $f_s$ so that the first local oscillation signal generating unit 1-6-1 satisfies the desired performance. Equation (27) below indicates the relationship between the threshold $P_{\varphi nis,TH}$ of the loss $P_{\varphi nis}$ due to phase noise and both the beat frequency $f_{b,Rmax}$ of the maximum detection distance $R_{max}$ and the sampling frequency $f_s$ so that the first local oscillation signal generating unit 1-6-1 satisfies the desired performance. Equation (28) below indicates the relationship between the beat frequency $f_{b,Rmax}$ of the maximum detection distance $R_{max}$ and the maximum detection distance $R_{max}$ so that the first local oscillation signal generating unit 1-6-1 satisfies the desired performance. Equation (29) below indicates the relationship between the sampling frequency $f_s$ and the measurable distance $R_{amb,fs}$ with no ambiguity of the sampling frequency $f_s$ so that the first local oscillation signal generating unit 1-6-1 satisfies the desired performance.

As represented by the above Equation (9), the radar device according to the first embodiment uses a frequency-modulated first local oscillation signal in order to down-convert the reflection RF signal, similarly to the transmission RF signal. Therefore, it is possible to make the sampling frequency $f_s$ lower than the modulation band $B_0$.

In addition, when the sampling frequency $f_s$ equal to or greater than the modulation band $B_0$ is used, a correlation between the first local oscillation signal and the reflection RF signal (reflection signal of the first transmission signal) from a target at a distance equal to or greater than the distance corresponding to the distance resolution is low, so that the influence of phase noise increases. Therefore, the first local oscillation signal generating unit 1-6-1 lowers the sampling frequency $f_s$ in accordance with the following Equation (24) and sets the radar parameters so that the correlation between the two signals becomes high. Thus, it is possible to suppress the loss due to the phase noise of the reflection RF signal from the target located at a distance equal to or less than the maximum detection distance $R_{max}$.

$$B_0 > f_s \tag{24}$$

$$R_{max} < R_{amb,fs} \tag{25}$$

$$f_{b,Rmax} \leq f_s \tag{26}$$

$$P_{\varphi nis,TH} \leq P_{\varphi nis}(f_{b,Rmax}f_s) \tag{27}$$

$$f_{b,Rmax} = (2B_0/cT_0)R_{max} \tag{28}$$

$$f_s = (2B_0/cT_0)R_{amb,fs} \tag{29}$$

Figure 21:
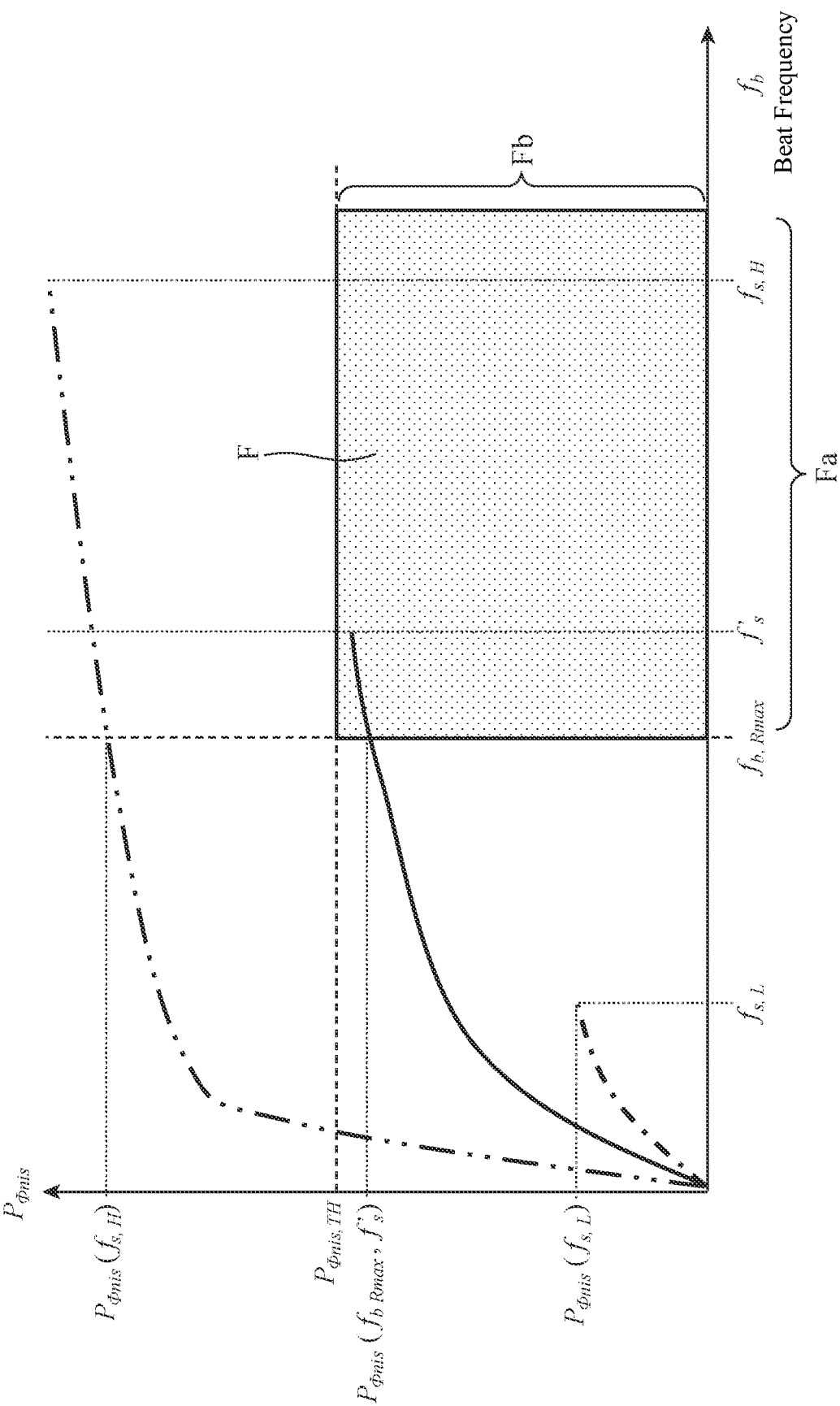
FIG. 21 is a diagram showing a relationship between a loss due to phase noise and a beat frequency.

FIG. 21 is a diagram showing a relationship between the loss due to phase noise and the beat frequency. In FIG. 21, a sampling frequency $f_{s,H}$ is a high sampling frequency that does not satisfy the above Equations (26) and (27), and a sampling frequency $f_{s,L}$ is a low sampling frequency that does not satisfy the above Equations (26) and (27). The beat frequency $f_b$ when the sampling frequency is $f_{s,H}$ satisfies the above (26) but does not satisfy the above Equation (27), as indicated by the reference sign Fa in FIG. 21. As a result, as shown by the dash-dot-dot-dash line in FIG. 21, the loss $P_{\varphi nis}(f_{s,H})$ due to phase noise at the beat frequency $f_{b,Rmax}$ of the maximum detection distance $R_{max}$ is equal to or higher than the threshold $P_{\varphi nis,TH}$ of the loss due to phase noise. Since the beat frequency $f_b$ increases as the sampling frequency $f_s$ increases in this way, there is a problem that the correlation between the first local oscillation signal and the reflection RF signal (reflection signal of the first transmission signal) decreases.

On the other hand, the beat frequency $f_b$ when the sampling frequency $f_{s,L}$ is lowered does not satisfy the above (26), but satisfies the above Equation (27) as indicated by the dash-dot-dash line in FIG. 21, and due to a short distance, the correlation between the first local oscillation signal and the reflection RF signal (reflection signal of the first transmission signal) is high.

When the first local oscillation signal generating unit 1-6-1 sets the radar parameters to have values within the region indicated by the reference sign F in FIG. 21 that satisfy the above Equations (26) and (27), the loss due to phase noise indicated by the reference sign Fb in FIG. 21 is equal to or less than the threshold $P_{\varphi nis,TH}$, which means that the above Equation (23) is satisfied. As a result, desired phase noise suppression can be obtained, and a radar device in which the target detection performance is improved or maintained can be obtained.

Next, the module arrangement when the radar device according to the first embodiment is mounted on a vehicle will be described. In the following, the radar device according to the first embodiment includes the first module 1-1, the second modules 2-1 to 2-4 or 2-1 to 2-5, and the third modules 3-1 and 3-2.

Figure 22:
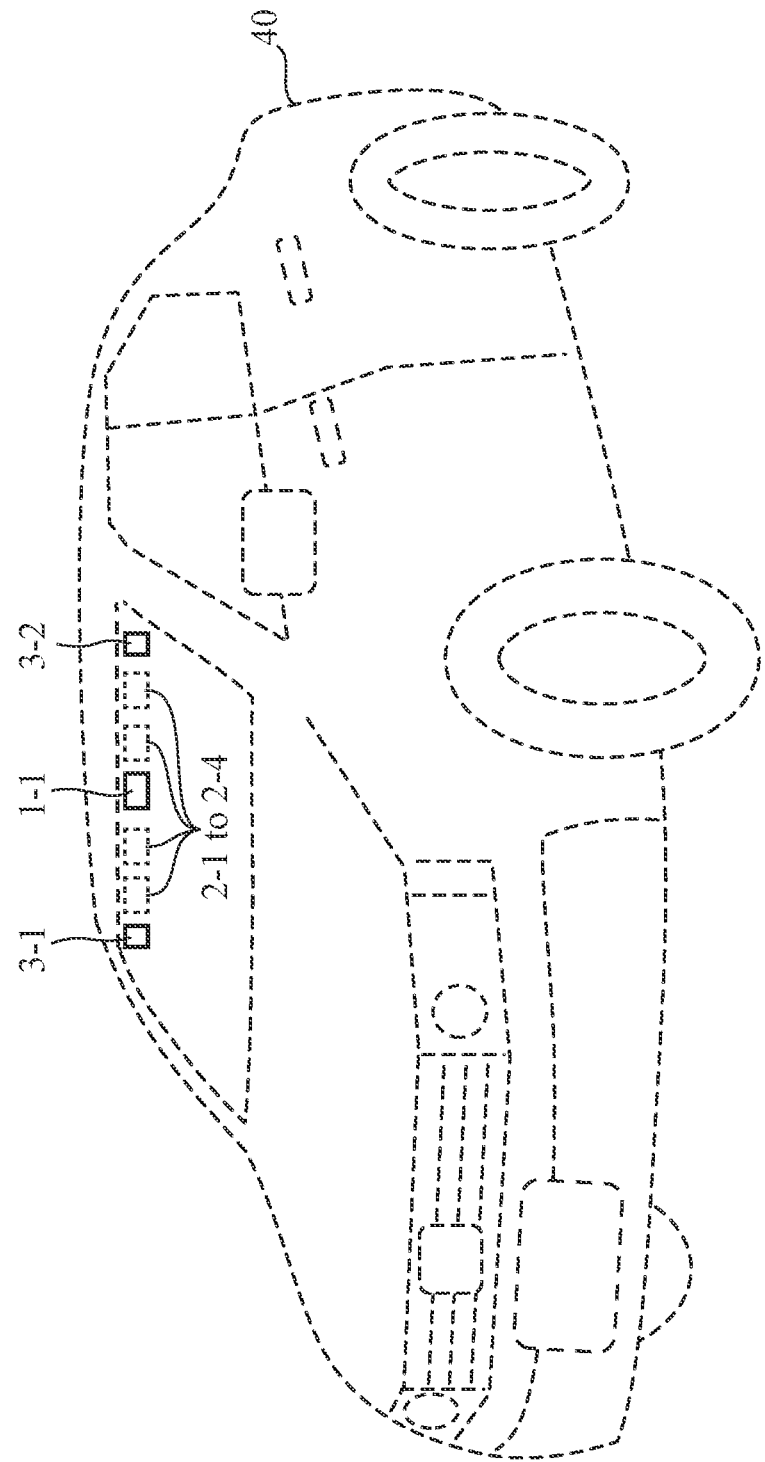
FIG. 22 is a diagram showing a first arrangement example of the first module, the second module, and the third module on a vehicle.

FIG. 22 is a diagram showing a first arrangement example of the first module 1-1, the second modules 2-1 to 2-4, and the third modules 3-1 and 3-2 on a vehicle 40. In the first arrangement example shown in FIG. 22, the third module 3-1, the second module 2-1, the second module 2-2, the first module 1-1, the second module 2-3, the second module 2-4, and the third module 3-2 are linearly arranged in this order near the windshield of the vehicle 40.

Figure 23:
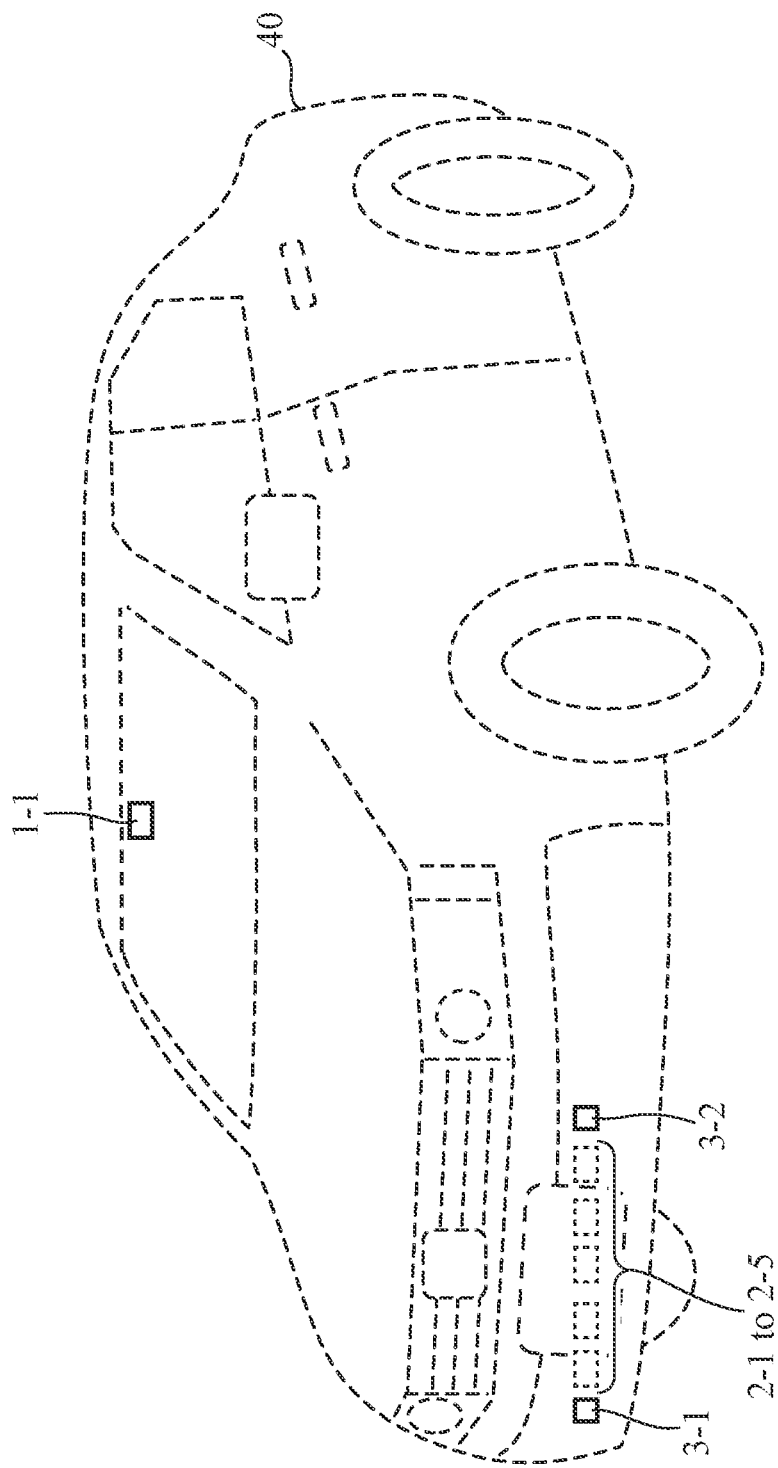
FIG. 23 is a diagram showing a second arrangement example of the first module, the second module, and the third module on a vehicle.

FIG. 23 is a diagram showing a second arrangement example of the first module 1-1, the second modules 2-1 to 2-5, and the third modules 3-1 and 3-2 on the vehicle 40. In the second arrangement example shown in FIG. 23, the first module 1-1 is provided near the windshield of the vehicle 40, and the third module 3-1, the second modules 2-1 to 2-5, and the third module 3-2 are linearly arranged in this order near the bumper of the vehicle 40.

Figure 24:
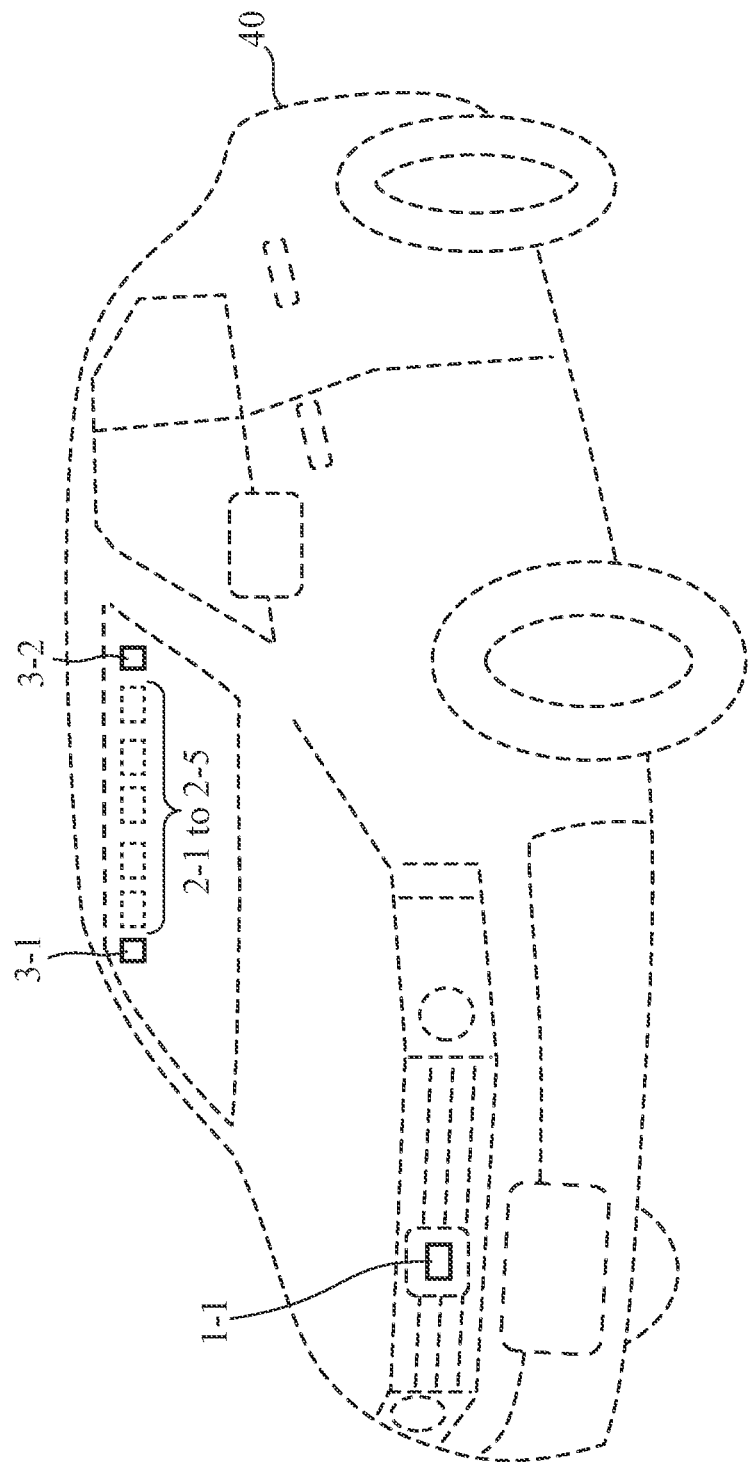
FIG. 24 is a diagram showing a third arrangement example of the first module, the second module, and the third module on a vehicle.

FIG. 24 is a diagram showing a third arrangement example of the first module 1-1, the second modules 2-1 to 2-5, and the third modules 3-1 and 3-2 on the vehicle 40. In the third arrangement example shown in FIG. 24, the first module 1-1 is provided in the emblem portion on the front of the vehicle 40, and the third module 3-1, the second modules 2-1 to 2-5, and the third module 3-2 are linearly arranged in this order near the windshield of the vehicle 40.

Figure 25:
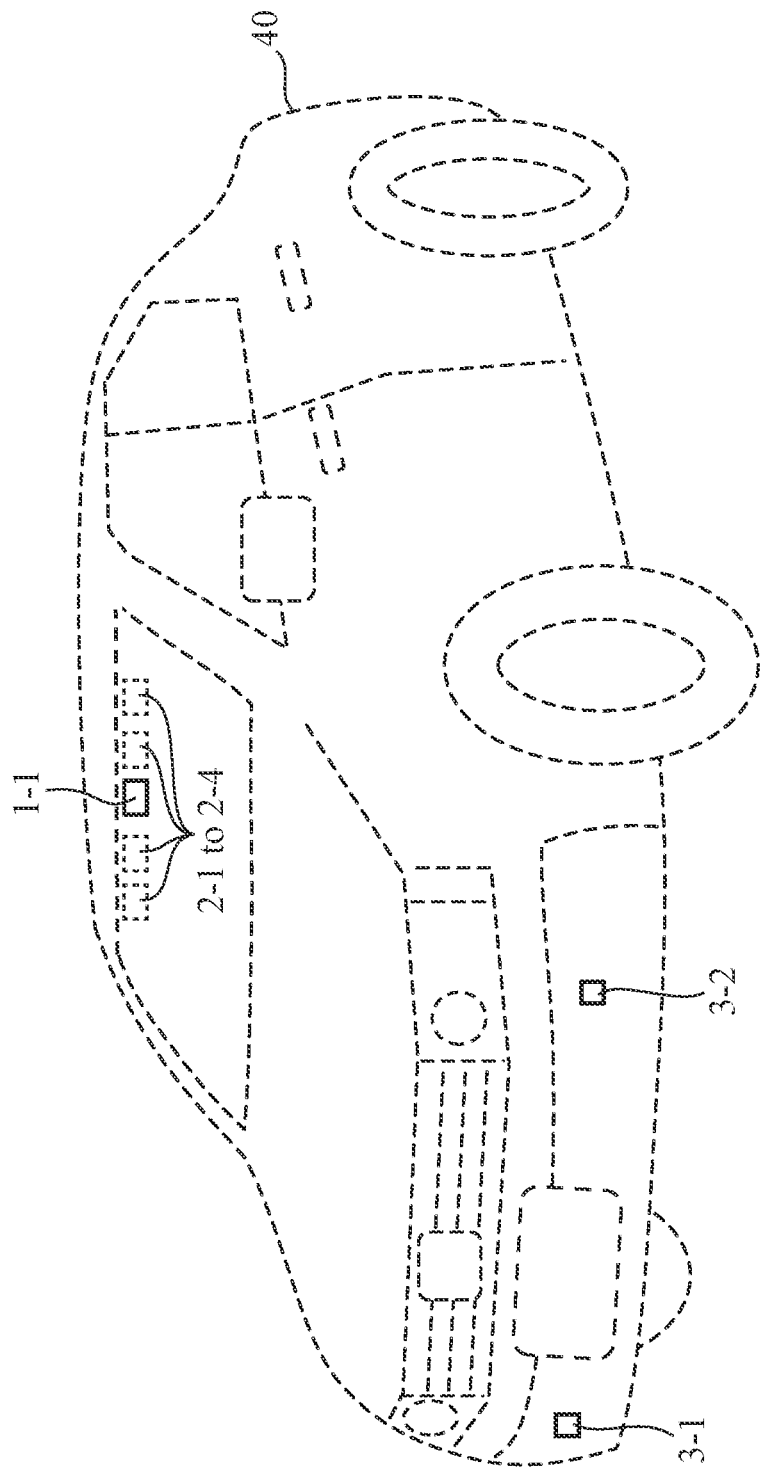
FIG. 25 is a diagram showing a fourth arrangement example of the first module, the second module, and the third module on a vehicle.

FIG. 25 is a diagram showing a fourth arrangement example of the first module 1-1, the second modules 2-1 to 2-4, and the third modules 3-1 and 3-2 on the vehicle 40. In the fourth arrangement example shown in FIG. 25, the second module 2-1, the second module 2-2, the first module 1-1, the second module 2-3, and the second module 2-4 are linearly arranged in this order near the windshield of the vehicle 40. In addition, the third module 3-1 and the third module 3-2 are arranged on the bumper of the vehicle 40.

The radar device according to the first embodiment has a high degree of freedom in module arrangement, thereby enabling distributed arrangement of the plurality of modules as shown in FIGS. 22, 23, 24, and 25. That is, the radar device according to the first embodiment can be used for vehicles of various sizes or can be provided at various locations, as compared with the configuration in which all the modules are integrated. Further, it is possible to set the number of modules depending on a desired specification, for example, depending on the angle resolution.

Next, the hardware configuration of the radar device according to the first embodiment will be described.

The functions of the first transmission unit 10, the first reception unit 11, and the first signal processor 12 in the first module 1-$n_{MDL}$, the functions of the second reception unit 20 and the second signal processor 21 in the second module 2-$n_{RxEx}$, and the function of the third transmission unit 30 in the third module 3-$n_{TxEx}$ are implemented by a processing circuit. That is, the radar device according to the first embodiment includes a processing circuit for executing the processes from step ST1 to step ST8 shown in FIG. 4. The processing circuit may be dedicated hardware or may be a central processing unit (CPU) that executes a program stored in the memory.

Figure 26A:
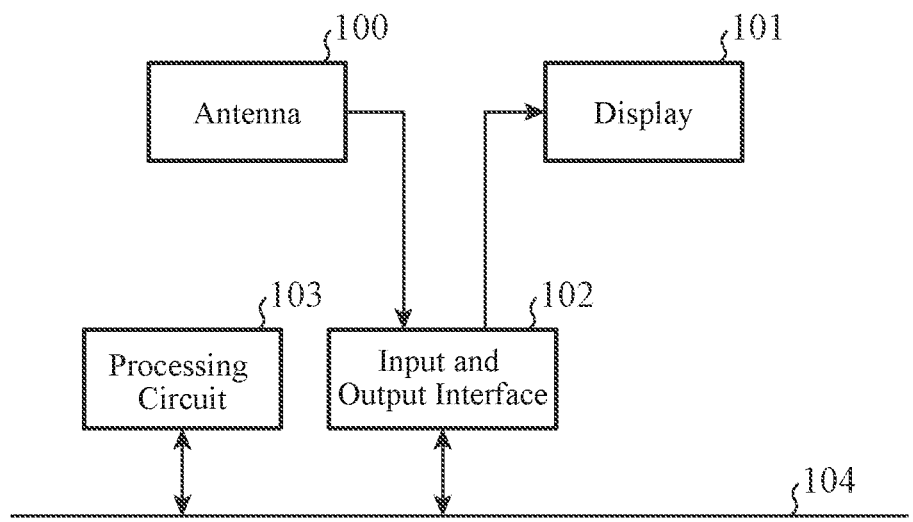
FIG. 26A is a block diagram showing a hardware configuration that achieves the functions of the radar device according to the first embodiment.
Figure 26B:
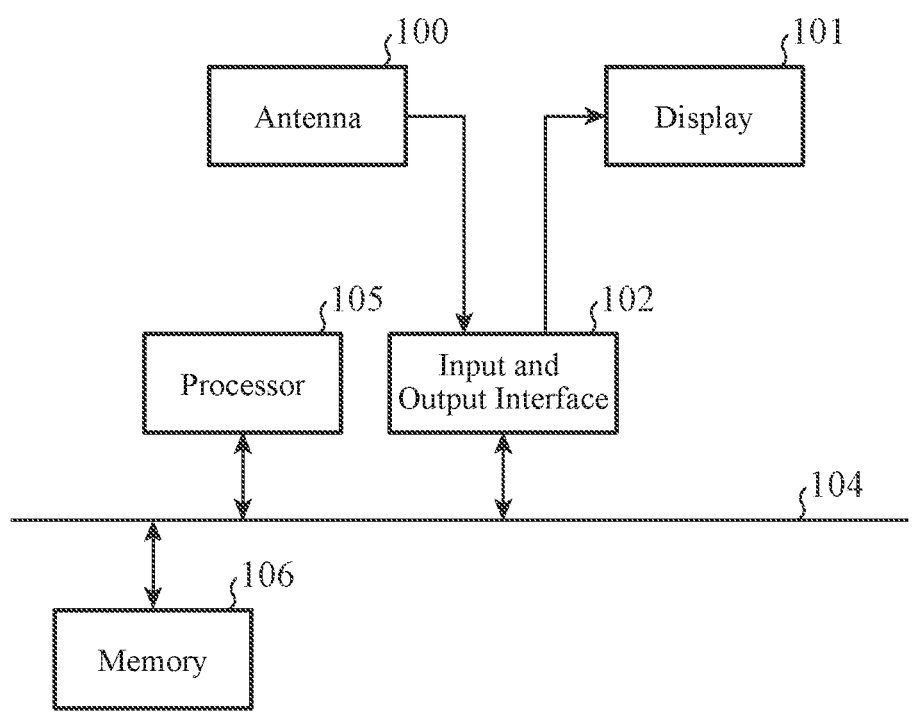
FIG. 26B is a block diagram showing a hardware configuration for executing software that achieves the functions of the radar device according to the first embodiment.

FIG. 26A is a block diagram showing a hardware configuration that implements the functions of the radar device according to the first embodiment. FIG. 26B is a block diagram showing a hardware configuration for executing software that implements the functions of the radar device according to the first embodiment. In FIGS. 26A and 26B, the antenna 100 is the antenna 1-2-$n_{Tx}$ included in the first transmission unit 10, the antenna 1-7-$n_{Rx,nMDL}$ included in the first reception unit 11, the antenna 2-7-$n_{Rx,nRxEx}$ included in the second reception unit 20, or the antenna 3-2-$n_{Tx,nTxEx}$ included in the third transmission unit 30. A display 101 is the display 9 shown in FIG. 1.

An input and output interface 102 relays signals exchanged between the antenna 100 and the transmitter 1-3-$n_{Tx}$, the receiver 1-8-$n_{Rx,nMDL}$, the receiver 2-8-$n_{Rx,nRxEx}$, or the transmitter 3-3-$n_{Tx,nTxEx}$ via a signal bus 104. Further, the input and output interface 102 relays signals exchanged between the display 101 and the first signal processor 12 via the signal bus 104.

When the processing circuit is a dedicated hardware processing circuit 103 shown in FIG. 26A, the processing circuit 103 is, for example, a single circuit, a composite circuit, a programmed processor, a parallel programmed processor, an application specific integrated circuit (ASIC), a field-programmable gate array (FPGA), or a combination of some of these circuits. The functions of the first transmission unit 10, the first reception unit 11, and the first signal processor 12 in the first module 1-$n_{MDL}$ may be implemented by different processing circuits, or may be collectively implemented by a single processing circuit. Further, the functions of the second reception unit 20 and the second signal processor 21 in the second module 2-$n_{RxEx}$ may be implemented by different processing circuits, or may be collectively implemented by a single processing circuit. Furthermore, the functions of the third transmission unit 30 in the third module 3-$n_{TxEx}$ may be implemented by different processing circuits, or may be collectively implemented by a single processing circuit.

When the processing circuit is a processor 105 shown in FIG. 26B, the functions of the first transmission unit 10, the first reception unit 11, and the first signal processor 12 in the first module 1-$n_{MDL}$, the functions of the second reception unit 20 and the second signal processor 21 in the second module 2-$n_{RxEx}$, and the function of the third transmission unit 30 in the third module 3-$n_{TxEx}$ are implemented by software, firmware, or a combination of software and firmware. Software and firmware are described as programs and stored in the memory 106.

The processor 105 implements the functions of the first transmission unit 10, the first reception unit 11, and the first signal processor 12 in the first module 1-$n_{MDL}$, the functions of the second reception unit 20 and the second signal processor 21 in the second module 2-$n_{RxEx}$, and the function of the third transmission unit 30 in the third module 3-$n_{TxEx}$ by reading and executing programs stored in the memory 106. For example, the processor 105 includes the memory 106 for storing programs to eventually execute the processes from step ST1 to step ST8 in the flowchart in FIG. 4 when the functions of the respective modules are executed by the processor 105. These programs cause a computer to execute the procedures or methods of the first module 1-$n_{MDL}$, the second module 2-$n_{RxEx}$, and the third module 3-$n_{TxEx}$. The memory 106 may be a computer-readable storage medium that stores a program for causing the computer to function as the first module 1-$n_{MDL}$, the second module 2-$n_{RxEx}$, and the third module 3-$n_{TxEx}$.

The memory 106 is, for example, a nonvolatile or volatile semiconductor memory such as random access memory (RAM), read only memory (ROM), flash memory, erasable programmable read only memory (EPROM), or electrically EPROM (EEPROM); a magnetic disk, a flexible disk, an optical disk, a compact disk, a mini disk, or a digital versatile disc (DVD).

A portion of the functions of the first transmission unit 10, the first reception unit 11, and the first signal processor 12 in the first module 1-$n_{MDL}$ may be implemented by dedicated hardware, and another portion may be implemented by software or firmware. For example, the functions of the first transmission unit 10 and the first reception unit 11 may be implemented by the processing circuit 103 which is dedicated hardware, and the function of the first signal processor 12 is implemented by the processor 105 reading and executing the program stored in the memory 106. As described above, the processing circuit can implement the abovementioned functions by hardware, software, firmware, or a combination thereof.

As described above, in the radar device according to the first embodiment, the first module 1-1 generates a reception beat signal from the received reflection RF signal using the first local oscillation signal, the second module 2-1 generates a reception beat signal from the received reflection RF signal using the second local oscillation signal that is synchronized with the first local oscillation signal, and the first signal processor 12 calculates the angle of a target using a signal obtained by coherent integration based on the reception beat signal generated by the first module 1-1 and the reception beat signal generated by the second module 2-1. Thus, it is possible to enhance the angle resolution of the target while maintaining the detection accuracy of the target.

In the radar device according to the first embodiment, the first module 1-1 has a plurality of transmission channels and a plurality of reception channels. The first signal processor 12 performs coherent integration on the basis of a phase difference between the channels. The third module 3-1 performs coherent integration on the basis of the phase-of-arrival difference caused by the positional relationship between the first module 1-1 and the second module 2-1. By performing these integrations, it is possible to improve the angle resolution of the target while maintaining the detection accuracy of the target.

The first embodiment describes the radar device which detects a target candidate using the first module 1-$n_{MDL}$ and enhances the angle resolution of the target using the second module 2-$n_{RxEx}$ and the third module 3-$n_{TxEx}$. However, the embodiment is not limited thereto. For example, the radar device may include only the first module 1-$n_{MDL}$ and the second module 2-$n_{RxEx}$, or may include only the first module 1-$n_{MDL}$ and the third module 3-$n_{TxEx}$. Further, the reception signal of the first module 1-$n_{MDL}$ and the reception signal of the second module 2-$n_{RxEx}$ may be synthesized to further improve the angle resolution of the target.

Second Embodiment

FIG. 27 is a block diagram showing a configuration of a radar device according to a second embodiment. Unlike the radar device according to the first embodiment, the radar device according to the second embodiment includes a first module $1-n_{MDL}$, a third module $3-n_{TxEx}$, and a display 9 without including a second module $2-n_{RxEx}$ as shown in FIG. 27.

FIG. 28 is a flowchart showing the operation of the radar device according to the second embodiment, and indicates a signal processing method by the radar device according to the second embodiment.

First, a first transmission unit 10 included in the first module $1-n_{MDL}$ radiates a transmission RF signal into space (step ST1h). When an object exists in space, the transmission RF signal is reflected by this object and returned to the radar device. A first reception unit 11 included in the first module $1-n_{MDL}$ receives a reflection RF signal of the transmission RF signal and generates a reception beat signal from the reflection RF signal using a first local oscillation signal (step ST2h). This reception beat signal is a first reception signal used to detect the target.

Next, the first signal processor 12 generates a first signal based on the distance and velocity of a target candidate for each transmission channel and each reception channel of the first module $1-n_{MDL}$ using the reception beat signal input from the first reception unit 11. The first signal processor 12 performs incoherent integration on the generated first signal, and calculates the distance and velocity of the target candidate on the basis of the intensity of the signal obtained by the incoherent integration (step ST3h).

Next, the first signal processor 12 performs coherent integration on the first signal regarding each target candidate for each transmission channel and each reception channel of the first module $1-n_{MDL}$ on the basis of a phase-of-arrival difference corresponding to an angle-of-arrival candidate of the target candidate (step ST4h).

Next, the first transmission unit 10 included in the first module $1-n_{MDL}$ radiates a transmission RF signal into space, and a third transmission unit 30 included in the third module $3-n_{TxEx}$ radiates a transmission RF signal into space (step ST5h). The transmission RF signal transmitted by the third transmission unit 30 is a third transmission signal.

The first reception unit 11 included in the first module $1-n_{MDL}$ receives a reflection RF signal of the transmission RF signal transmitted by the first transmission unit 10, and receives a reflection RF signal of the transmission RF signal transmitted by the third transmission unit 30. Then, in the same way as in FIG. 13A, the first reception unit 11 generates a first reception beat signal from the reflection RF signal of the transmission RF signal transmitted by the first transmission unit 10 using the first local oscillation signal. Further, in the same way as in FIG. 13A, the first reception unit 11 generates a third reception beat signal from the reflection RF signal of the transmission RF signal transmitted by the third transmission unit 30 (step ST6h). The first reception beat signal is a first reception signal used to calculate the angle of the target, and the third reception beat signal is a third reception signal used to calculate the angle of the target.

The first signal processor 12 generates a fourth signal based on the distance and velocity of each target candidate for each transmission channel and each reception channel of the first module $1-n_{MDL}$ using the first reception beat signal in the similar way as in steps ST1g and ST2g in FIG. 14. Further, the first signal processor 12 generates a third signal based on the distance and velocity of each target candidate for each transmission channel of the third module $3-n_{TxEx}$ and each reception channel of the first module $1-n_{MDL}$ using the third reception beat signal in the similar way as in steps ST1g and ST2g in FIG. 14.

The first signal processor 12 performs coherent integration on the third signal and the fourth signal regarding each target candidate on the basis of the phase-of-arrival difference corresponding to the angle-of-arrival candidate of the target candidate in the similar way as in step ST3g in FIG. 14 (step ST7h). Finally, the first signal processor 12 calculates the angle of the target candidate using the signal obtained by the coherent integration for each target candidate (step ST8h). Information regarding the angle of the target candidate calculated by the first signal processor 12 is displayed on the display 9.

As described above, in the radar device according to the second embodiment, the first module $1-n_{MDL}$ generates reception beat signals from the reflection RF signal of the transmission RF signal transmitted from the first module $1-n_{MDL}$ and the reflection RF signal of the transmission RF signal transmitted from the third module $3-n_{TxEx}$ using the first local oscillation signal. The first signal processor 12 detects the target using the reception beat signal generated by the first module $1-n_{MDL}$, and calculates the angle of the target using a signal obtained by coherent integration based on the reception beat signal generated by the first module $1-n_{MDL}$ from the reflection RF signal of the transmission RF signal transmitted by the first module $1-n_{MDL}$ and the reception beat signal generated by the first module $1-n_{MDL}$ from the reflection RF signal of the transmission RF signal transmitted by the third module $3-n_{TxEx}$. Thus, it is possible to enhance the angle resolution of the target while maintaining the detection accuracy of the target. The case where the first module $1-n_{MDL}$ and the third module $3-n_{TxEx}$ transmit the transmission RF signal after the target is detected has been described. However, only the third module $3-n_{TxEx}$ may transmit the transmission RF signal after the target is detected.

The present invention is not limited to the above embodiments, and two or more of the above embodiments can be freely combined, or any components in the embodiments can be modified or omitted, within the scope of the present invention.

INDUSTRIAL APPLICABILITY

The radar device according to the present invention can enhance angle resolution of a target while maintaining detection accuracy of the target, and thus, can be used as, for example, an obstacle detection device for a vehicle.

REFERENCE SIGNS LIST 1-1, $1-n_{MDL}$: first module, 1-1-1, 1-1-2: transmission RF signal, 1-2-1, 1-2-2, 1-7-1 to $1-7-N_{Rx,nMDL}$, 2-7-1 to $2-7-N_{Rx,nRxEx}$, 3-2-1, 100: antenna, 1-3-1, 1-3-2, 3-3-1: transmitter, 1-4-1: transmission switching unit, 1-5-1, 3-5-1: code modulation unit, 1-6-1: first local oscillation signal generating unit, 1-8-1 to $1-8-N_{Rx,nMDL}$, 2-8-1 to $2-8-N_{Rx,nRxEx}$: receiver, 1-9-1 to $1-9-N_{Rx,nMDL}$, 2-9-1 to $2-9-N_{Rx,nRxEx}$: analog-to-digital converter, 2-1 to 2-5, $2-n_{RxEx}$: second module, 2-6-1: second local oscillation signal generating unit, 3-1, 3-2, $3-n_{TxEx}$: third module, 3-6-1: third local oscillation signal generating unit, 9, 101: display, 10: first transmission unit, 11: first reception unit, 12: first signal processor, 20: second reception unit, 21: second signal processor, 30: third transmission unit, 40: vehicle, 102: input and output interface, 103: processing circuit, 104: signal bus, 105: processor, 106: memory, 120: first separation unit, 121: first signal generating unit, 122: incoherent integration unit, 123: target candidate detecting unit, 124: first coherent integration unit, 125: second coherent integration unit, 126: angle calculation unit, 150 to 153, 160 to 163: module, 150a, 153a, 160a, 163a: transmission unit, 150b, 160b to 163b: local oscillation signal generator, 151a, 152a, 161a, 162a: reception unit, 210: second separation unit, 211: second signal generating unit

The invention claimed is:

1. A radar device comprising:
a first module for generating a first transmission signal using a first local oscillation signal, transmitting the first transmission signal, receiving a reflection signal of the first transmission signal, and generating a first reception signal from the received reflection signal using the first local oscillation signal;
a second module for receiving the reflection signal of the first transmission signal, and generating a second reception signal from the received reflection signal using a second local oscillation signal that is synchronized with the first local oscillation signal; and
processing circuitry performing a process of:
detecting a target using the first reception signal and calculating an angle of the target using, for the target, a signal obtained by coherent integration based on the first reception signal and the second reception signal.

2. The radar device according to claim 1, wherein
the process generates a first signal based on distance and velocity using the first reception signal, detects a distance and a velocity of the target on a basis of an intensity of the first signal, and performs the coherent integration based on the first reception signal and the second reception signal on the detected distance and velocity of the target.

3. The radar device according to claim 2, wherein
the process identifies a distance bin number and a velocity bin number of the target on a basis of the intensity of the first signal, and performs the coherent integration based on the first reception signal and the second reception signal on a distance and a velocity corresponding to the distance bin number and the velocity bin number.

4. The radar device according to claim 2, wherein
the process performs the coherent integration based on the first reception signal and the second reception signal on a basis of a phase-of-arrival difference caused by a positional relationship between the first module and the second module.

5. The radar device according to claim 1, wherein
the process generates a first signal based on a distance and a velocity of the target using the reception signal generated by the first module, performs incoherent integration on the first signal, and detects the target on a basis of an intensity of a signal obtained by the incoherent integration.

6. The radar device according to claim 2, wherein
the first module has one or more transmission channels and one or more reception channels, and
the process performs coherent integration on the first signal on a basis of a phase difference between channels.

7. The radar device according to claim 1, further comprising a third module that has a function of transmitting a transmission signal and that generates a third transmission signal using a third local oscillation signal synchronized with the first local oscillation signal, wherein
the first module receives a reflection signal of the third transmission signal, and generates a third reception signal from the received reflection signal of the third transmission signal using the first local oscillation signal, and
the process calculates an angle of the target using, for the target, a signal obtained by coherent integration based on the second reception signal and the third reception signal, or based on the second reception signal, the third reception signal, and the first reception signal.

8. The radar device according to claim 1, wherein the radar device includes one or more of the second modules.

9. The radar device according to claim 7, wherein the radar device includes one or more of the third modules.

10. A radar device comprising:
a first module for generating a first transmission signal using a first local oscillation signal, transmitting the first transmission signal, receiving a reflection signal of the transmission signal, and generating a first reception signal from the received reflection signal using the first local oscillation signal;
a third module for generating a third transmission signal using a third local oscillation signal that is synchronized with the first local oscillation signal; and
processing circuitry performing a process of:
calculating an angle of a target, wherein
the first module receives a reflection signal of the third transmission signal, and generates a third reception signal using the first local oscillation signal, and
the process detects the target using the first reception signal, and calculates the angle of the target using, for the target, a signal obtained by coherent integration based on the first reception signal and the third reception signal.

11. The radar device according to claim 6, wherein
the first module performs modulation for separating multiple transmission signals into each transmission signal using the first local oscillation signal, and transmits the modulated multiple transmission signals.

12. The radar device according to claim 11, wherein the modulation is performed by time division, code division, frequency division, time division and code division, or frequency division and code division.

13. The radar device according to claim 10, wherein
the third module performs modulation for separating multiple transmission signals into each transmission signal using the third local oscillation signal, and transmits the modulated multiple transmission signals.

14. The radar device according to claim 13, wherein the modulation is performed by time division, code division, frequency division, time division and code division, or frequency division and code division.

15. The radar device according to claim 1, wherein
the first module sets a radar parameter on a basis of a loss due to phase noise, and generates the first local oscillation signal.

16. A signal processing method for a radar device including a first module that generates a first transmission signal using a first local oscillation signal, transmits the first transmission signal, and receives a reflection signal of the first transmission signal, a second module that receives the reflection signal of the first transmission signal, and a signal processor that calculates an angle of a target, the method comprising:
generating, by the first module, a first reception signal from the received reflection signal using the first local oscillation signal;
generating, by the second module, a second reception signal from the received reflection signal using a second local oscillation signal that is synchronized with the first local oscillation signal; and detecting the target using the first reception signal and calculating the angle of the target using, for the target, a signal obtained by coherent integration based on the first reception signal and the second reception signal.

17. A signal processing method for a radar device including a first module that generates a first transmission signal using a first local oscillation signal, transmits the first transmission signal, receives a reflection signal of the first transmission signal, and generates a first reception signal from the received reflection signal using the first local oscillation signal, a third module that generates a third transmission signal using a third local oscillation signal that is synchronized with the first local oscillation signal, and a signal processor that calculates an angle of a target, the method comprising:

receiving a reflection signal of the third transmission signal and generating a third reception signal using the first local oscillation signal, by the first module; and detecting the target using the first reception signal and calculating the angle of the target using, for the target, a signal obtained by coherent integration based on the first reception signal and the third reception signal.

18. The signal processing method according to claim 16, wherein the first module sets a radar parameter on a basis of a loss due to phase noise, and generates the first local oscillation signal.

* * * * *